US006029203A

United States Patent [19]
Bhatia et al.

[11] Patent Number: 6,029,203
[45] Date of Patent: Feb. 22, 2000

[54] APPARATUS AND METHODS FOR USE THEREIN FOR AN ISDN LAN MODEM THAT PROVIDES ENHANCED NETWORK ACTIVITY

[75] Inventors: Rajiv Bhatia, Marlboro; C. Paul Douglas, Matawan, both of N.J.; Siuling C. Zhang, Stony Brook, N.Y.

[73] Assignee: 3Com Corporation, Santa Clara, Calif.

[21] Appl. No.: 08/938,369

[22] Filed: Sep. 26, 1997

[51] Int. Cl.[7] .......................... G06F 13/14; G06F 13/362
[52] U.S. Cl. ........................... 709/244; 709/217; 709/248
[58] Field of Search ................................. 709/229, 216, 709/217, 218, 219, 228, 236, 105, 244, 248; 370/431, 437, 445, 465; 707/10; 371/25.1, 26; 324/73

[56] References Cited

U.S. PATENT DOCUMENTS

| | | | |
|---|---|---|---|
| 5,453,979 | 9/1995 | Schibler et al. | 370/395 |
| 5,654,961 | 8/1997 | Araujo et al. | 370/263 |
| 5,742,905 | 4/1998 | Pepe et al. | 455/461 |
| 5,790,548 | 8/1998 | Sistanizadeh et al. | 370/401 |
| 5,805,823 | 9/1998 | Seitz | 790/236 |
| 5,841,990 | 11/1998 | Picazo, Jr. et al. | 709/249 |
| 5,862,348 | 1/1999 | Pedersen | 709/229 |
| 5,884,024 | 3/1999 | Lim et al. | 713/201 |
| 5,884,025 | 3/1999 | Beahr et al. | 395/187.01 |
| 5,884,157 | 3/1999 | Karmi | 455/406 |
| 5,887,056 | 3/1999 | Sonnenberg | 379/220 |
| 5,903,652 | 5/1999 | Mital | 380/25 |
| 5,903,718 | 5/1999 | Marik | 714/38 |

OTHER PUBLICATIONS

U.S. application No. 08/938,573, Bhatia et al., filed Sep. 26, 1997.
U.S. application No. 08/938,373, Bhatia et al., filed Sep. 26, 1997.
U.S. application No. 08/938,370, Bhatia et al., filed Sep. 26, 1997.
U.S. application No. 08/938,852, Bhatia et al., filed Sep. 26, 1997.
U.S. application No. 08/938,851, Bhatia et al., filed Sep. 26, 1997.
U.S. application No. 08/938,568, Bhatia et al., filed Sep. 26, 1997.
U.S. application No. 08/938,572, Bhatia et al., filed Sep. 26, 1997.
U.S. application No. 08/852,659, Best et al., filed May 7, 1997.
U.S. application No. 08/852,656, Best et al., filed May 7, 1997.
K. Egevang et al., "The IP Network Address Translator (NAT)", *Internic Network Working Group*, Request for Comments No. 1631, May 1994, pp. 1–9.

*Primary Examiner*—Zarni Maung
*Assistant Examiner*—Jason D. Cardone
*Attorney, Agent, or Firm*—Michaelson & Wallace; Peter L. Michaelson

[57] ABSTRACT

Apparatus, and accompanying methods for use therein, for an ISDN LAN modem that is suited for small user environments and which contains an internal ISDN router having a self-contained network hub for inter-connecting multiple network devices, such as workstations, to each other through a local area network (LAN) and for permitting each of those devices to each gain access through the router to any one of a number of different remote networks. Through use of a multi-tiered routing hierarchy including both destination- and source-based routing, the LAN modem accommodates several modalities of network communication not heretofore possible in a conventional router. Specifically, several different workstations can simultaneously communicate through the LAN modem with a common remote network and share a single user account at a corresponding network service provider. Also, the LAN modem can simultaneously route packet traffic between multiple workstations on the LAN and different remote networks through different ISDN connections simultaneously existing between the LAN modem and corresponding network service providers.

44 Claims, 41 Drawing Sheets

TWO SIMULTANEOUS REMOTE CONNECTIONS TO DIFFERENT DESTINATIONS

TRUE ROUTING MODE

TWO SIMULTANEOUS REMOTE CONNECTIONS TO DIFFERENT DESTINATIONS

SIMULTANEOUS CONNECTIONS THROUGH SHARED ACCOUNT

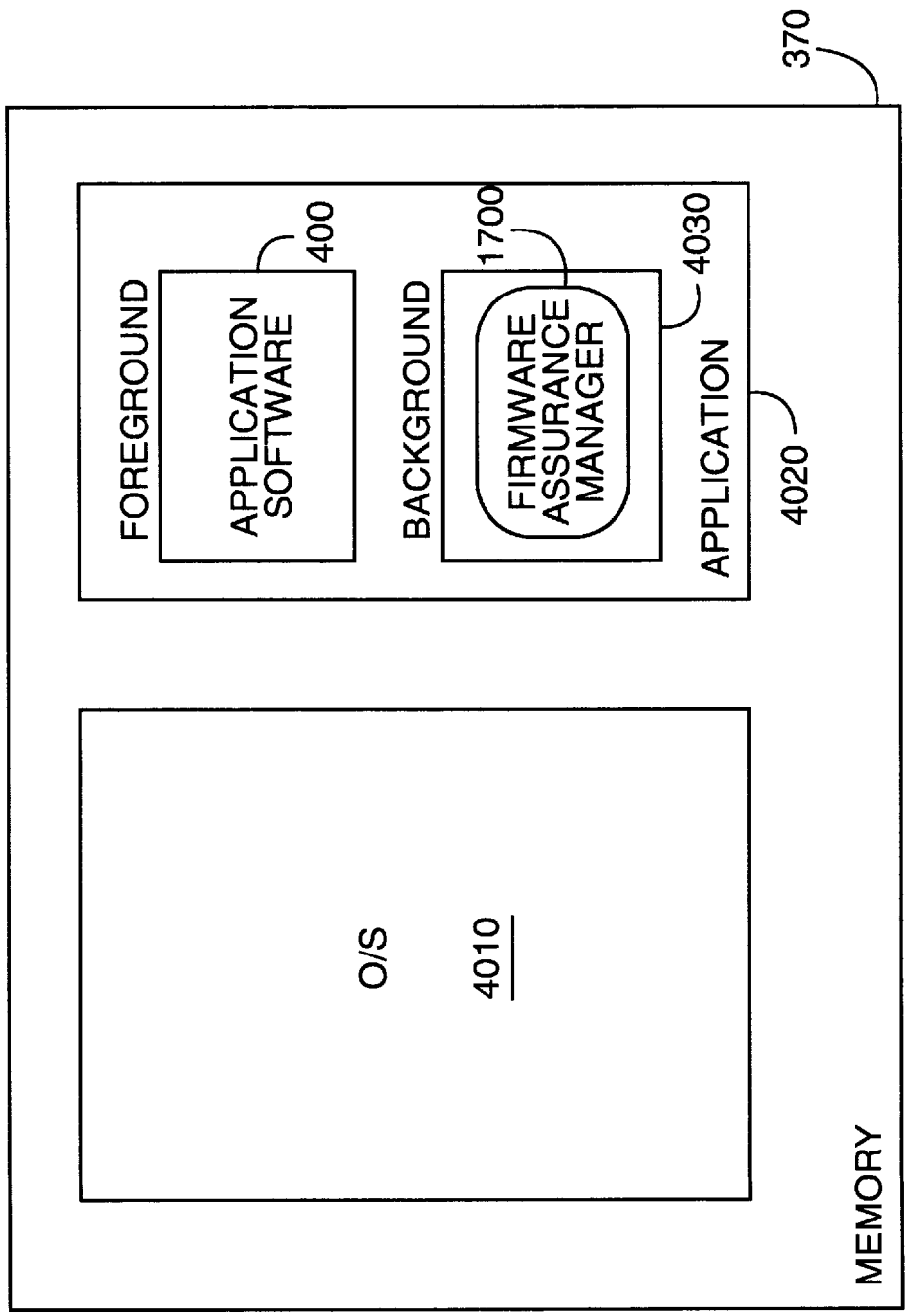

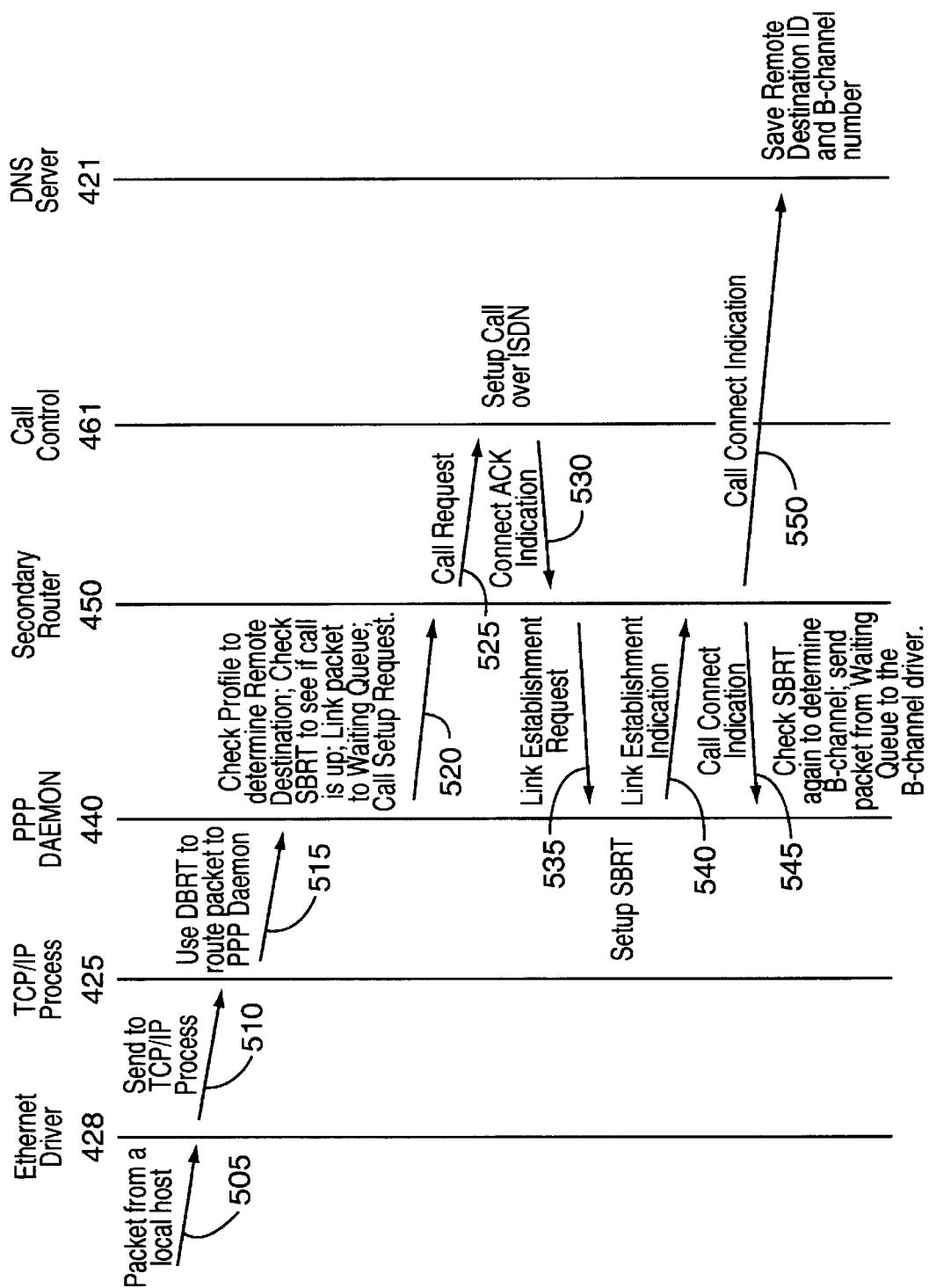
FIG. 5   ISDN CALL SETUP DUE TO TRAFFIC ON LAN

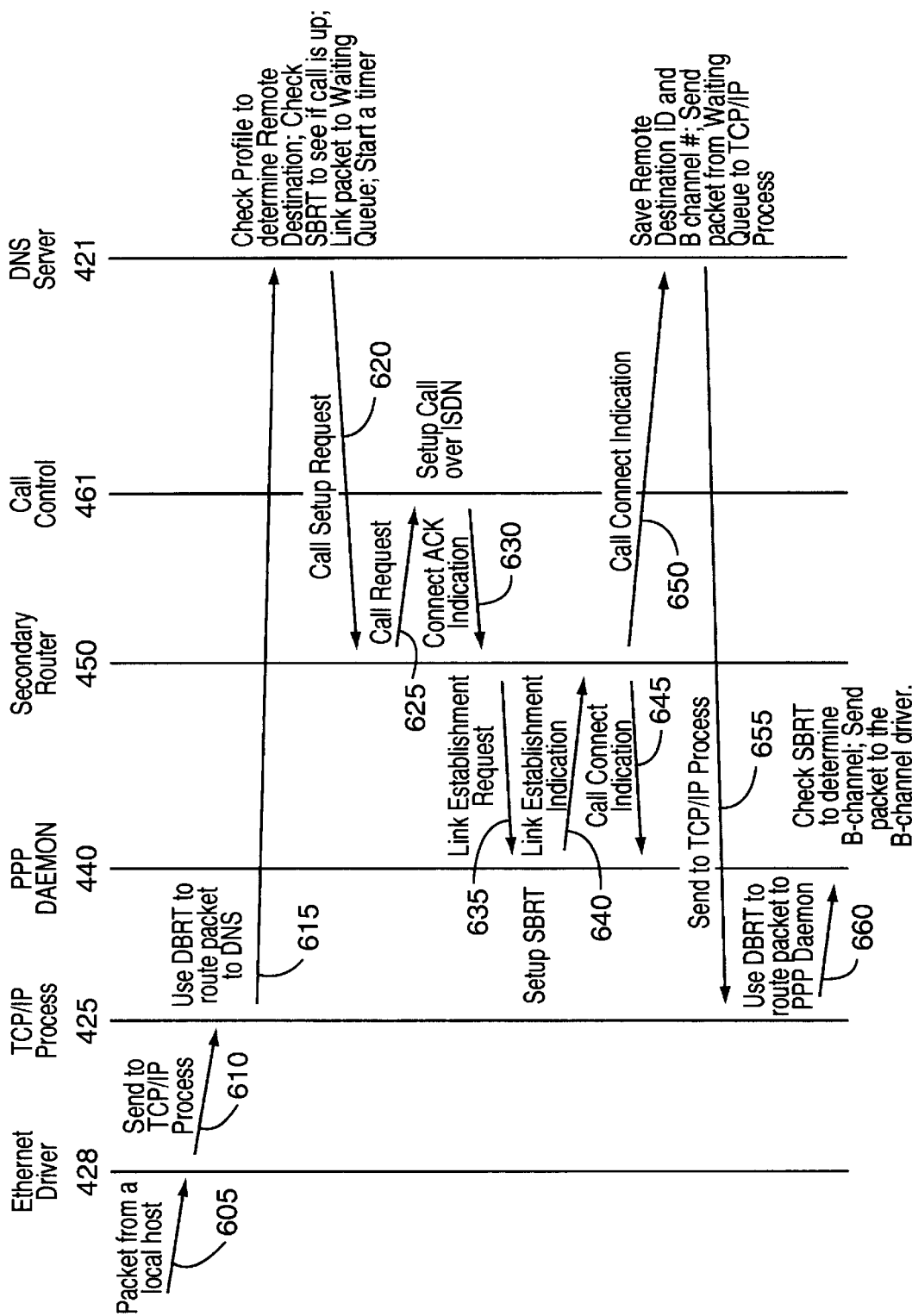
FIG. 6  ISDN CALL SETUP DUE TO DNS REQUEST

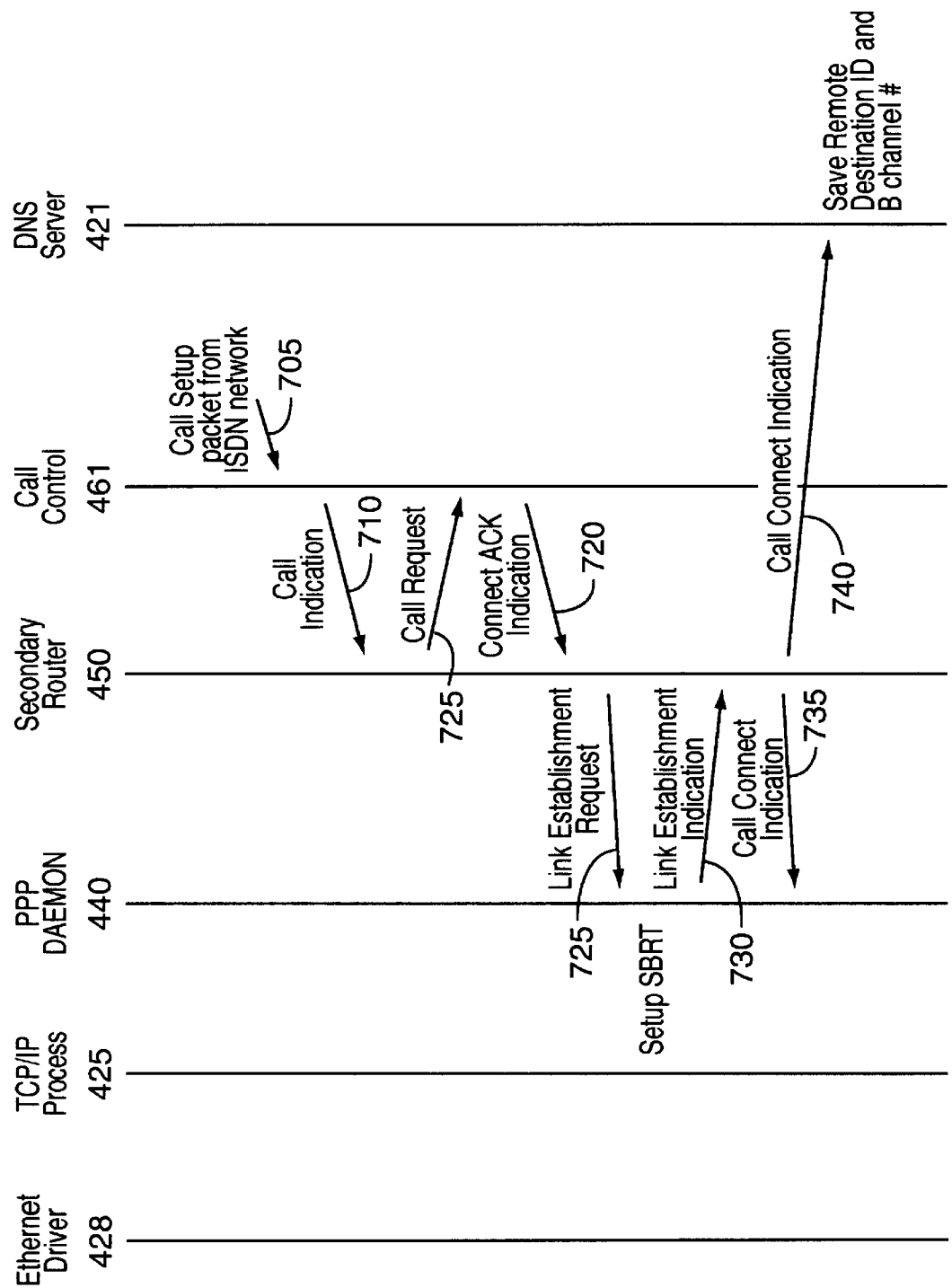
FIG. 7  INCOMING ISDN CALL

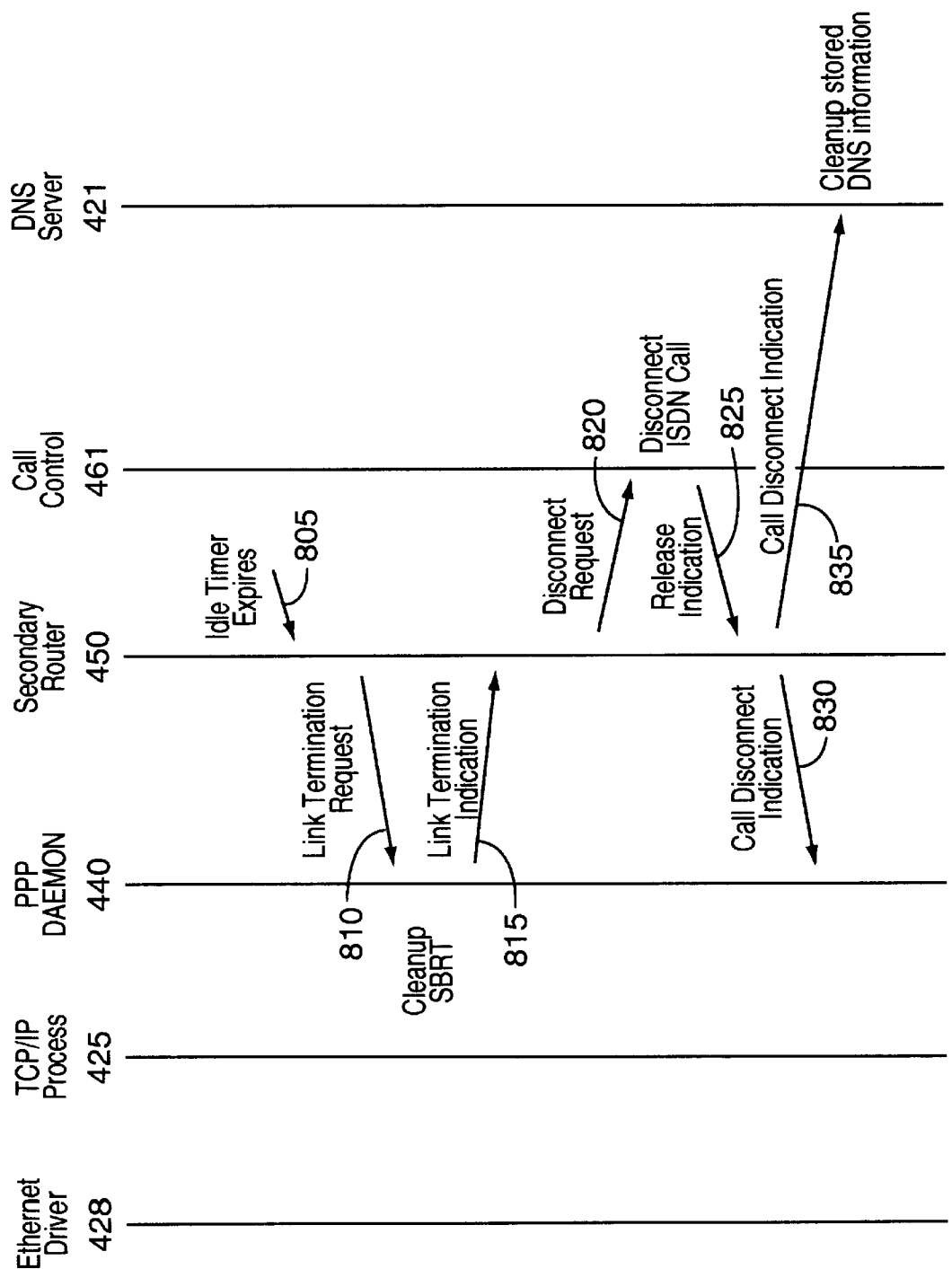
FIG. 8  ISDN CALL DISCONNECT DUE TO IDLE TIMEOUT

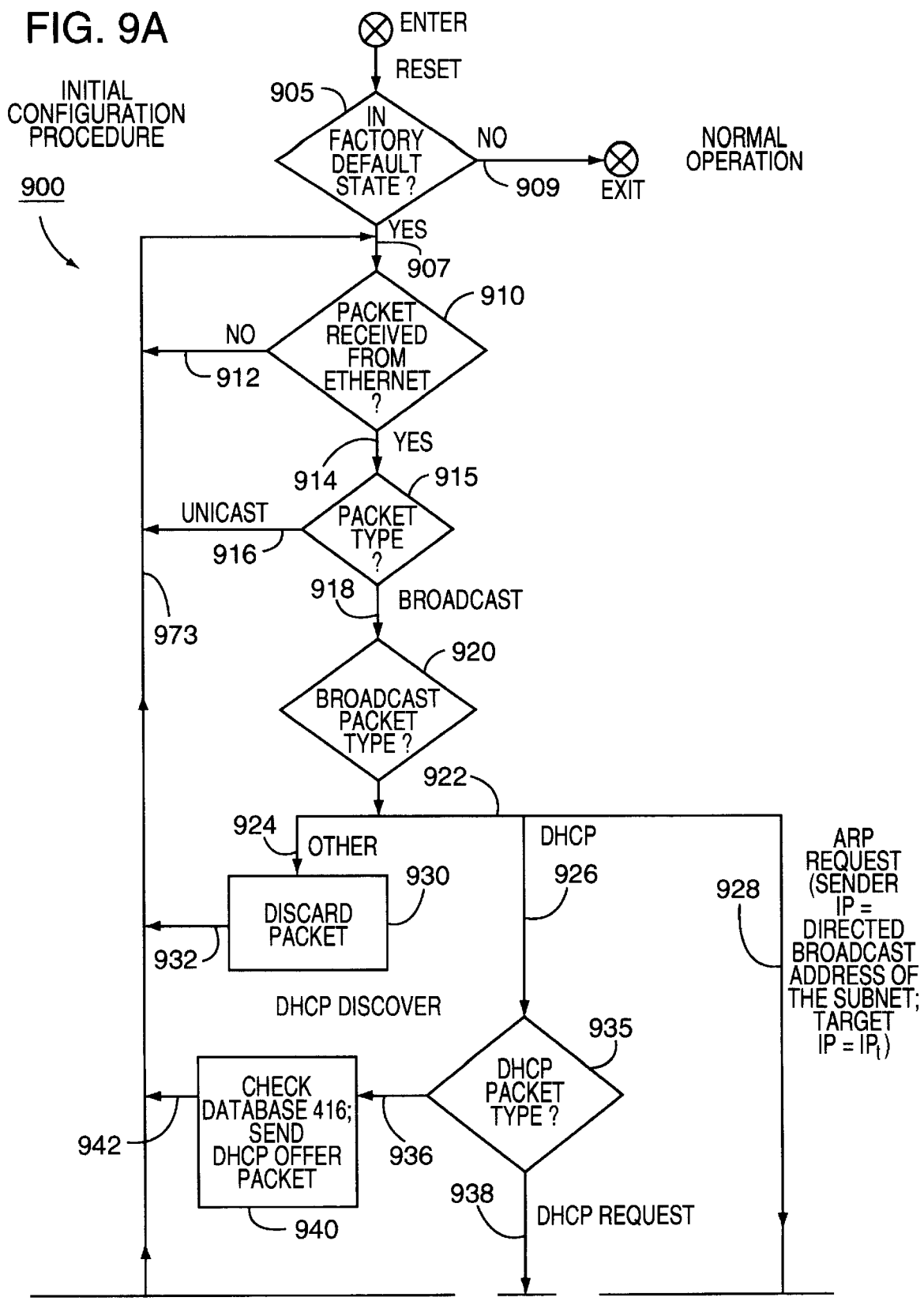

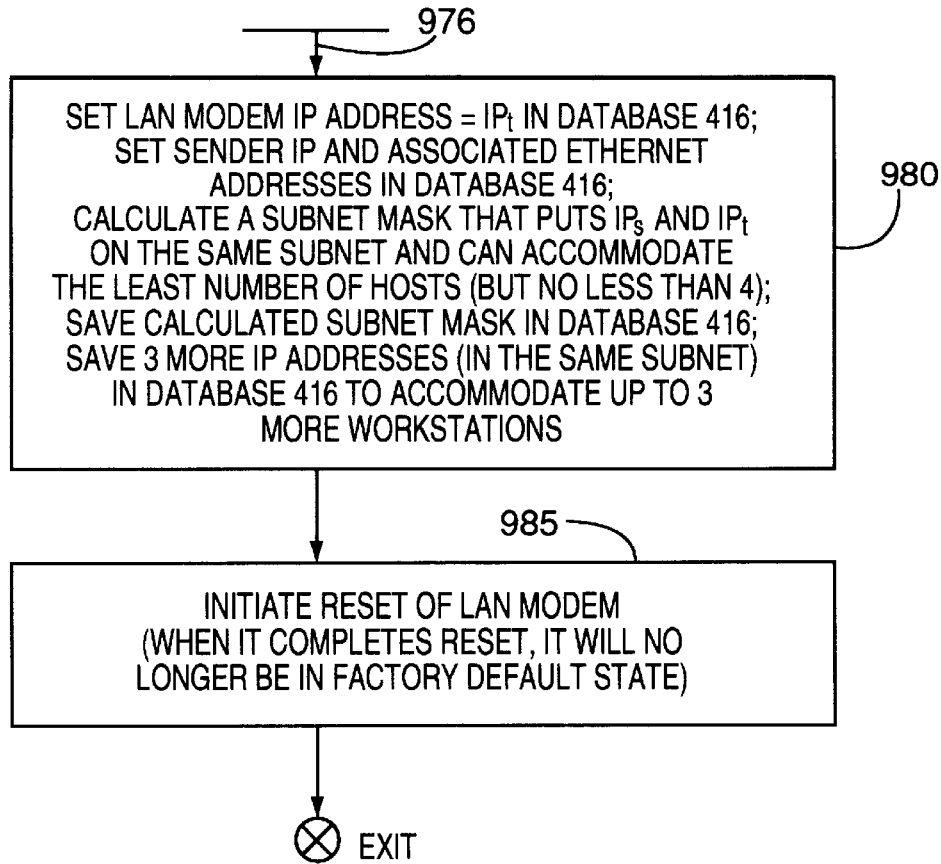

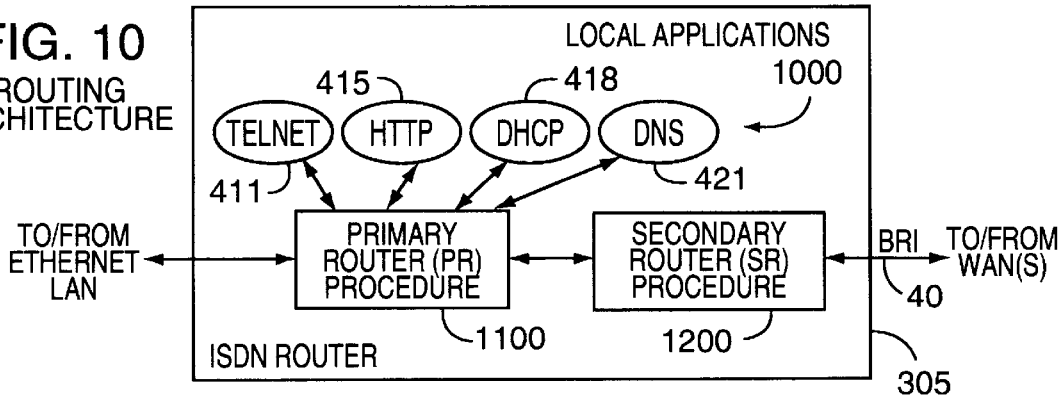
FIG. 10 ROUTING ARCHITECTURE
FIG. 11 PRIMARY ROUTER (PR) PROCEDURE 1100

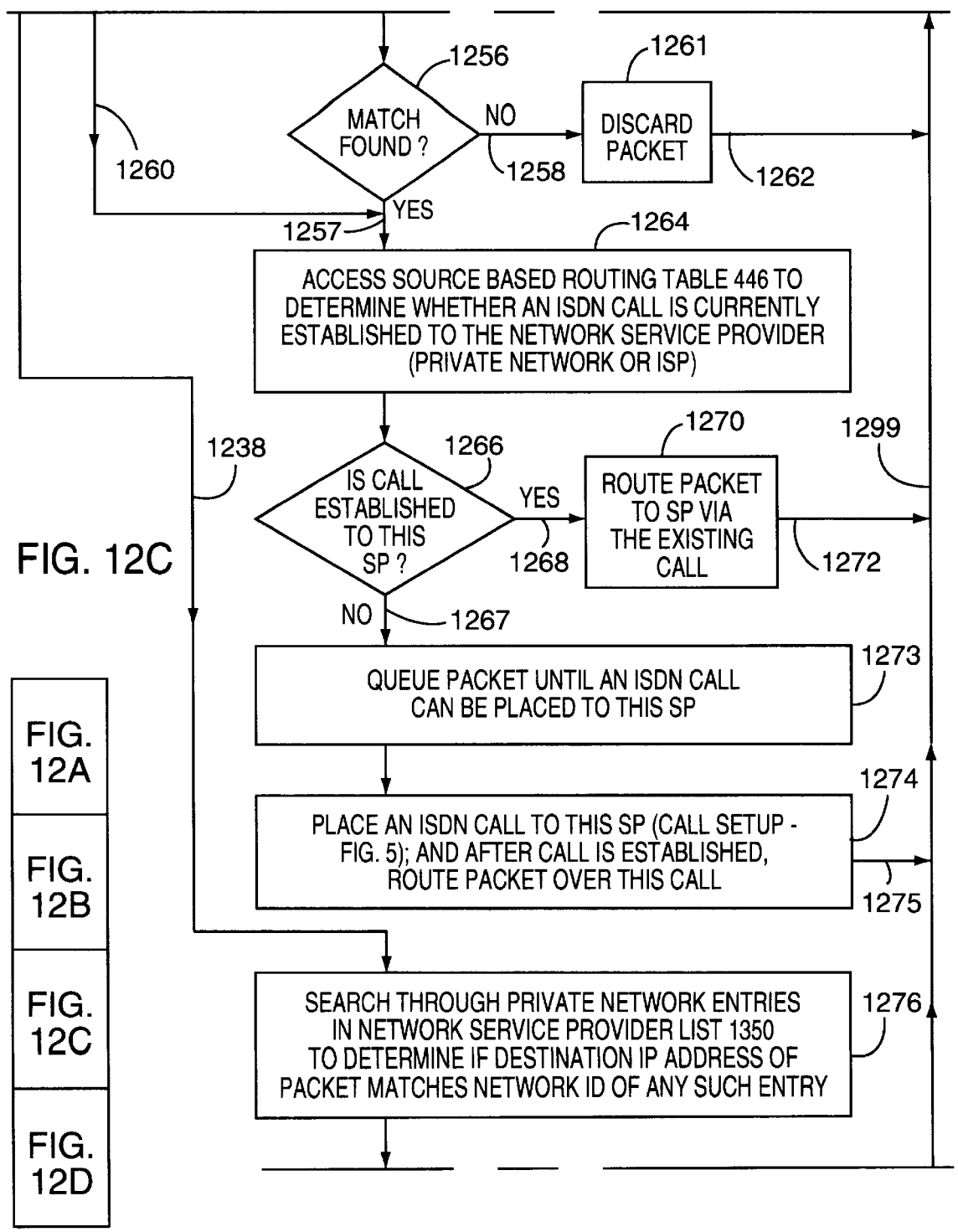

FIG. 13A

HOST LIST
(WITHIN DATABASE 416)

| HOST MACHINE NAME | HOST IP ADDRESS | HOST ETHERNET ADDRESS | NETWORK SERVICE PROVIDER PERMISSIONS ||||||
|---|---|---|---|---|---|---|---|---|
| | | | SP1 | SP2 | SP3 | SP4 | ... | SPn |
| UNKNOWN PC_1 | IP ADDRESS_1 | 0 | YES_1 | YES_2 | YES_3 | YES_4 | ... | YES_n |
| UNKNOWN PC_2 | IP ADDRESS_2 | 0 | YES_1 | YES_2 | YES_3 | YES_4 | ... | YES_n |
| UNKNOWN PC_3 | IP ADDRESS_3 | 0 | YES_1 | YES_2 | YES_3 | YES_4 | ... | YES_n |
| UNKNOWN PC_4 | IP ADDRESS_4 | 0 | YES_1 | YES_2 | YES_3 | YES_4 | ... | YES_n |
| ... | ... | ... | ... | ... | ... | ... | ... | ... |
| UNKNOWN PC_m | IP ADDRESS_m | 0 | YES_1 | YES_2 | YES_3 | YES_4 | ... | YES_n |

1300, 1310

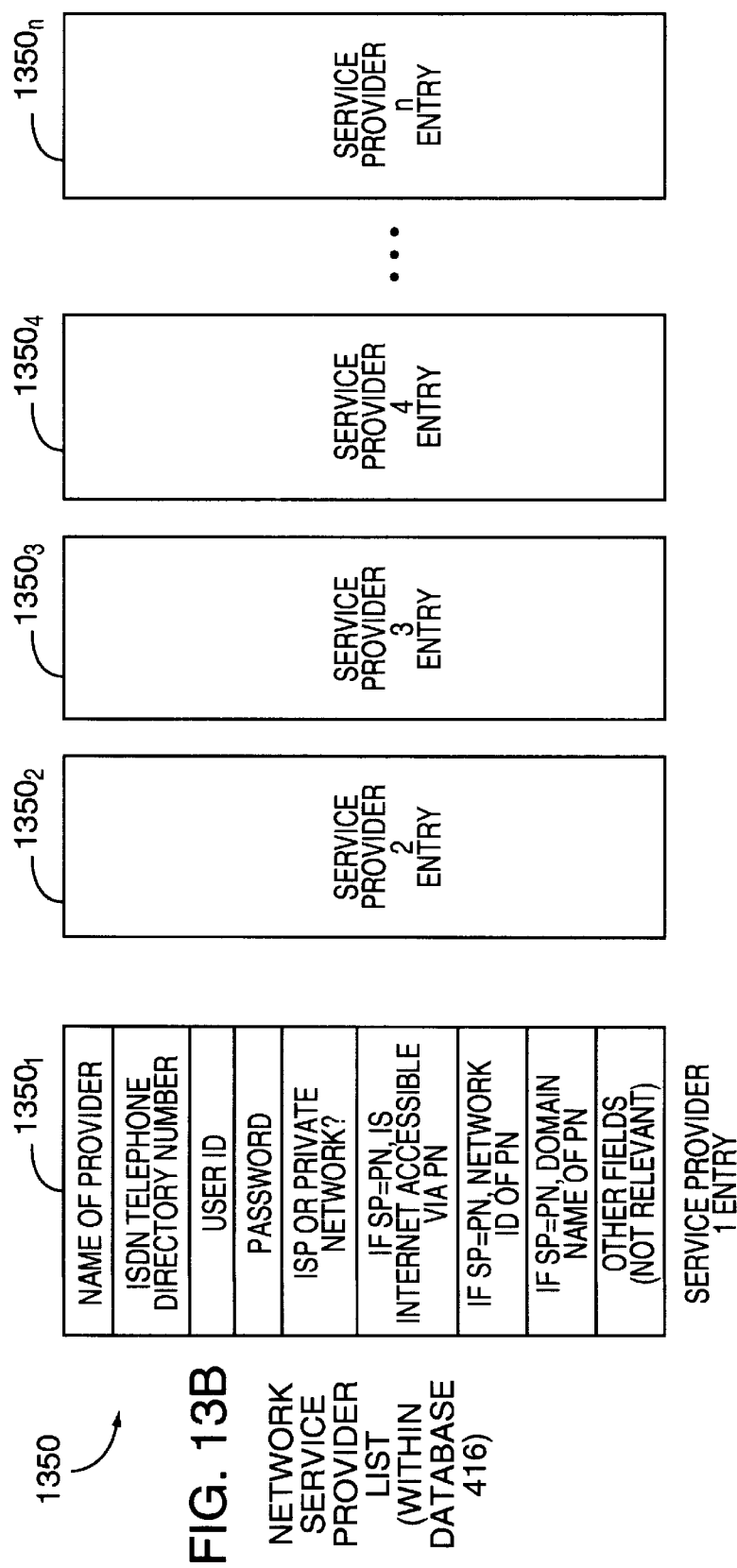
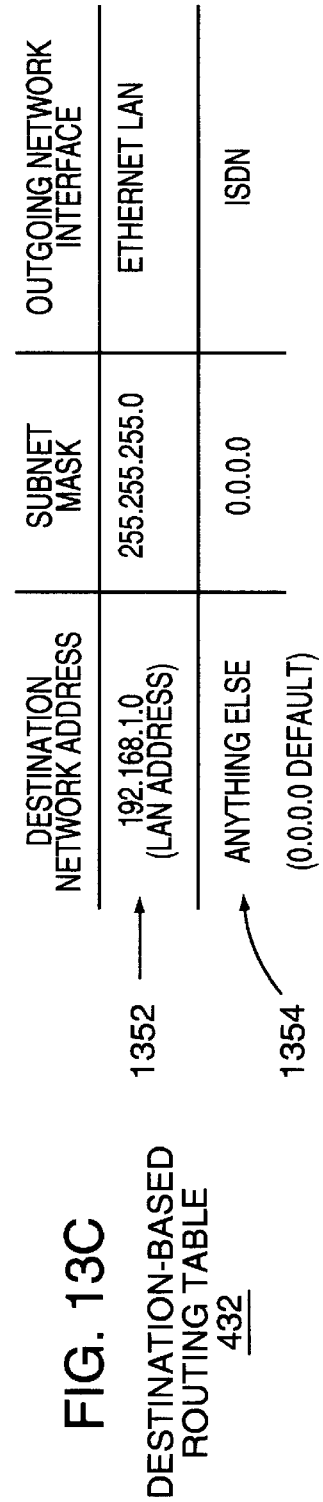
FIG. 13B
FIG. 13C

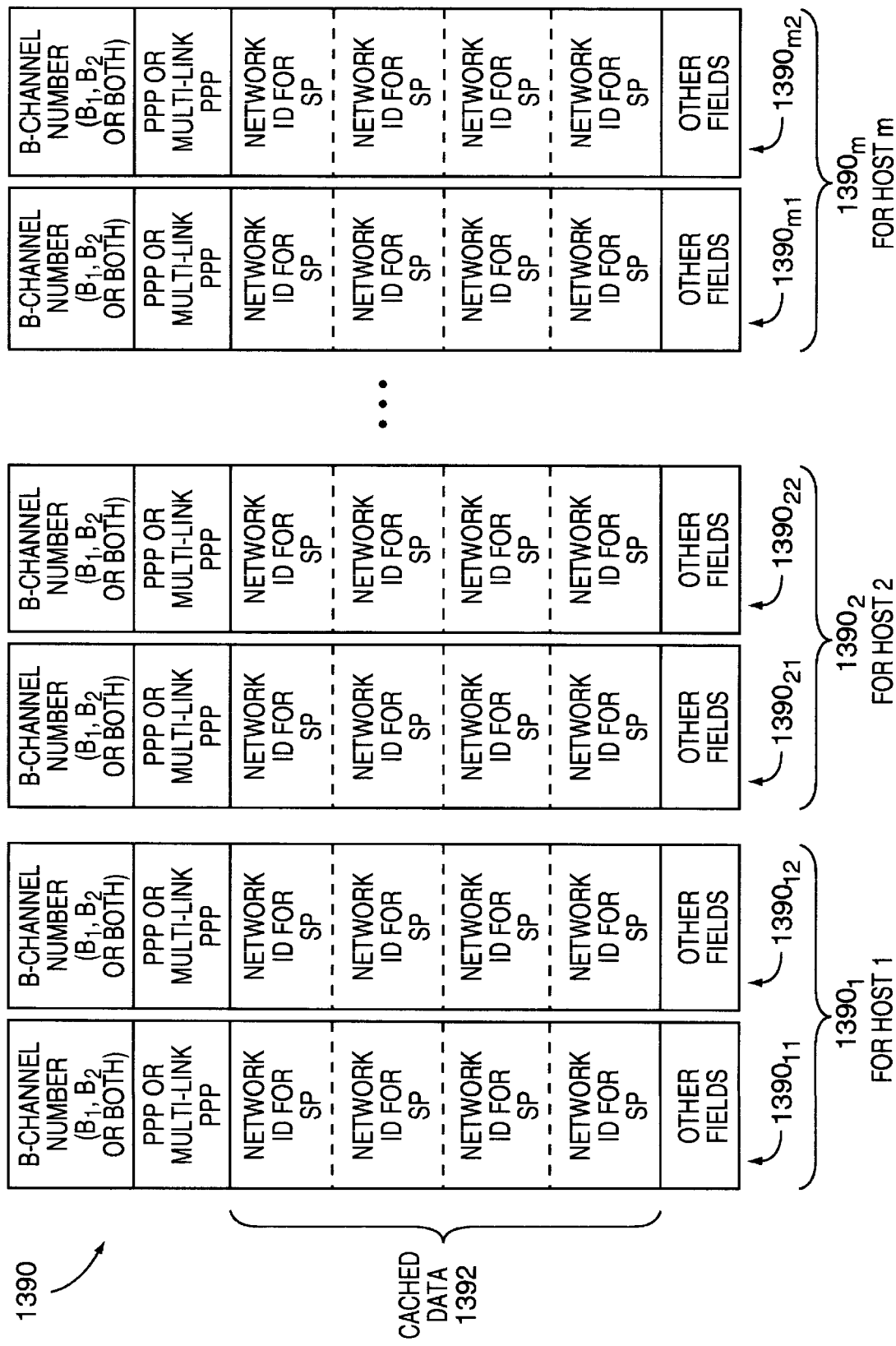
FIG. 13D  SOURCE-BASED ROUTING TABLE 446

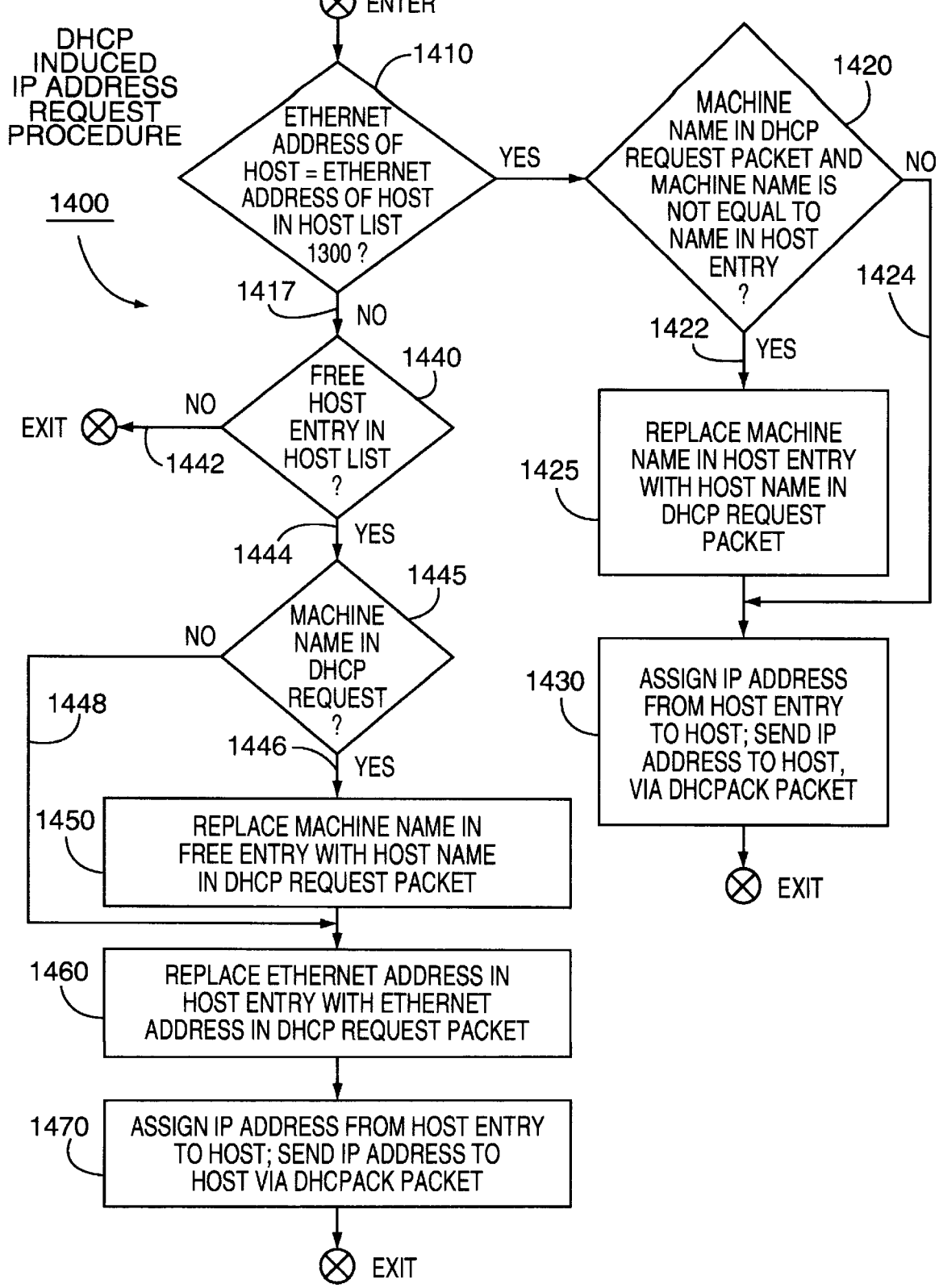

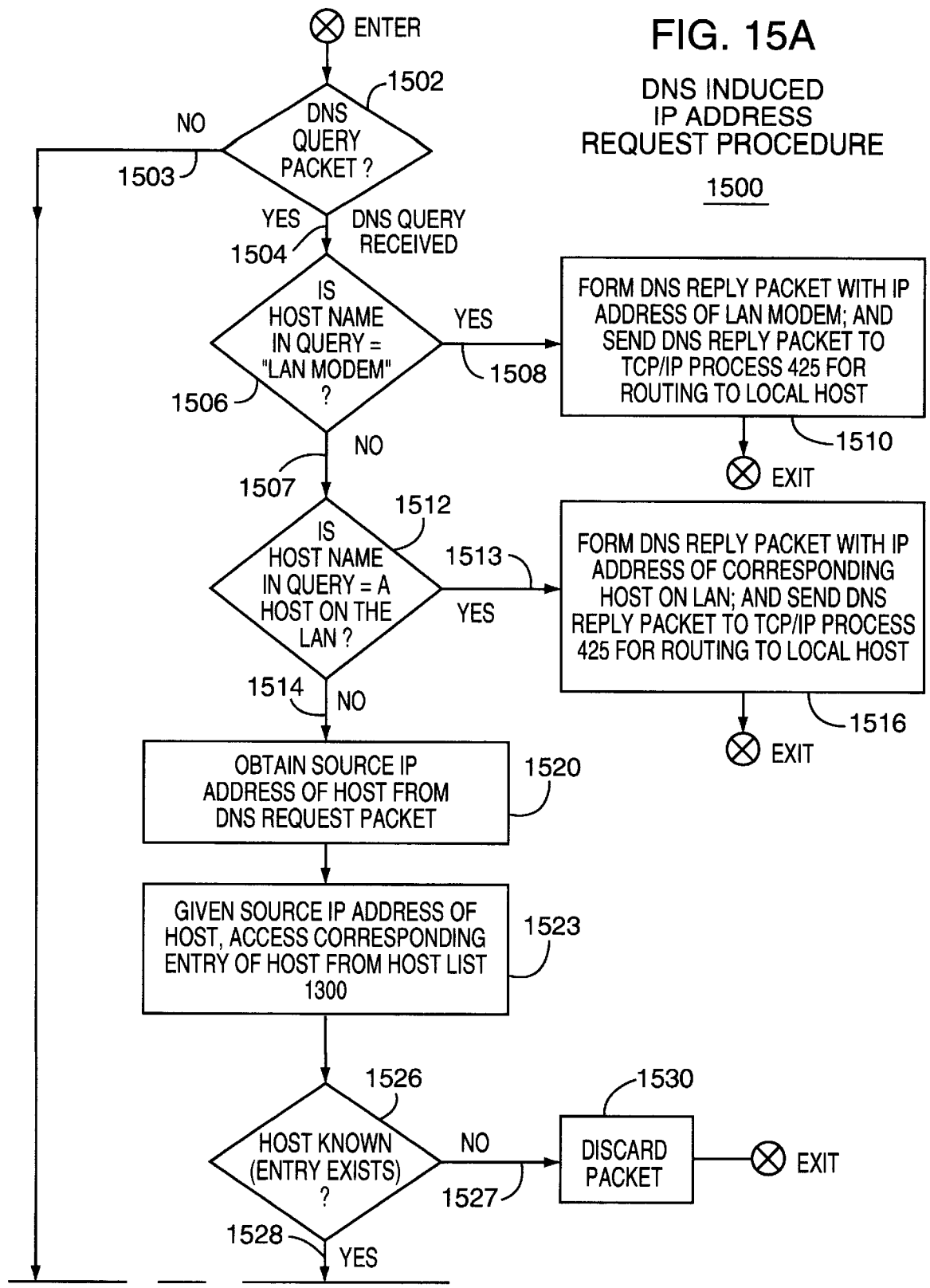

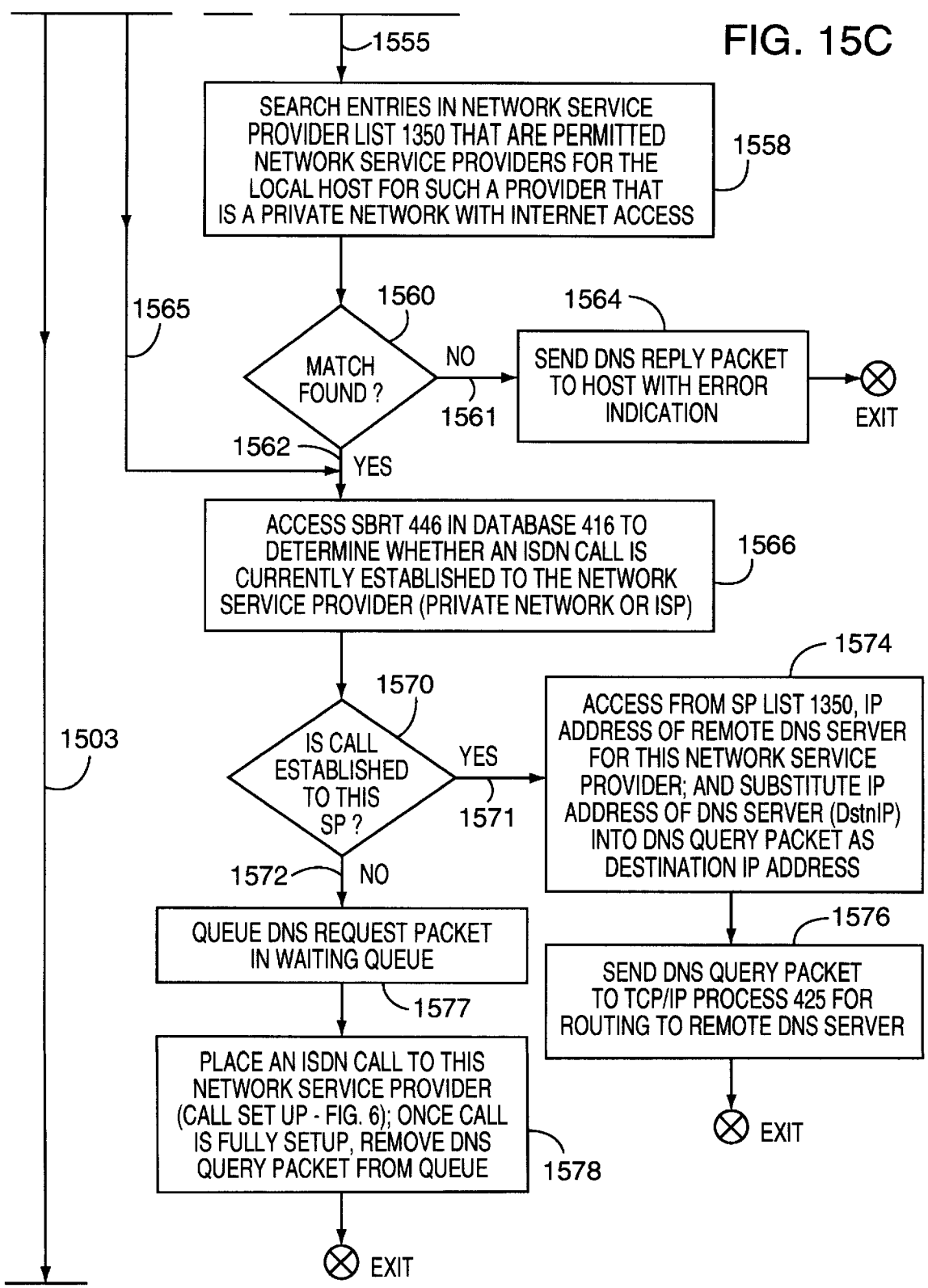

FIRMWARE UPGRADE PROCESS
402

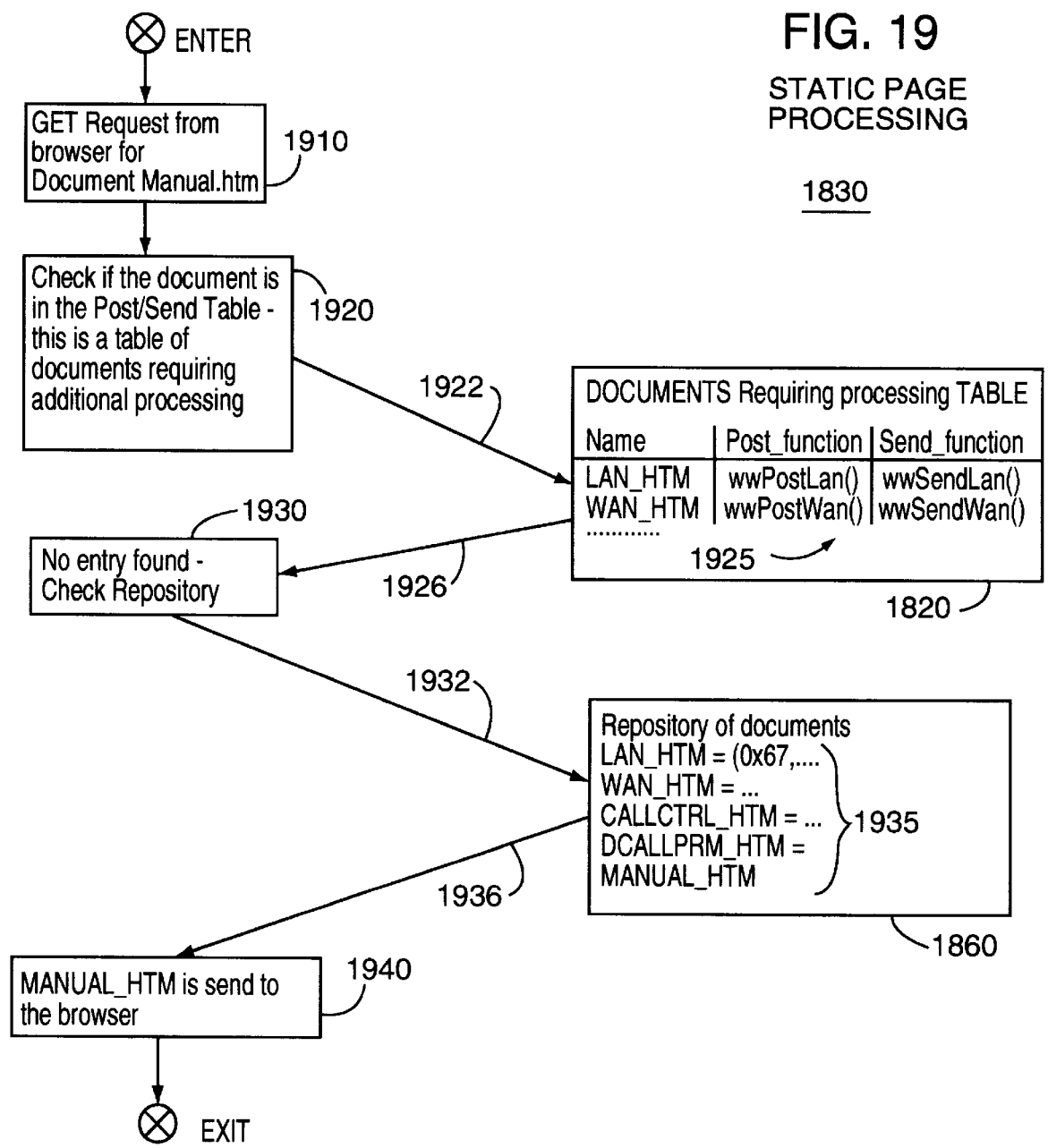

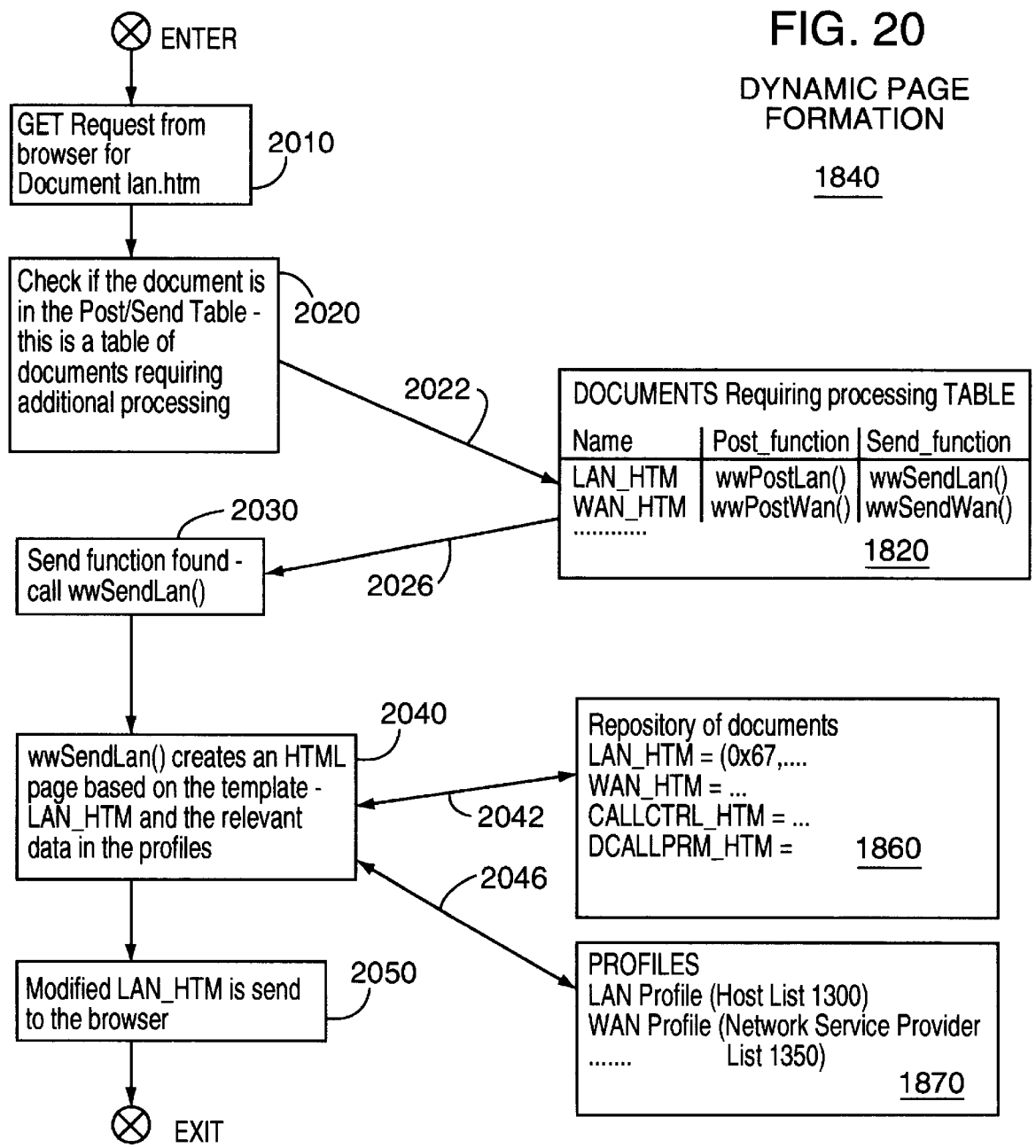

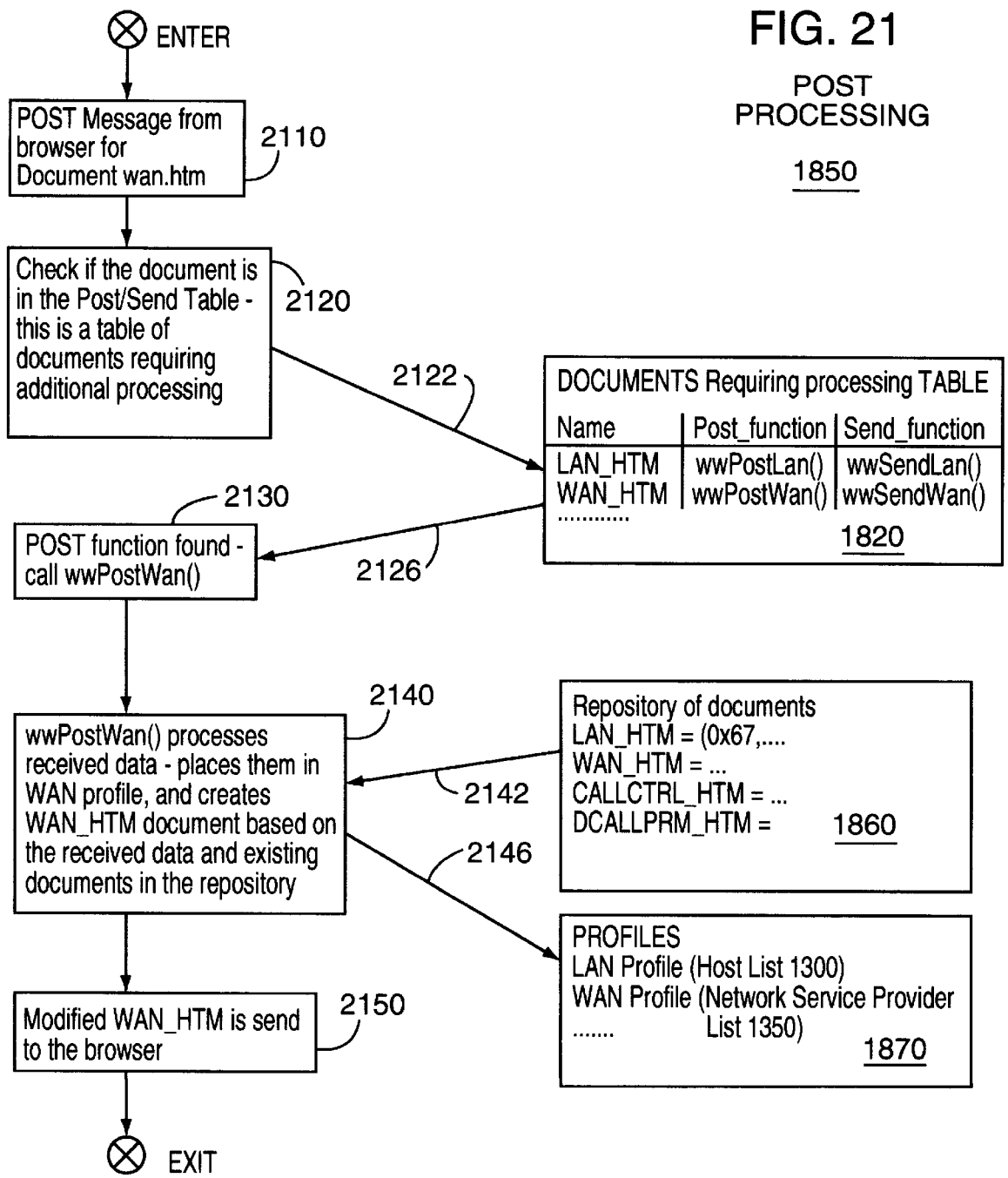

FIG. 22

```
                                    Wizstat.htm
<!DOCTYPE HTML PUBLIC "-//IETF//DTD HTML//EN">
<html>

<head>
<meta http-equiv="Content-Type"
content="text/html; charset=iso-8859-1">
<meta name="GENERATOR" content="Microsoft FrontPage 2.0">
<title>SPID Wizard</title>
</head>

<body bgcolor="#00FFFF">
_REFRESH_      ←— 2210

<p align="center"><font color="#0000FF" size="6">_TITLE_</font></p>       2215

_PICTURE1_ ←— 2220                              2225

<p align="center"><font size="4"><strong>_TEXT1_</strong></font></p>

<p align="center"><font size="4"><strong>
_PICTURE2_ ←— 2230₁
_TEXT2_    ←——— 2235
_PICTURE2_ ←——————— 2230₂
</strong></font></p>

<p align="center"> </p>
_BUTTON_   ←——— 2240
</body>
</html>
```

```
_REFRESH_    ←— 2210

_TITLE_  ←— 2215

_PICTURE1_   ←— 2220

_TEXT1_  ←— 2225

_PICTURE2_ _TEXT2_ _PICTURE2_
                     2230₁     2235     2230₂

_BUTTON_     ←— 2240

2300
```

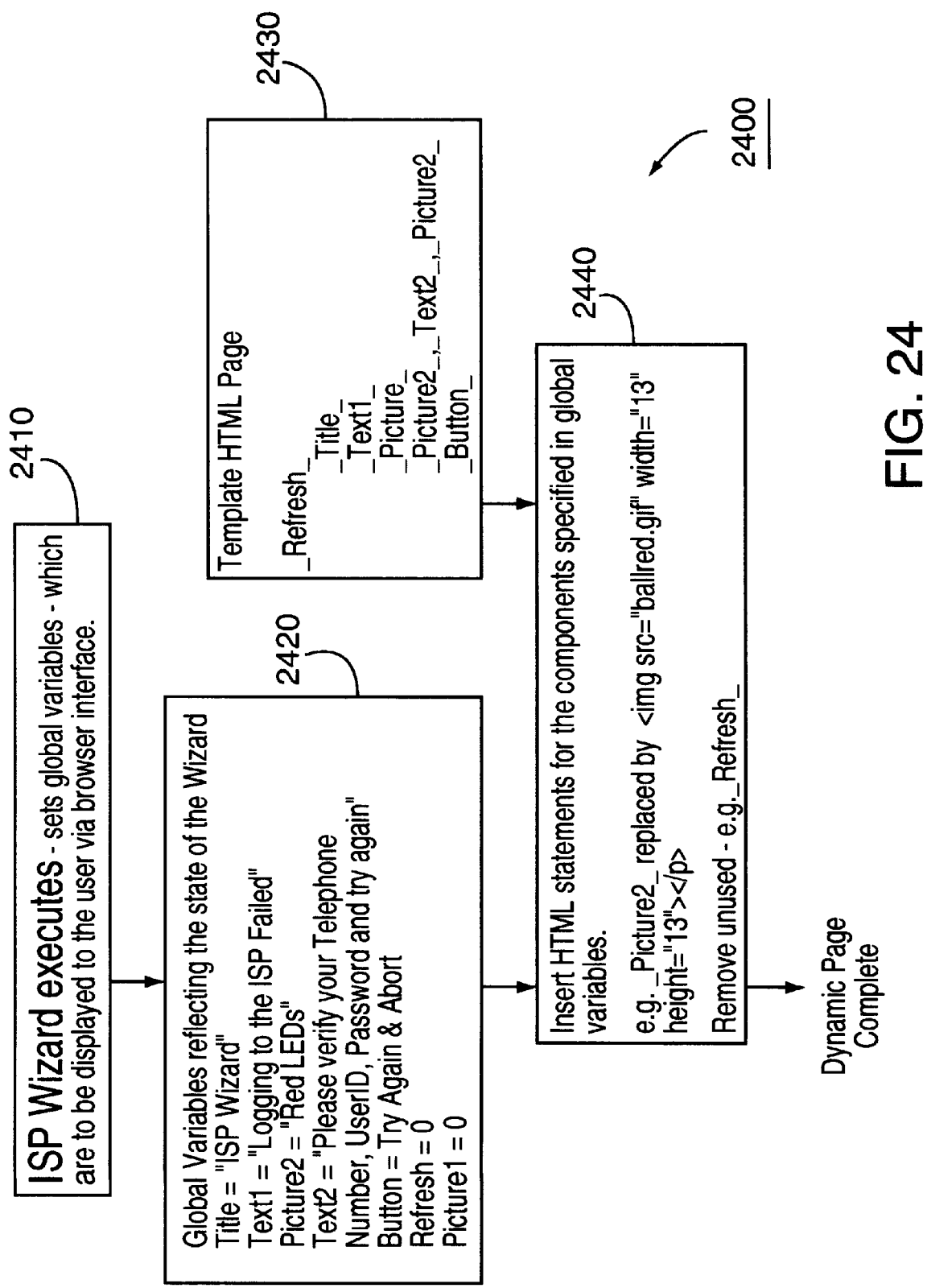

FIG. 25

```
                                                       2500
                           Wizstat.htm
<!DOCTYPE HTML PUBLIC "-//IETF//DTD HTML//EN">
<html>

<head>
<meta http-equiv="Content-Type"
content="text/html; charset=iso-8859-1">
<meta name="GENERATOR" content="Microsoft FrontPage 2.0">
<title>SPID Wizard</title>
</head>

<body bgcolor="#00FFFF">

<p align="center"><font color="#0000FF" size="6">ISP Wizard</font></p>

<p align="center"><font size="4"><strong>Logging on to the ISP failed!
</strong></font></p>

<p align="center"><font size="4"><strong>
<img src="ballred.gif" width="13" height="13">
Please verify your Telephone Number, User ID, Password and try again.
<img src="ballred.gif" width="13" height="13">
</strong></font></p>

<p align="center"> </p>
<form method="POST" > <!--webbot bot="SaveResults" u-file="_private/fo
rm_results.txt" s-format="TEXT/CSV" s-label-fields="TRUE" --><p align=
"center"><input type="submit" value="Try Again" name="B1"> <input type
</body>
</html>
```

```
3100     char FRMAIN_HTML[] =                                    FIG. 31
         {
         0x00, 0x00, 0x0b, 0x01, 0x48, 0x54, 0x54, 0x50, 0x2f, 0x31,
         0x2e, 0x30, 0x20, 0x32, 0x30, 0x30, 0x20, 0x4f, 0x4b, 0x0d,
         0x0a, 0x53, 0x65, 0x72, 0x76, 0x65, 0x72, 0x3a, 0x20, 0x4f
         . . . .
         . . . .
         0x3e, 0x0d, 0x0a, 0x3c, 0x2f, 0x62, 0x6f, 0x64, 0x79, 0x3e,
         0x0d, 0x0a, 0x3c, 0x2f, 0x68, 0x74, 0x6d, 0x6c, 0x3e, 0x0d,
         0x0a
```

FILE CREATION PROCESS
2800

```
struct Data Datat[95] =
[
    {       BULLET_D_GIF,    "BULLET_D_GIF"},
    {         MANUAL_HTM,    "MANUAL_HTM"},
    {          WSPID_HTM,    "WSPID_HTM"},
    {          STAT1_HTM,    "STAT1_HTM"},
    {       BULLET_H_GIF,    "BULLET_H_GIF"},
    {       BULLET_P_GIF,    "BULLET_P_GIF"},
    {       BULLET_S_GIF,    "BULLET_S_GIF"},
    {       BULLET_T_GIF,    "BULLET_T_GIF"},
    {         CHANGE_HTM,    "CHANGE_HTM"},
    {          VOICE_HTM,    "VOICE_HTM"},
    {       NORMMODE_HTM,    "NORMMODE_HTM"},
    {        BRIOFFQ_HTM,    "BRIOFFQ_HTM"},
    {        CREDITS_HTM,    "CREDITS_HTM"},
    {         ISPWIZ_HTM,    "ISPWIZ_HTM"},
    {       DCALLPRM_HTM,    "DCALLPRM_HTM"},
    {           HSDN_HTM,    "HSDN_HTM"},
    {        HCPARMS_HTM,    "HCPARMS_HTM"},
    {           HISP_HTM,    "HISP_HTM"},
    {           HLAN_HTM,    "HLAN_HTM"},
    {         HMAINT_HTM,    "HMAINT_HTM"},
    {          HPCEL_HTM,    "HPCEL_HTM"},
    {       HPRIVATE_HTM,    "HPRIVATE_HTM"},
    {       HSERVICE_HTM,    "HSERVICE_HTM"},
    {       HSETPASS_HTM,    "HSETPASS_HTM"},
    {          STATS_HTM,    "STATS_HTM"},
    {       MAINTENA_HTM,    "MAINTENA_HTM"},
    {       WAITLINE_HTM,    "WAITLINE_HTM"},
    {       WAITSPID_HTM,    "WAITSPID_HTM"},
    {         NRMODE_HTM,    "NRMODE_HTM"},
    {        IWABORT_HTM,    "IWABORT_HTM"},
    {       CALLJOIN_HTM,    "CALLJOIN_HTM"},
    {            WAN_HTM,    "WAN_HTM"},
    {           IX1M_JPG,    "IX1M_JPG"},
    {          IX1MC_JPG,    "IX1MC_JPG"},
    {           IX1S_JPG,    "IX1S_JPG"},
    {          IX1SW_JPG,    "IX1SW_JPG"},
    {          IX1IW_JPG,    "IX1IW_JPG"},
    {          IX1WW_JPG,    "IX1WW_JPG"},
    {           IX1P_JPG,    "IX1P_JPG"},
    {        CONTROL_JPG,    "CONTROL_JPG"},
    {        WIZSTAT_HTM,    "WIZSTAT_HTM"},
    {        SWABORT_HTM,    "SWABORT_HTM"},
    {         LOCKED_HTM,    "LOCKED_HTM"},
    {          LOGO1_JPG,    "LOGO1_JPG"},
    {        NOTIMPL_HTM,    "NOTIMPL_HTM"}, {          ALERT_GIF,    "ALERT_GIF"},
    {        BALLGRE_GIF,    "BALLGRE_GIF"},
    {        BALLRED_GIF,    "BALLRED_GIF"},
    {         FAILED_HTM,    "FAILED_HTM"},
    {          STAT3_HTM,    "STAT3_HTM"},
    {           IX3S_JPG,    "IX3S_JPG"},
    {       HPCPARMS_HTM,    "HPCPARMS_HTM"},
    {          STAT4_HTM,    "STAT4_HTM"},
    {          STAT5_HTM,    "STAT5_HTM"},
    {        PRIVNET_HTM,    "PRIVNET_HTM"},
    {       CALLCTRL_HTM,    "CALLCTRL_HTM"},
    {            ISP_HTM,    "ISP_HTM"},
    {        PSWDSET_HTM,    "PSWDSET_HTM"},
    {          WRPSWD_HTM,   "WRPSWD_HTM"},
    {       SPSELECT_HTM,    "SPSELECT_HTM"},
    {       PCSELECT_HTM,    "PCSELECT_HTM"},
    {             PC_HTM,    "PC_HTM"},
```

```
{       WAITFIRM_HTM,   "WAITFIRM_HTM"},
{       HMANUAL_HTM,    "HMANUAL_HTM"},
{       HVOICE_HTM,     "HVOICE_HTM"},
{       CONGRATU_HTM,   "CONGRATU_HTM"},
{       ISDNCON_HTM,    "ISDNCON_HTM"},
{       SETPSWD_HTM,    "SETPSWD_HTM"},
{       MODEMNOT_HTM,   "MODEMNOT_HTM"},
{       ISDNCOK_HTM,    "ISDNCOK_HTM"},
{       OFFLNOK_HTM,    "OFFLNOK_HTM"},
{       DEFAULT_HTM,    "DEFAULT_HTM"},
{       IX3CC_JPG,      "IX3CC_JPG"},
{       IX3I_JPG,       "IX3I_JPG"},
{       IX3LC_JPG,      "IX3LC_JPG"},
{       IX3SP_JPG,      "IX3SP_JPG"},
{       CONT_JPG,       "CONT_JPG"},
{       MAINPAGE_HTM,   "MAINPAGE_HTM"},
{       ENTER_HTM,      "ENTER_HTM"},
{       HMPARMS_HTM,    "HMPARMS_HTM"},
{       FRBOTTOM_HTM,   "FRBOTTOM_HTM"},
{       HPCSEL_HTM,     "HPCSEL_HTM"},
{       FRCONTEN_HTM,   "FRCONTEN_HTM"},
{       LAN_HTM,        "LAN_HTM"},
{       IXMM_JPG,       "IXMM_JPG"},
{       PSWDOK_HTM,     "PSWDOK_HTM"},
{       PARAMOK_HTM,    "PARAMOK_HTM"},
{       SPIDOK_HTM,     "SPIDOK_HTM"},
{       ONLINEQ_HTM,    "ONLINEQ_HTM"},
{       CALLMADE_HTM,   "CALLMADE_HTM"},
{       CALLDISC_HTM,   "CALLDISC_HTM"},
{       RESETOK_HTM,    "RESETOK_HTM"},
{       STAT2_HTM,      "STAT2_HTM"},
{       FRMAIN_HTM,     "FRMAIN_HTM"},
{       (char *0,       "NULL"}

. . . .
    . . . .
    . . . .

extern char IX3LC_JPG[];
extern char IX3SP_JPG[];
extern char CONT_JPG[];
extern char MAINPAGE_HTM[];
extern char ENTER_HTM[];
extern char HMPARMS_HTM[];
extern char FRBOTTOM_HTM[];
extern char HPCSEL_HTM[];
extern char FRCONTEN_HTM[];
extern char LAN_HTM[];
extern char IXMM_JPG[];
extern char PSWDOK_HTM[];
extern char PARAMOK_HTM[];
extern char SPIDOK_HTM_JPG[];
extern char ONLINEQ_HTM[];
extern char CALLMADE_HTM[];
extern char CALLDISC_HTM[];
extern char RESETOK_HTM[];
extern char STAT2_HTM[];
extern char FRMAIN_HTM[];

extern struct Data     Datat[]:

typedef struct Data
{
        char *DataPtr;
        char *Name;
}WebData_t;
```

APPARATUS AND METHODS FOR USE THEREIN FOR AN ISDN LAN MODEM THAT PROVIDES ENHANCED NETWORK ACTIVITY

BACKGROUND OF THE DISCLOSURE

1. Field of the Invention

The invention relates to apparatus, and accompanying methods for use therein, for an ISDN LAN modem (or an aspect thereof) that is particularly, though not exclusively, suited for small user environments and which contains an internal ISDN router having a self-contained network hub for inter-connecting multiple network devices, such as workstations, to each other through a local area network (LAN) and for permitting each of those devices to gain access through the router to any one of a number of different remote networks.

2. Description of the Prior Art

Over the past decade, personal computer (PC) usage has increased substantially to the point where currently PCs have diffused into many aspects of a business organization. Coincident with this phenomena, a desire has increasingly arisen, certainly in a workplace environment, among computer users in a common organization, such as a business establishment, to readily share computer files. This desire, particularly when fueled by historically decreasing costs of network equipment, has led to an expanding number of network installations throughout the business community to facilitate file sharing and electronic communication among not only users in a common organization, but also with users at other organizations and locations. Moreover, as these costs of increasingly sophisticated PCs and network equipment continue to fall, networked computer usage is penetrating increasingly smaller organizations as the expected benefits to those organizations, such as expanded productivity, outweigh the costs associated therewith.

Moreover, the trend of increasing PC usage is not confined to business. Home usage of PCs is also rising though currently penetration of PCs into homes is still considerably less than that in the business community. Nevertheless, PC applications exist that address various needs of a family, from, e.g., traditional productivity tools, such as word processing for, e.g., home office use, to education, entertainment and to Internet access. Given this, today, it is increasingly common for a family to possess several PCs. For example, for a typical family of two spouses and two children of school age, each spouse may require his(her) own PC for business use, such as for job-related endeavors, while each child may have one PC or share a common PC, purchased for all children in the family, for, e.g., educational use, such as running teaching programs of one sort or another, Internet access, or entertainment.

If current cost and technology trends continue, PC usage should increasingly proliferate throughout businesses and families to a point of becoming rather ubiquitous and inter-connected, i.e., at least ideally and at some time in the future where most people will possess their own PC and where such PCs will become increasingly inter-networked with each other.

However, a significant obstacle to increasing PC usage and inter-networking has been the continued difficulty many individuals face when installing and configuring a PC, let alone connecting the PC to a wide area network (WAN), such as the Internet, or even implementing a simple local area network (LAN).

For many individuals, specifically those inexperienced with PCs, the task of just installing and configuring a PC itself is so daunting, particularly for so-called IBM compatible PCs, that the task often negates their desire to purchase a PC. To counter this, PC manufacturers have made and continue to make significant strides over the past few years, such as through incorporating so-called "Plug and Play" hardware and using compatible pre-loaded operating systems, such as the "WINDOWS 95" operating system (WINDOWS 95 is a trademark of the Microsoft Corporation of Redmond, Washington), to automatically detect system hardware and self-configure the PC, as well as to simplify subsequent PC use and maintenance. Unfortunately, the same can not be said for computer networks.

Installing hardware for a very simple computer network for a small number of users (henceforth referred to as a "workgroup") is relatively straightforward—typically encompassing installing a multi-port network hub and a network interface card, the latter into each PC to be networked in the workgroup, and running interconnecting cables therebetween. However, properly configuring conventional network hardware and associated software in each of the PCs is a rather tedious task—one that often frustrates even an experienced user. Consequently, many users desiring to network their computers, even for a simple network, have relegated the task of installing and properly configuring their networks, including both hardware and software components, to properly trained service organizations or consultants but at a considerable expense relative to the cost of the equipment. While a relatively large organization can afford to incur such expenses, small organizations and families can not. Accordingly, while many small business users and even home users could significantly benefit from networking their computers together as workgroups—such as through file sharing and electronic communication, the difficulty and expense associated therewith has effectively limited the penetration of computer networks into these environments.

Therefore, a need exists in the art for a computer networking device that not only implements a LAN, which permits computers to be networked together in, e.g., a workgroup, but also significantly simplifies and expedites network configuration. Such a device should ease the burden placed on the user as much as possible, preferably to a point of automatically adapting itself, without user intervention, to its current network environment. As yet, no such device exists in the art.

Furthermore and quite apart from increasing proliferation of PCs, in recent years, a number of domestic and foreign telephone companies have begun offering Integrated Service Digital Network (ISDN) services to their customers. ISDN provides an integrated voice and data network that offers both increased bandwidth and significant flexibility over traditional analog telephone services. Inasmuch as subscriber charges for ISDN access are decreasing—with the decrease being rather noticeable for some telephone companies, demand for ISDN service and equipment is rising appreciably. Demand is particularly strong and growing for those subscribers who seek cost-effective high speed access to a WAN such as, e.g., the Internet, and/or other computer networks.

In particular, a basic rate (so-called "2B+D" service) ISDN interface provides higher speed bandwidth than both traditional analog, modem-based dial-up access modalities and comparably priced switched digital services. Each so-called B ("bearer") channel, which carries subscriber voice and/or data, provides 64 Kbits/second of bandwidth; while a D ("data") channel, which carries signaling and control information, provides 16 Kbits/second of bandwidth.

For the bandwidth delivered, an ISDN line is significantly less expensive than a private leased line that supplies the same bandwidth across the three channels. Furthermore, ISDN, being a digital end-to-end service, provides digital transmission channels that tend to be more accurate and reliable, from a standpoint of error rates and dropped connections, than are conventional analog telephone connections. In addition, ISDN service provides rapid connect times which, in turn, provide faster support for those LAN protocols that require relatively short latency across WAN connections.

Starting a few years ago, various networking and communications equipment manufacturers have been offering relatively inexpensive ISDN terminal adapters, more commonly and rather loosely referred to as "ISDN modems" (though these adapters do not contain a traditional analog modulator-demodulator as occurs in a conventional analog modem), and other ISDN-based network devices, such as routers, for subscriber end-use. Such a modem, also generically referred to as "data circuit terminating equipment" (DCE), once connected to an ISDN connection and a serial port on a subscriber's PC, permits that subscriber to connect his(her) computer to, e.g., an Internet service provider and communicate at speeds approximately two to four times greater than through a conventional analog modem. The computer so connected becomes so-called "data terminal equipment" (DTE). While the availability of ISDN modems is clearly not the sole cause underlying the growth in ISDN usage, it, when combined with decreasing rates for ISDN service, is certainly a large and growing factor.

Unfortunately, currently available ISDN devices, such as routers, which connect a network, e.g., an Ethernet network, to a single ISDN connection are rather cumbersome and tedious to configure. In that regard, such a router typically contains an RS-232 serial port to which a PC is connected in order to initially configure the router. During configuration, a user at the PC, typically executing a proprietary application provided by the manufacturer of the router, assigns suitable network parameters, including an IP address and a subnet mask, to the router. Until these parameters are loaded into the router, the router is simply unable to communicate over the network to any PC connected thereto. Determining the correct value of these parameters and then completing the configuration, with all the other salient information, proved to be a rather tedious process. Furthermore, not only did the user incur a burden of installing software on the PC used to configure the router, but also the price of the router needed to reflect an added cost of the serial port, which during the life of the router is usually used just once for initial configuration.

In addition, in the event of a network fault or other condition that affects a connection to a remote LAN or WAN and/or server thereon, conventional routers do not indicate the specific nature of that fault to any local client connected to the router. This, in turn, relegates a user at that client to rely on an error message, in those instances when it is provided by the network, that is often rather cryptic at best and more often simply not provided at all. In the latter situation, the user simply waits in basically total ignorance of the fault, i.e., the fault occurs but the user receives no indication of it on, e.g., his(her) browser. Not only is the user annoyed by this type of fault handling, but also the user is forced to wait, owing to a lack of information which leads to an expectation (which later proves to be unwarranted) that the fault will resolve itself, which can be rather time-consuming and frustrating.

Moreover, it is increasingly common to find multiple users on the same network who simultaneously desire to connect to the Internet through different network service providers, e.g., one user may desire to connect to one Internet service provider (ISP) at the same time another user wants to connect to a different ISP. Unfortunately, currently available ISDN routers can not accommodate simultaneous ISDN connections by multiple PCs to different ISPs; such routers are limited to accommodating only one connection to one ISP at a time. Moreover, these routers are unable to control access, on a per PC basis, to any one of a number of multiple accounts across different network service providers.

Hence, given the increasing availability of economical ISDN connections and advantages associated with the use thereof, the computer networking device needed in the art should not only implement a LAN that serves a workgroup but also should implement an ISDN router to provide simultaneous high-speed access for the LAN through a single ISDN connection to multiple service providers, such as, e.g., different ISPs. Moreover, such a device should be easy to configure, without a need for any external software, and to reduce its price, dispense with a need for any serial or other port used solely for initial configuration.

Advantageously, such a device, which as yet does not exist in the art, should not only substantially eliminate user frustration and significantly reduce time and costs associated with establishing, configuring and using a LAN for a workgroup as well as with connecting each PC therein to a remote network service provider, but also increase the use of such LANs in small businesses and among home users to the eventual benefit of each.

SUMMARY OF THE INVENTION

The present invention overcomes the deficiencies in the art and satisfies these needs by providing an ISDN LAN modem that contains an ISDN router, with an internal multi-port hub to implement a LAN (local are network), that automatically adapts itself to a current network environment of a workstation connected thereto and then permits browser-based configuration, and accommodates several modalities of network communication not heretofore possible in a conventional router.

With respect to configuration, the LAN modem can receive configuration information directly from a workstation connected to the LAN, and specifically through, illustratively, a web browser (or other appropriate TCP/IP application, such as Telnet) executing on that workstation, advantageously without any need for any additional serial (or other) port on either the LAN modem or the workstation.

Specifically, in accordance with specific teachings of the present invention, once the workstation is connected to the hub and the browser begins executing on the workstation, the LAN modem automatically adapts itself to the current network environment of the workstation. To do so, the LAN modem will detect the Ethernet address of that workstation through packets transmitted by the workstation, determine the IP address of that workstation (either through dynamic assignment or by static address of the workstation from an ARP (address resolution protocol packet)), and then, if the workstation is using static addressing, set its own IP address and subnet mask such that the LAN modem and the workstation are on the same subnet. Once this occurs, the LAN modem and the workstation are then able to communicate over the network through the web browser. The LAN modem will then intercept any request issued by the workstation to fetch a web page and, through its own internal web server, will generate and download to the workstation, a default home page through which the user can commence configuring the LAN modem. Once configuration commences, the web server will then step the user through a succession of displayed web pages through which the user will be queried to enter salient configuration data. The web server will then extract this data from responses received from the user and then store this data, for subsequent use, in a shared database within the LAN modem.

Furthermore, the LAN modem provides additional modalities of network communication through use of an inventive multi-tiered routing hierarchy, which permits bi-directional translation between many individual private IP addresses and one shared public IP address.

Specifically, the LAN modem assigns a private IP address to each workstation that connects to the LAN. The LAN modem translates the individual private IP address of each of the workstations to a single public address assigned, e.g., either statically or dynamically, to the LAN modem by a network service provider, e.g., an Internet service provider (ISP), by accessing a source-based routing table and a host list which collectively associate the private source IP address of a particular workstation on the LAN and a network ID for the service provider to which that workstation is ultimately connected through the LAN modem. The LAN modem also translates source and destination port number fields, as needed. This IP address and port number translation assures uniqueness of a set of source/destination IP addresses, protocol ID and source/destination port numbers in packets that flow between unique client/server applications and which pass through the LAN modem so as to provide unambiguous routing in the LAN modem between all the workstations connected to the LAN modem and associated remote servers.

Consequently, through such translation, then as far as the ISP is concerned, all packet traffic involving the workstations, by virtue of their common, though shared, public IP address, appears to emanate from or be directed to a single user. Appropriate account information, such as user identification and password data, for the shared account is stored within the shared database in the LAN modem. Through this information, the LAN modem transparently establishes the connection between the workstations and the ISP without prompting any of the actual users therefor for appropriate account information. As a result of employing this inventive translated addressing technique, the LAN modem distributes (effectively de-multiplexing) individual packets emanating over a single ISDN connection from the ISP to the proper workstations on the LAN, and routes (i.e., effectively multiplexes) outgoing packets, from all such workstations having differing private IP addresses, into a common packet stream over a single shared packet connection to that ISP for subsequent transport over the remote network. Advantageously, by permitting multiple users to share a single ISP account, use of our inventive technique is likely to significantly reduce collective network access charges over what these users would otherwise incur if, as conventionally occurs, they were to gain network access through separate user accounts.

Furthermore, through use of the inventive hierarchical routing scheme, the LAN modem can simultaneously route packet traffic between multiple workstations on the LAN and different corresponding ISPs through different ISDN connections simultaneously existing between the LAN modem and those providers. In this regard, the LAN modem accommodates connections to several different user-definable network service providers, e.g., ISPs, by storing appropriate information for each such provider in a shared database, such as user account and password information, as well as network identification including network IP address, domain names and remote DNS server addresses, and employing this information to define the appropriate connections and properly route packets accordingly over these connections.

As a feature of the present invention, the LAN modem advantageously contains internal co-operating DHCP (dynamic host control protocol) and DNS (domain name system) servers that are integrated with routing and call management processes, all utilizing data stored within the shared database.

Use of the internal DNS server provides local name-to-address resolution such that, for user convenience and simplicity, each workstation on the LAN can be addressed in terms of its machine name rather than its IP address. Furthermore, the DNS server, by using the same shared database as does the DHCP server, operates transparently of any user to acquire machine names of all the workstations connected to the LAN and then provide suitable machine name to IP address resolution, as needed, for all communication between the LAN modem and these workstations as well as between any pair of workstations themselves. In addition, the DNS server given a DNS query, will determine, based on the source of the query, i.e., which specific workstation generated it, and the destination to which the query is directed (e.g., another host on the LAN as identified by the machine name of the host, the LAN modem itself or a remote network), the DNS server to which the query is to be routed and will then route the query accordingly to that server. As such, the LAN modem hides from a host the selection of the DNS server that will be used in a given instance and hence significantly simplifies the use of the DNS in each workstation connected to the LAN modem. In addition, the DHCP server provides the IP address, subnet mask and gateway and DNS server addresses to the local workstations, thereby eliminating any need for a user to manually configure and administer these items. Furthermore, any workstation is always assigned the same IP address from the DHCP server, rather than having its IP address change from session to session, as would normally occur with dynamic IP addressing. Consequently, a user profile associated with each workstation can be easily maintained and identified using its host IP address, and the number of workstations that are simultaneously allowed to use the LAN modem can be very easily controlled.

As another feature of the present invention, the LAN modem assures the integrity, to a substantial degree, of executing program code stored within volatile memory, e.g., DRAM (dynamic random access memory), within the LAN modem, thereby advantageously preventing to a significant extent code corruption and improper operation of the LAN modem. Flash memory, by virtue of its non-volatility, stores executable program code for the LAN modem. Upon a system reset, the executable code is written into DRAM, which provides markedly faster access time over the flash memory, from which the code is then executed.

Specifically, while the LAN modem is idling, a preemptable background process executes with, e.g., a low execution priority, to continually compare the entire executable program code stored in the DRAM, on a location-by-location basis, with that stored in the flash memory. In the event a discrepancy is detected, the contents of a location in flash memory are copied to a corresponding location in the DRAM to eliminate the discrepancy, thereby maintaining the integrity of the executable code stored in the DRAM. Integrity of the code stored in the flash memory is assured by restricting any change in the mode of the flash memory from read-only to read/write through use of a key-based software lock.

As an additional feature of the present invention, the LAN modem contains an internal web server that, in addition to storing full web pages, constructs web pages in real-time from a predefined stored web page template by selectively inserting, e.g., event-specific, code segments therein. Illustratively, this insertion occurs by substituting such a segment(s) for a corresponding so-called "placeholder(s)" that appears in the template. These segments can represent dialog boxes, graphics, predefined textual messages or, generically speaking, any object, whether implemented through HTML or otherwise, that is to be, e.g., selectively presented to a user either for display and/or to solicit a response, such as an item of data or a selection among a list of predefined data values, from the user. Since relatively few full web pages are stored, memory requirements to store the underlying data to support the web server advantageously become rather modest. Illustratively, and in the context of the LAN modem, these web pages are used to query a user situated at any workstation on the LAN to enter information needed to configure the LAN modem, as well as to display a specific nature and cause, if known, of a detected fault condition so that an affected user situated at any such workstation can take appropriate action.

BRIEF DESCRIPTION OF THE DRAWINGS

The teachings of the present invention can be readily understood by considering the following detailed description in conjunction with the accompanying drawings, in which:

FIG. 4A depicts an overall block diagram of software that is executed by central processing unit (CPU) 330, shown in FIG. 3, situated within the inventive LAN modem;

FIG. 5 depicts interaction, in terms of predominant inter-process communications, that occurs within software 400 shown in FIG. 4B for setting up an ISDN call based on traffic on the local area network (LAN);

FIG. 6 depicts interaction, in terms of predominant inter-process communications, that occurs within software 400 shown in FIG. 4B for setting up an ISDN call based on a DNS (domain name system) request from a workstation (host) on the LAN;

FIG. 7 depicts interaction, in terms of predominant inter-process communications, that occurs within software 400 shown in FIG. 4B for processing an incoming ISDN call to the LAN modem;

FIG. 8 depicts interaction, in terms of predominant inter-process communications, that occurs within software 400 shown in FIG. 4B for disconnecting an ISDN call as a result of an idle timeout condition;

FIG. 9 depicts the correct alignment of the drawing sheets for FIGS. 9A–9C;

FIGS. 9A–9C collectively depict a flowchart of Initial Configuration procedure 900 performed by CPU 330;

FIG. 10 depicts the inventive source-based routing architecture used in the LAN modem;

FIG. 11 depicts a flowchart of Primary Router procedure 1100 shown in FIG. 10 and performed by CPU 330;

FIG. 12 depicts the correct alignment of the drawing sheets for FIGS. 12A–12D;

FIGS. 12A–12D collectively depict a flowchart of Secondary Router procedure 1200 also shown in FIG. 10 and performed by CPU 330;

FIG. 13A depicts the structure of host list 1300 including its constituent data fields and their initial entries, contained within database 416 stored within flash memory 376 shown in FIG. 3;

FIG. 13B depicts the structure of network service provider list 1350 including its constituent data fields also contained within database 416 stored in flash memory 376 shown in FIG. 3;

FIG. 13C depicts the structure of Destination-Based Routing Table 432, including its initial values, stored within DRAM 372 shown in FIG. 3;

FIG. 13D depicts the structure of Source-Based Routing Table 446 which is also stored within DRAM 372 shown in FIG. 3;

FIG. 14 depicts a flowchart of DHCP Induced IP Address Request procedure 1400 performed by CPU 330;

FIG. 15 depicts the correct alignment of the drawing sheets for FIGS. 15A–15D;

FIGS. 15A–15D collectively depict a flowchart of DNS Induced IP Address Request procedure 1500 that is also performed by CPU 330;

FIG. 19 depicts a flowchart of Static Page Processing operation 1830 that is performed by web server 412 shown in FIG. 18;

FIG. 20 depicts a flowchart of Dynamic Page Formation operation 1840 that is also performed by web server 412 shown in FIG. 18;

FIG. 21 depicts a flowchart of Post Processing operation 1850 that is also performed by web server 412 shown in FIG. 18;

FIG. 22 depicts code 2200 for an illustrative inventive web page template, and specifically one employed in conjunction with an ISP Wizard used in the LAN modem;

FIG. 23 depicts a page, as would be rendered on a workstation display, in response to HTML code 2200 shown in FIG. 22;

FIG. 24 depicts, in block diagram form, inventive process 2400 for forming a web page from a web page template and page components, and illustratively for a web page used in conjunction with the ISP Wizard;

FIG. 25 depicts HTML code 2500 for a specific web page that results from use of process 2400 and template HTML code 2200 for a specific event, e.g. a failure to establish a connection to an Internet service provider (ISP);

FIG. 30 depicts the correct alignment of the drawing sheets for FIGS. 30A–30B;

FIGS. 30A–30B collectively depict source code for data structure 3000 containing, in accordance with the present inventive teachings, various entries each having, for either an illustrative web page template or an illustrative web page component, a pointer and a corresponding name; and FIG. 31 depicts actual object code for a document array, e.g., FRMAIN_HTM[], containing a corresponding illustrative predefined web page component, as stored in structure 3000.

To facilitate understanding, identical reference numerals have been used, where possible, to designate identical elements that are common to various figures.

DETAILED DESCRIPTION

After considering the following description, those skilled in the art will clearly realize that the teachings of the present invention can be readily utilized in substantially any ISDN data circuit terminating equipment (DCE) which interfaces an ISDN line to nearly any form of computer network, regardless of the type of network. In that regard, the ISDN line can be, e.g., a basic rate (2B+D) interface (BRI) or a primary rate (23B+D or 30B+D) interface. Moreover, the network can be illustratively Ethernet, Token Ring, asynchronous transfer mode (ATM), frame relay or other type of network—with the actual network modality being irrelevant to the present invention. In addition, these teachings are also applicable across a wide variety of remote network connection modalities, not just ISDN. In that regard these modalities can illustratively range from, e.g., analog telephone connections using conventional modems, through high-speed digital connections such as ATM or frame relay. Inasmuch as Ethernet networks are the predominant network architecture used in inter-connecting personal computers (PCs) in a local area network, and particularly those for implementing as workgroups, to simplify the discussion, the invention will be discussed in that context. Moreover, since a basic rate type ISDN interface is often used to provide a remote network connection for individual subscribers and small businesses, we will also discuss our invention in the context of its use with such an interface. Clearly, after considering this discussion, those skilled in the art will readily appreciate how to use our invention with any of a wide range of differing types of computer networks and to modify the inventive teachings, as necessary, to conform to the requirements of the specific network being used, as well as to conform use of the present invention with another type of ISDN interface, or different connection modality, to a remote network.

A. Overall network environment

Figure 1:
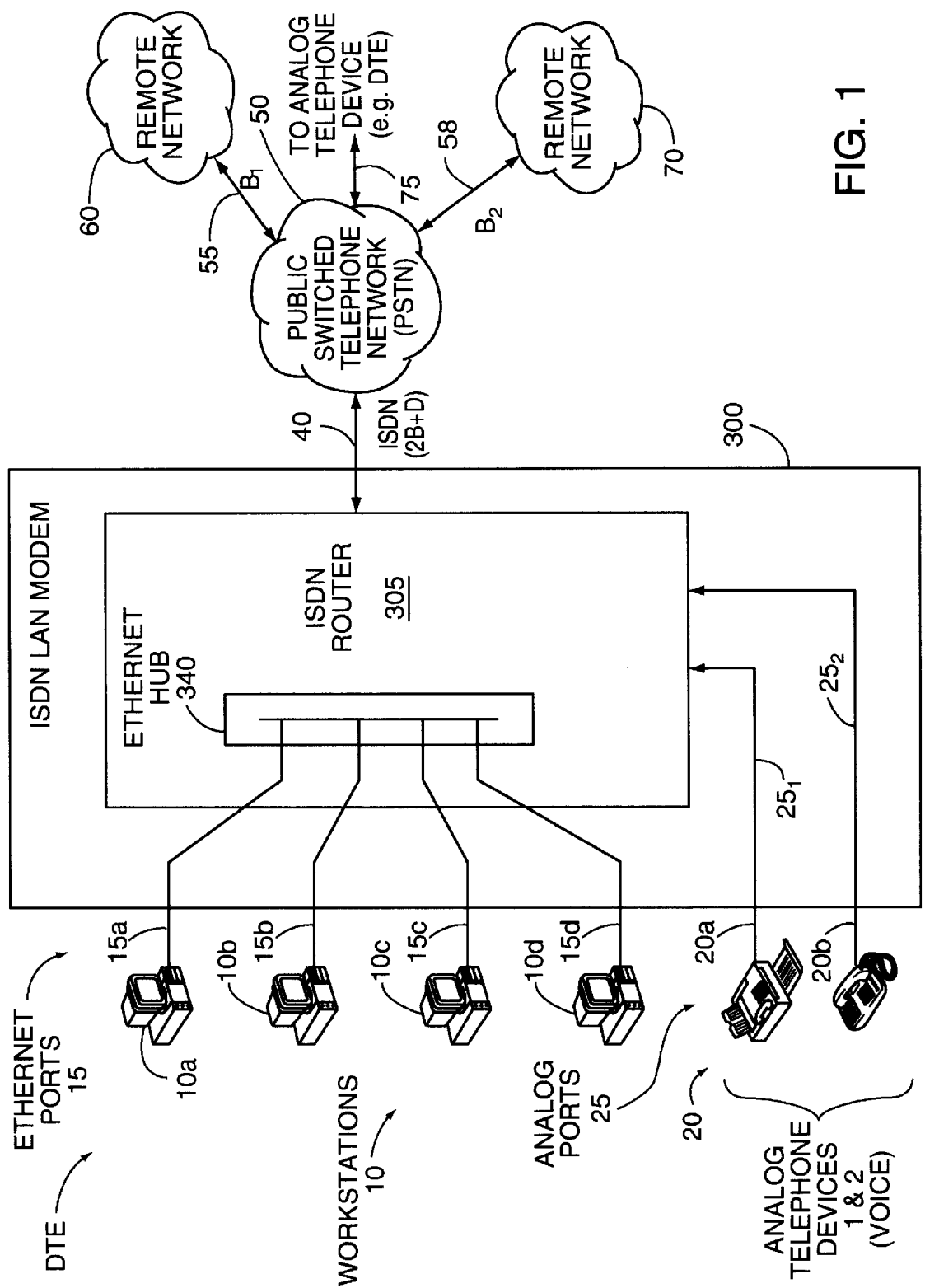
FIG. 1 depicts an overall high-level block diagram of inventive LAN modem 300 in its typical environment of use.

FIG. 1 depicts an overall high-level block diagram of the inventive local area network (LAN) modem 300 in its typical environment of use. Though LAN modem 300 does not contain a traditional analog modulator-demodulator as occurs in a conventional analog modem, for ease of reference, this device will nevertheless be referred to as a "LAN modem" inasmuch as it provides the general functionality associated with a modem of connecting a workstation to an external computer network, though here through an ISDN, rather than an analog POTS (plain old telephone service), connection.

As illustrated, LAN modem 300 inter-connects a group of workstations (also referred to herein as "hosts") 10, illustratively here four individual workstations (typically personal computers—PCs) $10_a$, $10_b$, $10_c$ and $10_d$, in an Ethernet local area network. To implement the LAN, LAN modem 300 contains ISDN router 305 which itself contains an internal, here illustratively 10 Mb/second 10BaseT, Ethernet hub 340 which connects through ports 15, specifically $15_a$, $15_b$, $15_c$ and $15_d$, to workstations 10.

The router establishes an ISDN connection through BRI ISDN connection 40 and public switched telephone network (PSTN) 50 to appropriate remote networks 60 and/or 70, such as the Internet or a private network, accessible through a corresponding service provider, or a remote LAN, such as an office network. Inasmuch as router 305, as discussed in detail below, can accommodate, in one of its operational modalities (as discussed below in conjunction with FIG. 2B), two simultaneous connections, over different B channels (here shown as $B_1$ and $B_2$) in a common BRI ISDN connection, to two different external networks, these connections are symbolized by leads 55 and 58 connecting remote networks 60 and 70 over channels $B_1$ and $B_2$, respectively.

Apart from routing ISDN packet traffic, via PSTN 50, between any of workstations 10 and a remote network(s), LAN modem 300, specifically ISDN router 305 therein, can also accommodate two analog telephone devices 20 (here illustratively shown as facsimile machine $20_a$ and telephone $20_b$, and also denoted as analog telephone devices 1 and 2, respectively) appropriately interfaced, via ports 25, to analog lines $25_1$ and $25_2$. In that regard, the LAN modem can bi-directionally route f digitized voice traffic on either or both B-channels of ISDN connection 40 between PSTN 50, and specifically, to either one or simultaneously to both of analog telephone devices 20, respectively.

B. Modalities of use of inventive LAN modem

Figure 2A:
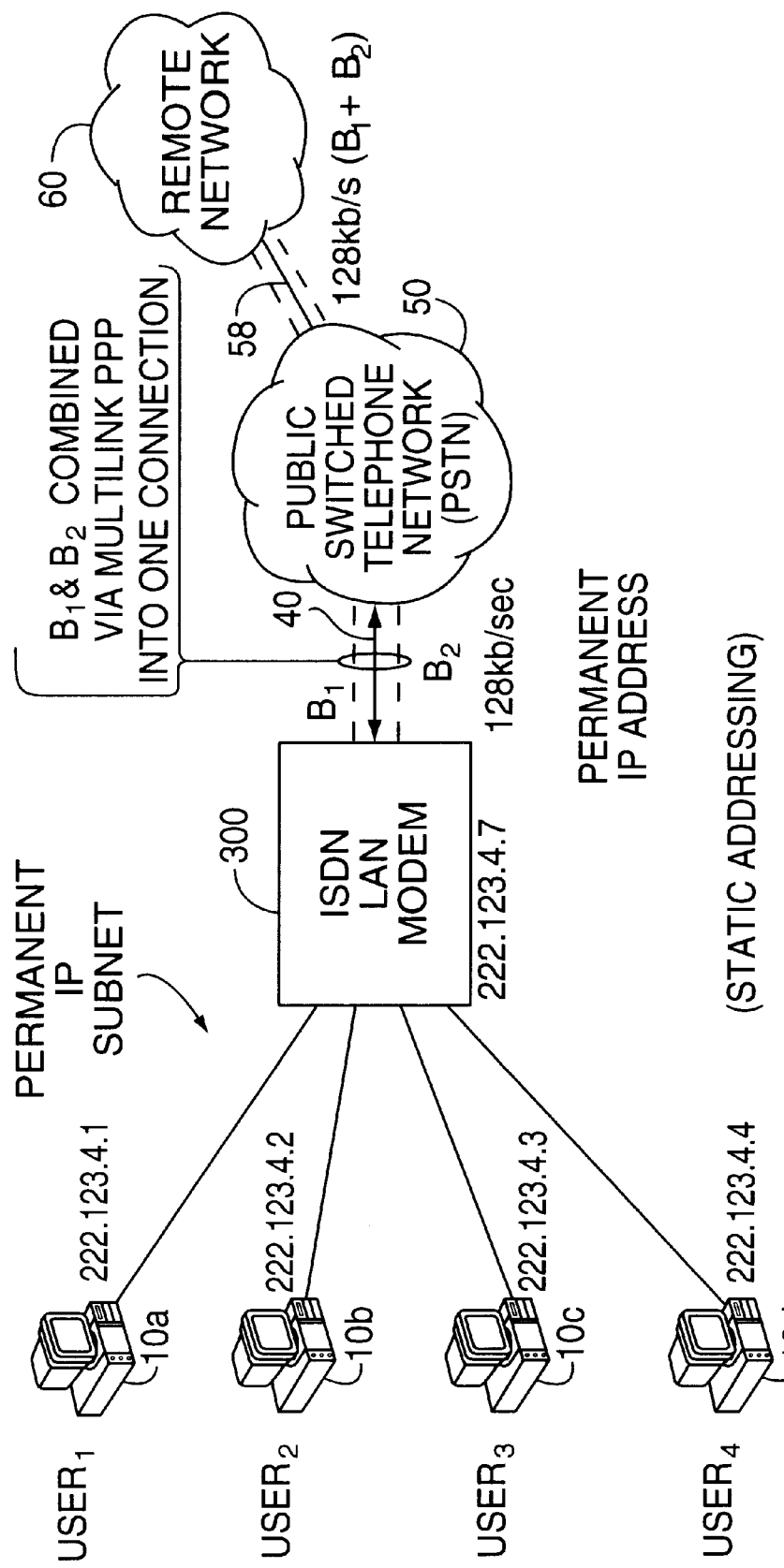
FIGS. 2A–2C each depicts a different illustrative mode of operation which inventive LAN modem 300, shown in FIG. 1, can provide.
Figure 2B:
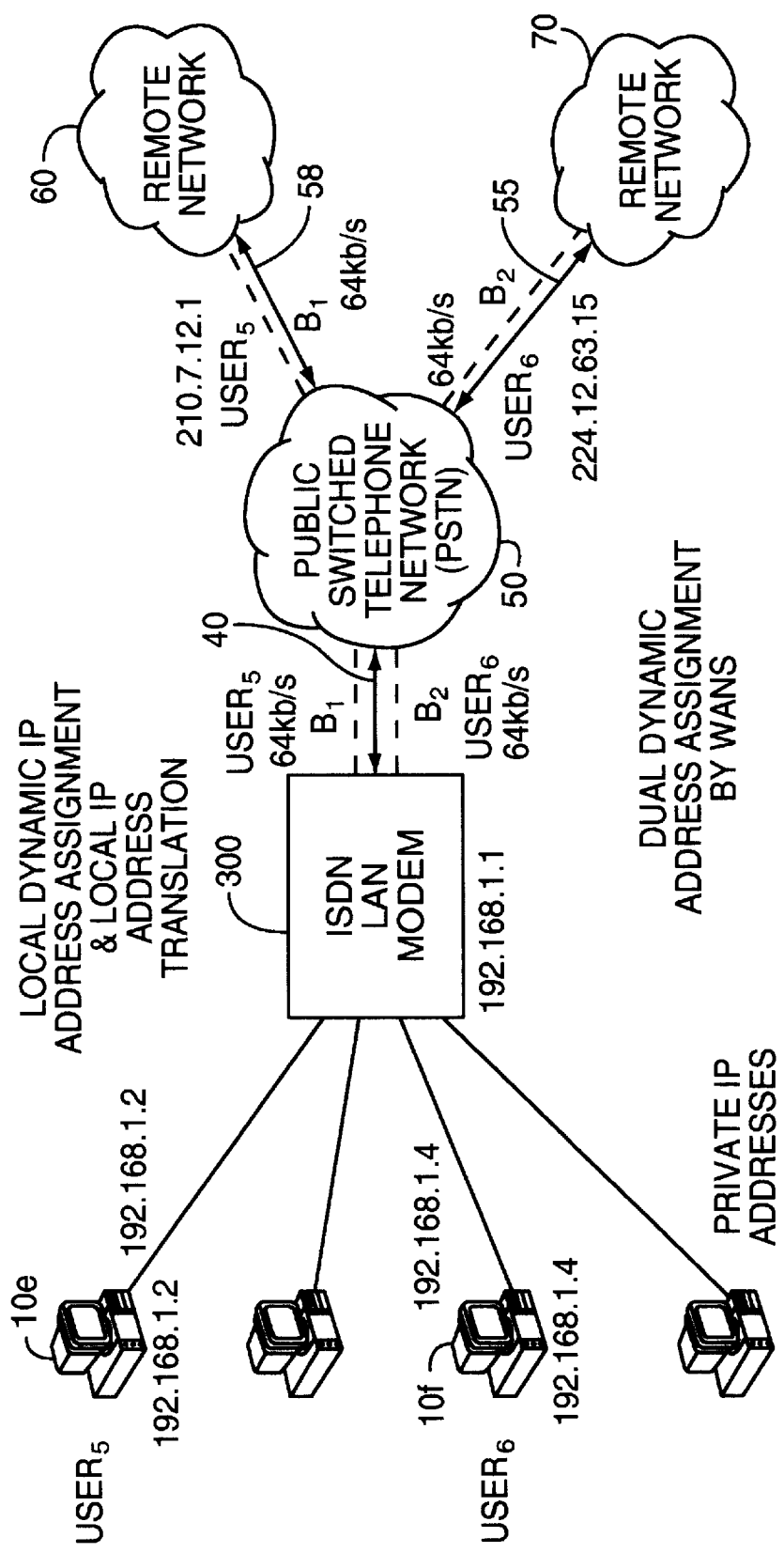
Figure 2C:
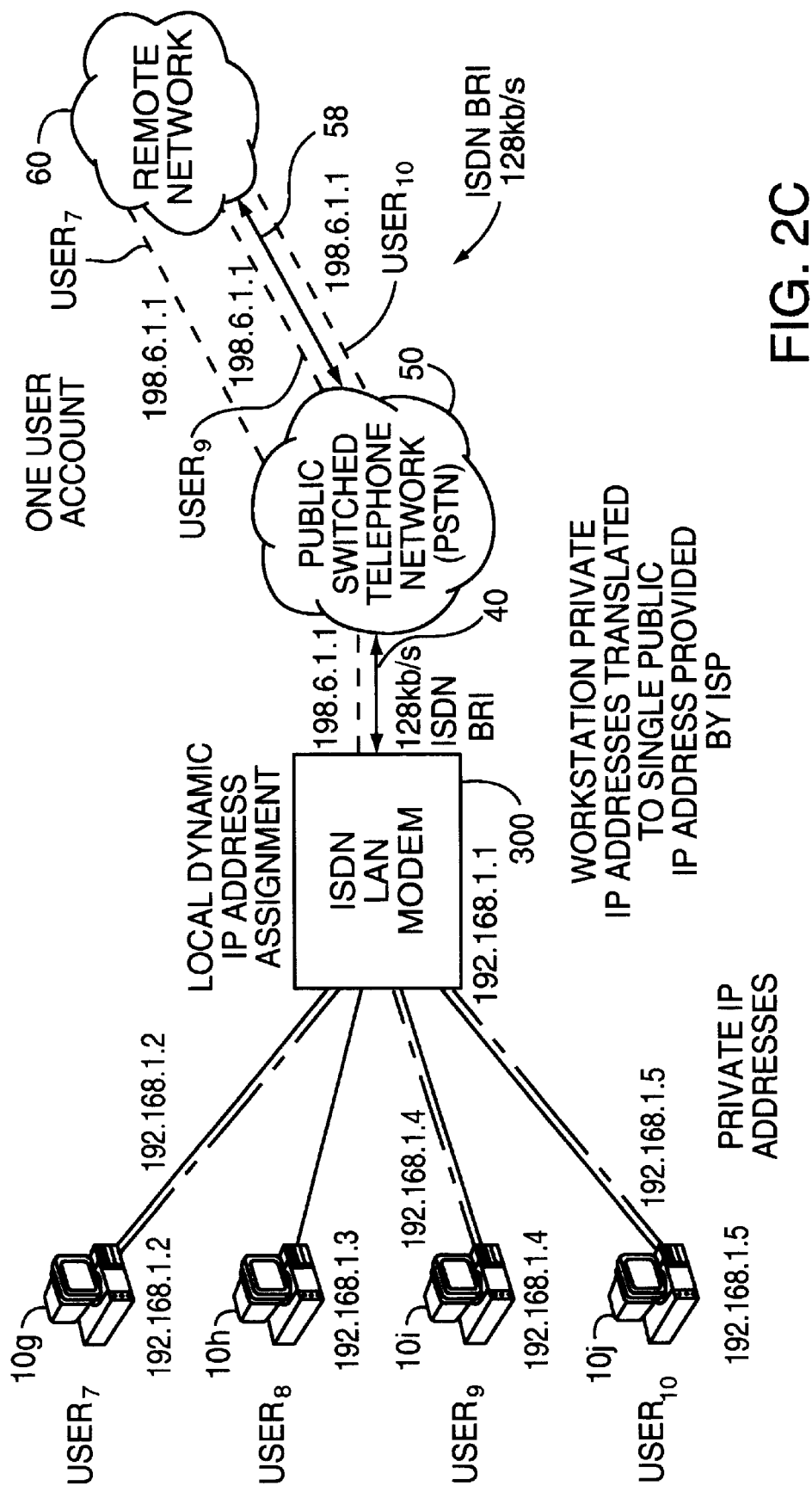

Inventive LAN modem 300 can function in a variety of different network modalities, as shown, e.g., in FIGS. 2A–2C. Generally speaking, in accordance with our invention, LAN modem 300 can: operate in a true routing mode using either dynamic or static IP (internet protocol) addressing for all the workstations on the LAN; provide two simultaneous connections, as discussed above, for two different workstations on the LAN, over separate B-channels of a common ISDN connection, to different corresponding remote networks; and provide simultaneous access for any or all workstations on the LAN to a common service provider, such as an internet service provider (ISP), through a single user account.

FIG. 2A depicts LAN modem 300 operating as a true router, using illustratively static IP addressing. Here, workstations $10_a$, $10_b$, $10_c$ and $10_d$ have all been assigned static IP addresses, illustratively 222.123.4.1, 222.123.4.2, 222.123.4.3 and 222.123.4.4, respectively, with LAN modem 300 carrying static IP address 222.123.4.7. Given these addresses, all the workstations and the LAN modem are on the same statically assigned subnet. Consequently, LAN modem 300 will examine packets on the LAN that carry an Ethernet address of the LAN modem and emanating from any of the workstations to determine, from the destination IP address of the packet, whether that packet is destined for a local application, (as discussed below) executing on the LAN modem, or is to be routed off the LAN to a remote network. If the destination address indicates a different network, here illustratively remote network 60, or a different subnet, then the LAN modem establishes an ISDN connection through PSTN 50 to a service provider for illustratively remote network 60 and then routes the packet accordingly to that remote network. LAN modem 300 also examines all packets incoming from remote network 60 and routes all such packets destined for any of the workstations on the static subnet to the LAN.

In establishing the ISDN connection, the LAN modem can be configured to utilize multi-link PPP (point-to-point protocol) in establishing the connection. Assuming this protocol is supported by the service provider, then, based on the amount of packet traffic which is to be carried over the connection at any time and hence the required transmission bandwidth therefor, either one or, as shown, both B channels ($B_1$ and $B_2$ for a total available bandwidth of 128 Kbits/second) will be used to carry this traffic, via ISDN lines 40 and 58, among LAN modem 300, PSTN 50 and the service provider (not specifically shown) for remote network 60. Through use of multi-link PPP, the number of B channels that carry this traffic at any one time will dynamically vary between one and two based on traffic loading then occurring. LAN modem 300 can also be configured to dynamically assign an available IP address within the subnet assigned to the LAN modem (hence providing dynamic IP addressing) to each of the workstations as a corresponding user, i.e., $User_1$, $User_2$, $User_3$ or $User_4$, logs onto the LAN network.

Alternatively, as noted above and depicted in FIG. 2B, LAN modem 300 can provide two simultaneous connections for two different workstations in the LAN, over separate B-channels (each providing 64 Kbits/second of bandwidth) of a common ISDN connection, to different corresponding remote networks. Here, assume that within a workgroup, $User_5$ and $User_6$ stationed at respective workstations $10_e$ and $10_f$ have different user accounts at different ISPs (Internet service providers), here symbolized by remote networks 60 and 70, respectively, and desire to access the Internet during the same time through these different ISPs.

Illustratively, for $User_5$ and $User_6$, LAN modem 300 will establish a single B-channel connection, as symbolized by line 58, over B-channel B1, to remote network 60, and as symbolized by line 55, over B-channel $B_2$, to remote network 70, respectively.

Furthermore, in this scenario, as each user logs onto the LAN through a corresponding workstation ($10_e$ or $10_f$), LAN modem 300 dynamically assigns an available private IP address to the workstation for that user. Accordingly, workstations $10_e$ and $10_f$ are assigned private IP addresses 192.168.1.2 and 192.168.1.4, respectively; with LAN modem 300 having private IP address 192.168.1.1. The LAN modem maintains a list of private IP addresses available for local use by workstations (or other networked devices) connected to the LAN. None of these private addresses is ever routed beyond the LAN. As the user logs onto the LAN and establishes a connection through LAN modem 300 to his(her) ISP, that ISP will dynamically assign an IP address to that user. The dynamic public IP addresses assigned to $User_5$ and $User_6$ are, e.g., 210.7.12.1 and 234.12.63.15, respectively. Each of the dynamic IP addresses will be stored within the LAN modem (particularly within a shared database therein as discussed below in detail). As incoming packets containing these dynamic IP addresses are routed by the ISPs, over the different B channels, to LAN modem 300, the LAN modem, in essence, will translate the dynamic public IP address contained in each such packet to the private IP address of the corresponding workstation and route the packet, but containing the translated address as the destination IP address, to the LAN. Similarly, for packets appearing on the LAN which, based on their destination IP addresses, are to be routed by the LAN modem to either of the ISPs, the LAN modem, in essence, will translate the source IP address in each of these packets from the private IP address into the appropriate public dynamic IP address of the associated workstation, substitute the translated IP address for the private IP address in each such packet, and then route that packet accordingly to the proper remote network. Though this scenario has been described as using dynamic IP addressing for both of the workstations, i.e., with addresses being dynamically assigned by both the remote networks involved and the LAN modem, one or both of the workstations can alternatively be statically addressed using fixed public IP addresses. Moreover, though this example depicts merely one workstation connected to each ISP, the LAN modem, as will be clear in conjunction with the scenario depicted in FIG. 2C, can share a common connection to an ISP across multiple workstations.

In addition, as noted above and depicted in FIG. 2C, LAN modem 300 can provide simultaneous access for any or all workstations in the LAN to a common service provider, such as a single ISP, through a single account. Here, assume that within a workgroup, illustratively $User_7$, $User_9$ and $User_{10}$ respectively stationed at workstations $10_g$, $10_i$ and $10_j$ all desire to access, e.g., the Internet through a single user account at a common ISP, here symbolized by remote network 60.

As each of the three users logs on to the LAN through his(her) corresponding workstation, LAN modem 300 dynamically assigns an available private IP address to the corresponding workstation for that user. Accordingly, workstations $10_g$, $10_i$ and $10_j$ are assigned illustrative private IP addresses 192.168.1.2, 192.168.1.4 and 192.168.1.5; with LAN modem 300 itself having private IP address 192.168.1.1. While the first of these three users initiates a connection to remote network 60, via the common ISP, the ISP dynamically assigns an IP address, illustratively 198.6.1.1, to that workstation. IP address translation will occur as described above. In many instances, though not specifically shown here, both port number fields (as discussed below) and IP addresses will be translated. Such IP address and port number translation, when required, assure proper uniqueness between a set of source/destination IP addresses, protocol IDs and source/destination port numbers in packets flowing between unique client/server applications and which pass through the LAN modem. This, in turn, provides unambiguous routing in the LAN modem between all the workstations connected to the LAN modem and associated remote servers.

Specifically, for incoming packets traversing from remote network 60 to workstation $10_g$ via the LAN modem, LAN modem 300 will translate the dynamic public IP destination address in each such packet into the corresponding private IP address, substitute the latter for the former in each such packet and then transmit the resulting packet onto the LAN, from which workstation $10_g$ will receive that packet. For outgoing packets from this workstation appearing on the LAN and destined for remote network 60, LAN modem will translate the private IP address in that packet, as its source address, to the corresponding public IP address, substitute the latter for the former in the packet and then route the resulting packet via ISDN connection 40 to remote network 60. As the other two users each establishes a separate connection through their workstations $10_i$ and $10_j$, via the LAN modem, to the same ISP, LAN modem 300, using our inventive source-based routing technique—which is described in detail below, will recognize the same network address of the ISP in packets emanating from these two workstations, translate their differing private IP addresses to the same public IP address associated with workstation $10_g$. Through our inventive addressing technique, all packet traffic, as symbolized by dashed lines, for these three workstations will share a single common public IP address, here illustratively 198.6.1.1, and traverse a common ISDN connection, here symbolized by lines 40 and 58, among the LAN modem, PSTN 50 and remote network 60. LAN modem 300 will provide suitable IP address translation, as discussed above, between the individual private IP addresses of each of the three workstations and the single public address dynamically assigned to first workstation by the ISP. Consequently, as far as the ISP is concerned, all packet traffic involving the three workstations will appear, by virtue of their common, though shared, public IP address, to emanate from or be directed to a single user. Appropriate account information, such as user identification and password data, for the shared account is stored within LAN modem 300 such that the LAN modem can transparently establish the connection between the workstation(s) and the ISP without prompting any of the actual users therefor. As a result of employing this inventive addressing technique (utilizing IP address and where required, port number translation), individual packets emanating over a single ISDN connection from the ISP for remote network 60 can be distributed on the LAN to the proper workstation and to a proper application or process executing thereon; while outgoing packets, from all such workstations, initially having differing private IP addresses can be subsequently routed into a common packet stream over a single shared packet connection to that ISP for subsequent transport over remote network 60. Advantageously, by permitting multiple users, here, e.g., three such users, to share a single ISP account—which generally incurs a flat-rate charge regardless of actual connection time, use of our inventive technique is likely to significantly reduce collective network access charges by a factor of, e.g., ⅔ over what these users would otherwise incur if, as conventionally occurs, they were to gain network access through three separate user accounts. Here too, though this scenario has been described as using dynamic IP addressing of the workstations, i.e., with addresses being dynamically assigned by the LAN modem and the address of the LAN modem itself being dynamically assigned by the ISP, one or more of the workstations or the LAN modem can alternatively be statically addressed using fixed public IP addresses.

C. Detailed discussion of inventive LAN modem

Figure 3:
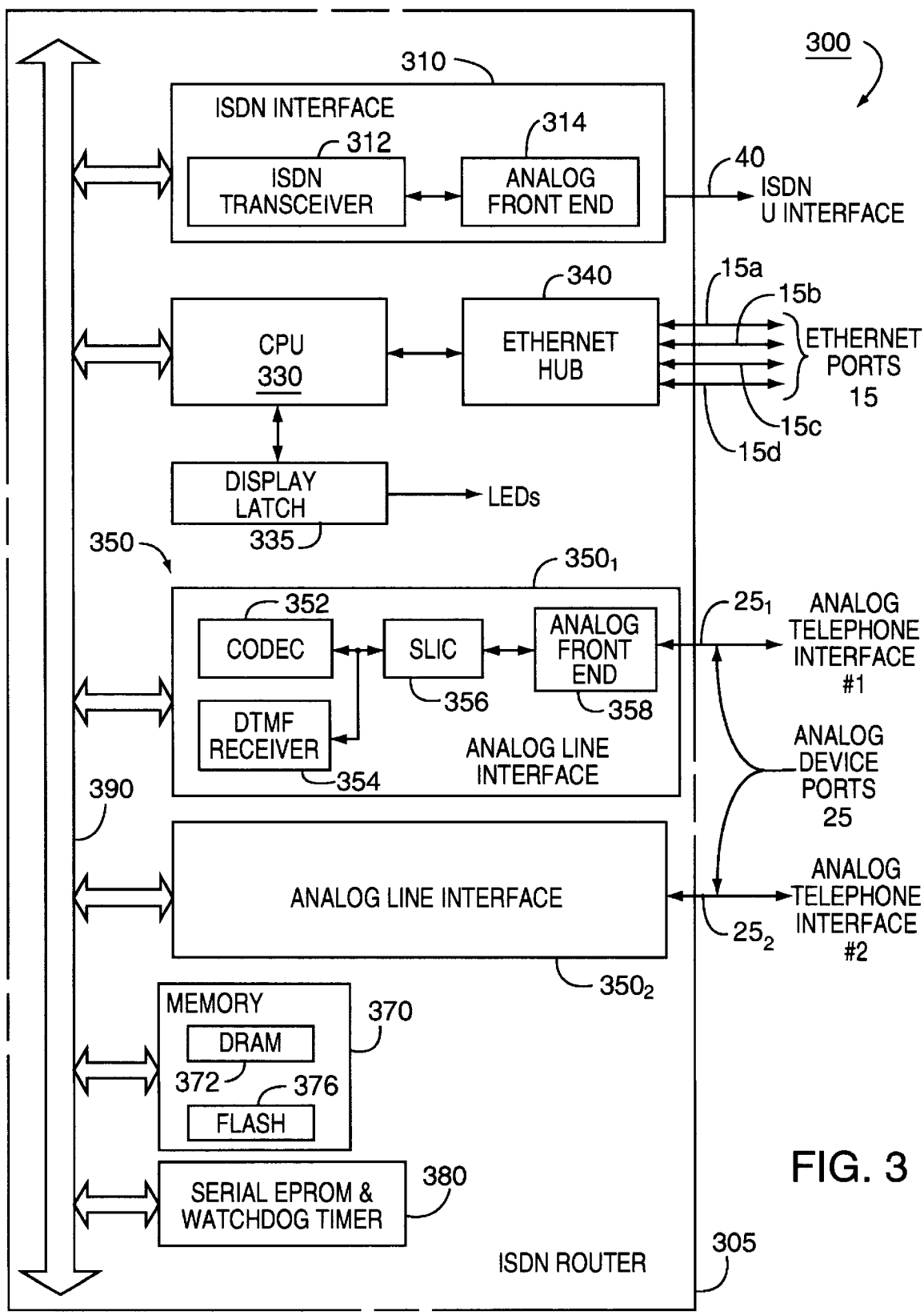
FIG. 3 depicts a hardware block diagram of inventive LAN modem 300 shown in FIG. 1.

With the above in mind, the discussion will proceed to describe, with reference to FIG. 3, the hardware of LAN modem 300 in detail, followed by the software. To simplify reader understanding, the software will then be described first with reference to FIGS. 4A and 4B, in terms of its overall architecture; followed by a description, then with references to FIGS. 5–8, of the interaction that occurs among several software processes for implementing various operations performed by the inventive LAN modem; and concluding with a description, with reference to various remaining figures, of the implementation, typically involving several of the software processes shown in FIGS. 4A and 4B, of various aspects of the inventive LAN modem.

1. Hardware

FIG. 3 depicts a block diagram of inventive LAN modem 300. As shown, the LAN modem contains ISDN router 305.

ISDN router 305 contains ISDN interface 310, central processing unit (CPU) 330; analog line interfaces 350 containing identical analog line interfaces $350_1$ and $350_2$; memory 370; and serial EPROM (electrically programmable read only memory) and watchdog timer 380; all of which are interconnected through bus 390. In addition, the ISDN router also contains display latch 335 and Ethernet hub 340. Furthermore, the LAN modem also contains conventional power supply, combinatorial logic and clocking circuits which, for simplicity, have all been intentionally omitted from the figure.

Memory 370, which illustratively comprises dynamic random access memory (DRAM) 372 and flash memory 376, stores software instructions—the salient software processes and modules being discussed in detail below, constants and temporary data all used by the CPU. The flash memory provides non-volatile program and constant storage. Inasmuch as DRAM provides faster access than flash memory, during a power-on boot phase, the boot program is executed to load the executable program code into DRAM, from which the program code is then executed. As will be discussed in detail below, to prevent errant execution, while the LAN modem is idling, a preemptable background process executes with, e.g., a lowest execution priority (specifically Firmware Assurance Manager process 1700 which will be discussed below in conjunction with FIG. 4A and in detail in conjunction with FIG. 17) to continually compare the entire executable program stored in the DRAM, on a location-by-location basis, with that stored in flash memory to assure integrity of the former. In the event a discrepancy is detected, the contents of a location in the flash memory are copied to a corresponding location in the DRAM to eliminate the discrepancy. A portion of the flash memory is also used to store and provide access to so-called "Stac" data compression tables for use in implementing B-channel data compression. Inasmuch as so-called "Stac" compression itself is well-known, we will not discuss the Stac compression algorithm itself in any further detail. Furthermore, the DRAM also stores source- and destination-based routing tables; these tables are discussed in considerable detail below. Integrity of the program code stored in the flash memory is assured, as described in detail below, through a key-based software lock which strictly limits those instances where write-access is permitted to the flash memory.

CPU 330 is implemented by illustratively a 68EN302 central processing unit (CPU) platform which is currently commercially available, as a single integrated circuit, from Motorola Corporation of Schaumberg, Illinois. This platform provides, inter alia, a core 68000-type microprocessor, internal RAM, various timers, a reduced instruction set (RISC) controller and an Ethernet controller (all of which is not explicitly shown). CPU 300 also contains three HDLCs (high-level data link controllers—also not specifically shown), each of which is allocated by the CPU, under program control, to a different one of the 64 Kbits/second B-channels or the 16 Kbits/second D-channel to control data transmission and reception thereover. These HDLCs along with ISDN interface 310 collectively implement, in hardware, an ISDN BRI, specifically all ISDN layer 1 functionality. ISDN interface 310 is conventional and contains ISDN transceiver 312 and analog front end 314, the latter containing a transformer, common mode choke, transient suppressor, ferrite beads, diode bridge and an ISDN DC termination circuit—all of which are not specifically shown. In essence, the termination circuit provides a polarity insensitive dc termination for loop-sealing current and a recognizable signature for mechanized loop testing systems. Interface 310, specifically transceiver 312 therein, bi-directionally passes, i.e., receives and transmits, incoming and outgoing B and D-channel packets between analog front end 314 and, via bus 390, CPU 330. The output of interface 310 is connected, via leads 40, to an ISDN BRI subscriber line. Display latch 335, which is connected to CPU 330, is set by the CPU, under program control, to appropriately energize suitable front panel indicators, specifically light emitting diodes (LEDs), on the LAN modem to indicate its current operational status.

Analog line interfaces 350, which contain identical interfaces $350_1$ and $350_2$, are used to interface LAN modem 300 to analog device ports 25, and particularly to two standard analog telephone devices, via output leads $25_1$ and $25_2$ (each having a tip and ring pair "T/R"), each terminating in a conventional RJ-11 jack (not specifically shown). Each interface, of which interface $350_1$ is typical and will be specifically discussed, interfaces LAN modem 300, particularly ISDN router 305 therein, to a corresponding one of two analog telephone devices, connected via leads $25_1$ and $25_2$. In particular, interface $350_1$ contains codec (coder-decoder) 352, dual-tone multi-frequency (DTMF) receiver 354, subscriber loop interface circuit (SLIC) 356 and analog front end 358. Codec 352 converts B-channel digital data appearing on bus 390 and destined for, e.g., an analog telephone device (such as, e.g., a telephone or facsimile machine) connected to leads $25_1$, into a conventional analog telephony form. Analog front end 358 contains a conventional analog hybrid circuit, not specifically shown, which injects appropriate analog tones into tip and ring lines of an analog telephone device port, and provides echo cancellation and battery feed functions. DTMF receiver 354 collects DTMF tones appearing on the analog line, e.g., line $25_1$, connected to the interface and applies the tones to SLIC 356. The SLIC provides conventional analog telephony (POTS—plain old telephone service) functions of: DC battery feed, overvoltage, ringing, two-wire supervision, two-to-four wire hybrid, and test functions, as well as current limiting, on-hook transmission, tip-open and loop-current protection.

Each HDLC controller has an associated software-implemented device driver. Under an event-driven software-implemented supervisor, CPU 330, in view of current resource requests and then available hardware resources, assigns and binds a given controller and its associated driver to a particular hardware resource in order to either handle a desired ISDN connection (e.g., call send or receive) or, e.g., dynamically switch the functionality of a given B-channel to handle a voice call (or revert back to a data connection) during an on-going ISDN connection.

Within serial EPROM and watchdog timer 380, the Ethernet address of the LAN modem itself, and other fixed configuration information such as a serial number of the LAN modem, is stored within the EPROM and serially read therefrom during initialization of the LAN modem. The watchdog timer is periodically reset, under program control, by the CPU. However, should the timer not be reset in the event of a failure condition, the timer will time-out and generate a suitable pulse to reset and re-initialize the CPU and hence the LAN modem, and thus attempt to return the LAN modem to its proper operation.

ISDN router 305 also contains 10Mbit/second 10baseT Ethernet hub 340, which is illustratively implemented by a single integrated circuit, to provide an internal LAN with external Ethernet ports 15. This hub is directly connected to CPU 330 and is controlled by the Ethernet controller internal to the CPU. Hub 340 provides four Ethernet ports 15, specifically Ethernet ports $15_a$, $15_b$, $15_c$ and $15_d$, to which four separate workstations 10 (see FIG. 1) (or other suitable network devices) can be connected. Though in this embodiment, hub 340 is sized to accommodate four Ethernet devices, larger hubs can be used to accommodate additional Ethernet ports, as desired. The routing tables, host lists and network service provider lists as well as other aspects of the software, all being described in detail below, would need to be suitably modified to accommodate an increased number of workstations; however, the manner of doing so would be readily apparent to those skilled in the art.

2. Software Architecture

Given the above hardware description of LAN modem 300, we will now focus on describing the software. The reader should now refer to FIG. 4A which depicts a high-level diagram of the overall software that executes in the LAN modem.

As shown, this software, stored in memory 370, contains operating system (O/S) 4010 and application programs 4020. Inasmuch as details of the operating system are not relevant to the present invention, all such details will be omitted from the ensuing discussion.

Application programs 4020 are formed of a collection of application processes and modules, most of which execute with relatively high priority—and are grouped as application software 400 shown in FIG. 4A, but with one, Firmware Assurance Manager process 1700, that is fully preemptable and executes at a relatively low, e.g., lowest, priority level. Hence, for all practical purposes and to facilitate understanding, Firmware Assurance Manager process 1700 is shown as a task within background tasks 4030. As noted above and as will be discussed in detail below, to prevent errant program execution, whenever the LAN modem, specifically the CPU therein, is to enter an idle state, e.g., not transferring data from one portion of the LAN modem to another, process 1700 will then execute to continually check the integrity of the executable program copy then residing within DRAM 372 (which is actually executed by CPU 330—see FIG. 3) by comparing that copy, on a location-by-location basis, with the executable version then stored in flash memory 376. Should process 1700, shown in FIG. 4A, detect any unexpected discrepancy between these two copies of the executable program code, then, at each memory location in the DRAM at which such a discrepancy exists, process 1700 will copy the contents of the corresponding location in the flash memory to a corresponding location in the DRAM to eliminate the discrepancy. O/S 4010 interrupts and completely preempts execution of process 1700 whenever any process, within application software 400, then needs to be executed. Execution of process 1700 then resumes once the CPU is to return to an idle state.

Figure 4B:
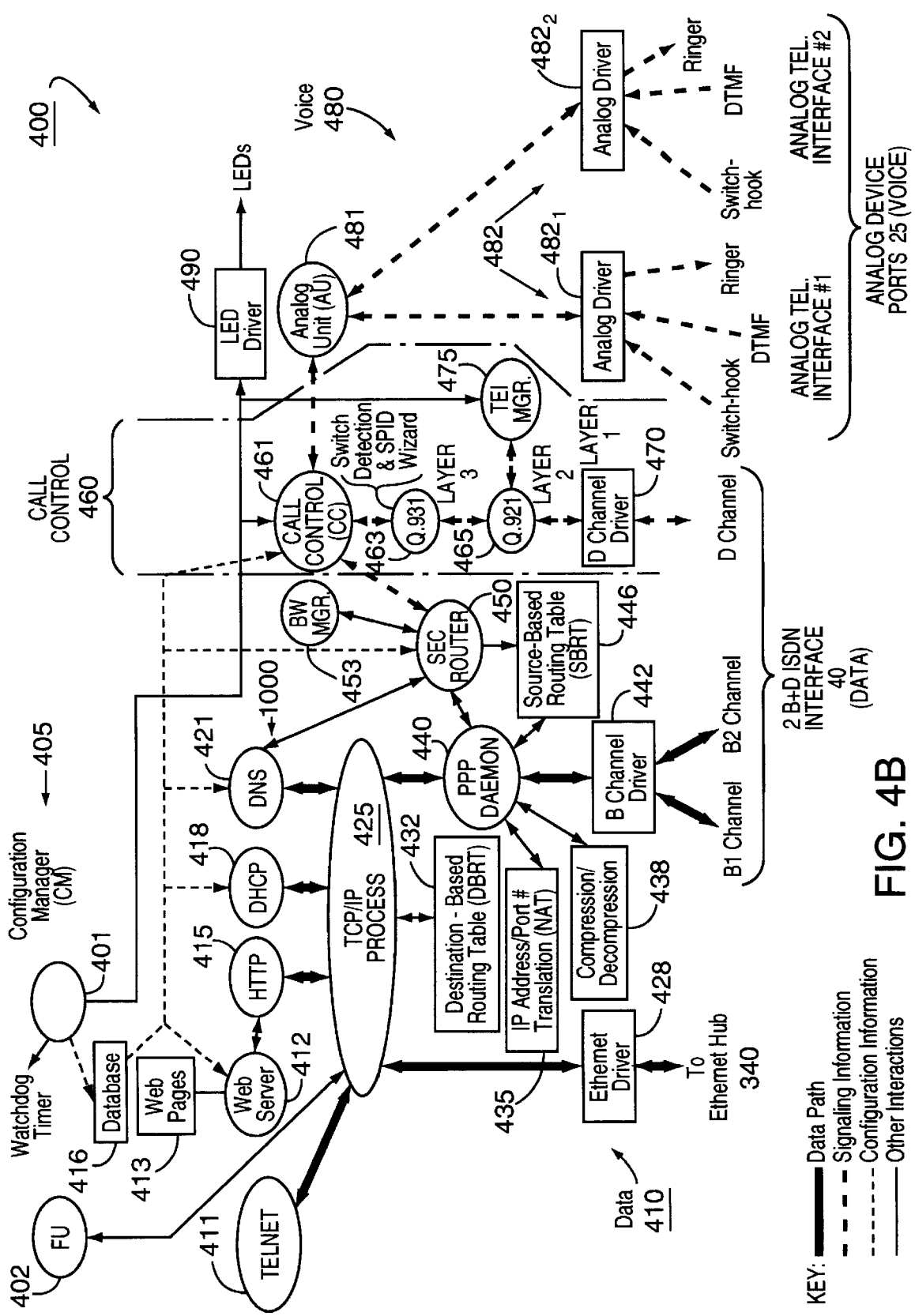
FIG. 4B depicts an architectural block diagram of software 400 contained within application software 4020 shown in FIG. 4A that, among other aspects, implements the various modes of operation of the LAN modem shown in FIGS. 2A–2C.

FIG. 4B depicts an architectural block diagram of software 400 that collectively executes as foreground tasks shown in FIG. 4A. As indicated in a key shown in FIG. 4B, thick solid lines denote data paths; thick and thin dashed lines denote signaling and configuration information paths, respectively; and thin solid lines denote other process interactions.

As shown, overall functionality of software 400 can be divided into four basic sections: configuration section 405, data section 410, call control section 460 and voice section 480. Voice section 480 is directed to analog (commonly referred to as "voice") telephony connections provided through analog telephone device ports 25 (as shown in FIG. 1).

Generally speaking, configuration section 405, shown in FIG. 4B, contains Configuration Manager process 401 and Firmware Upgrade process (FU) 402. Process 401 properly configures, e.g., initializes, and executes various software processes in the LAN modem. FU process 402 strictly limits when information can be written into flash memory 376 (see FIG. 3), thus substantially minimizing a chance that the contents of the flash memory could become corrupted.

Data section 410, shown in FIG. 4B, controls transmission and reception of data packets, i.e., B-channel packets, between the LAN, to which workstations 10 (see FIG. 1) are connected, and the appropriate ISDN B-channels to which the LAN modem is then connected.

Call control section 460 interacts with a local ISDN switch at a telephone central office to establish and terminate ISDN calls in order to appropriately route traffic between the LAN, via the switch and PSTN, and a remote network, or to connect a near-end analog telephone device connected to the LAN modem, via the ISDN switch and PSTN, to a called or calling far-end device.

Voice section 480 establishes and terminates analog telephone voice connections, over an appropriate B-channel(s), involving either one (or both) of analog telephone device ports 25 provided by the LAN modem.

LED Driver 490, though not specifically contained within any of sections 405, 410, 460 and 480, suitably energizes, under program control, LED indicators (see FIG. 3) to indicate current status information, respectively.

In particular, upon power-up of the LAN modem, Configuration Manager 401, shown in FIG. 4B, is the first process to be executed, with it, in turn, spawning all other processes and applications, as needed. In that regard, the Configuration Manager launches, controls and terminates, as needed, the execution of various software processes and applications that collectively establish an ISDN connection, properly handle B-channel data packet traffic during that connection and to terminate the ISDN connection at the conclusion of the call. Furthermore, if the LAN modem has not yet been initially configured, Configuration Manager 401 updates certain portions of local database 416 with data representing the present configuration of the LAN modem and its users. The database collectively stores, e.g.: a serial number, product name and software version of the LAN modem; an Ethernet address of the LAN modem; an IP address and subnet mask of the LAN modem itself; status information as to whether DHCP (dynamic host control protocol) server 418 and DNS (domain name system) server 421, shown in FIG. 4B, in the LAN modem are each currently enabled or not; a range of private IP addresses available for assignment to the workstations that connect to the LAN; an indication as a type of ISDN switch to which the LAN modem is connected and the SPIDs associated with the ISDN directory numbers assigned to the LAN modem; various usage parameter values, such as minimum call connect time and inactivity periods; and a profile for each workstation connected to the LAN; and a profile for each different network service provider that can be accessed by one or more of the workstations through the LAN modem. Various portions of this information, such as the serial number, product name, and private IP address range are initially stored in the EPROM (within EPROM and watchdog timer 380 shown in FIG. 3 and after a power-on reset has occurred, copied into the flash memory.

To digress slightly, FIGS. 13A and 13B respectively depict host list 1300 and provider list 1350 which are also both stored within DRAM 372 (see FIG. 3), and used by our inventive source-based routing process.

Host list 1300, as shown in FIG. 13A, contains stored host profiles having an entry for each separate workstation (host) that can be connected to the LAN. For each host, its corresponding entry, of which entry 1310 is typical, specifies its machine name, its IP address and its Ethernet address. In addition, each host entry contains permission data which specifies, for each network service provider (SP) accessible through the LAN modem, those providers which that particular host can access. Initially, during a system power-up occurring after a factory default reset, and as shown in FIG. 13A, for each different host, the name of that host is set to indicate an unknown value, e.g., "UnknownPC_1"for host 1; the IP address for that host is set to a different private IP address within a specified range, e.g., "IPAddress_1"; the Ethernet address for that host is set to zero; and permission is granted to that host to access all network service providers. Initially the LAN modem assigns itself a private IP address of illustratively 192.168.1.1, as a default value, with each host entry being assigned a different default private IP address within the range 192.168.1.2 to 192.168.1.5. Should the address of the LAN modem change to place the LAN modem on the same subnet as a workstation, then the default IP address in each host entry will be automatically changed accordingly such that the LAN modem and all the hosts are always on the same subnet. Though the preferred embodiment of the LAN modem illustratively accommodates four hosts and four network service providers, list 1300 can be readily extended, as shown, to accommodate any number of, e.g., m, hosts and, e.g., n, network service providers (where m and n area integers).

Network service provider list 1350, shown in FIG. 13B, contains a separate entry for each network service provider for which the LAN modem has been configured to access. Though the preferred embodiment of the LAN modem accommodates four different (user-defined) network service providers, hence necessitating four separate entries $1350_1$, $1350_2$, $1350_3$ and $1350_4$, in list 1350; this list and hence the LAN modem can be readily expanded to afford access to any number, e.g., n (corresponding to entry $1350_n$), of different pre-defined network service providers. For any such pre-defined network service provider, its corresponding entry (of which $1350_1$ is typical) specifies: its name; its ISDN directory telephone number; a valid user account (USER ID) thereon; a password for that account; whether that provider (ISP) is an Internet service provider or a private network (PN) if that service provider is a private network, whether the Internet can be accessed through that network; if that service provider is a private network, the network identification (including, e.g., IP address of the provider and subnet mask pairs) and domain name thereof; and other fields not relevant hereto. Any host profile can be updated by the Configuration Manager in response to user entry of new configuration data.

Returning to FIG. 4B, database 416 is directly accessed from flash memory 376. This database is queried by various processes, as discussed below, to provide status and configuration information, as needed, for use in properly establishing, maintaining and terminating ISDN connections, and properly routing packet traffic between a remote network and any of the workstations connected to the LAN or any of the two analog telephone devices connected to the LAN modem; or among the workstations themselves, as appropriate.

To control the integrity of the contents of flash memory 376 (see FIG. 3), specifically program code and data stored therein, FU process 402, shown in FIG. 4B, implements a key-based lockout to greatly limit those instances, as well as the time intervals thereof, during which the flash memory is writeable, i.e., during which an operating mode of the flash memory is changed from read-only to read/write. Through such a lockout (which is described in detail below in conjunction with FIG. 16), the contents of the flash memory can be changed only when a requesting process presents an appropriate key, that matches a corresponding predefined key, and a write flash request has been received from, e.g., a remote file server, to initiate writing new firmware into the flash memory. Collectively, Firmware Assurance Manager process 1700 —which is discussed in detail below in conjunction with FIG. 17 which executes as, e.g., a lowest-priority background application process, and FU process 402 attempt to minimize any corruption to and continually maintain the integrity of the firmware executing within the LAN modem. In addition, key controlled access, though not under control of the FU process, is used to limit write access to the flash memory for profile modifications.

Data section 410 contains drivers, local applications, processes, stored web page components and page templates, a web server and routing tables.

The processes include TCP/IP process 425, PPP daemon process 440, secondary router (SR) 450 and Bandwidth Manager (BM) 453. Of these processes, TCP/IP process 425 implements a basic routing engine in the LAN modem. In that regard, process 425, lying at the heart of data section 410, conventionally implements the TCP/IP protocol stack and destination-based routing. This process provides all processing for IP, TCP (transmission control protocol), UDP (user datagram protocol) and ARP (address resolution protocol) protocols. This process also provides a standard and conventional "sockets" interface to various local applications situated at the top of the stack, such as Telnet server 411, HTTP (hypertext transfer protocol) daemon 415, DHCP server 418 and DNS server 421; and a common network interface to all drivers situated at the bottom of the stack. In particular, process 425 accepts incoming IP packets from the LAN, as supplied by Ethernet driver 428. In that regard, each of these packets, as conventionally occurs, was encapsulated, as payload data, within an Ethernet packet and is extracted therefrom by Ethernet driver 428. en As such, process 425 either routes the IP packet to either one of the local applications or protocols for processing, based on a protocol ID and well-known port number contained within the packet, or, with appropriate IP address and port number translation as needed and discussed below, onward to the appropriate B-channel for carriage over a remote network. Specifically, if the IP address of the packet matches that of the LAN modem, then the local application to which the packet is routed is determined by a protocol ID and port number contained in the packet itself. This routing will be fully described below in detail in conjunction with Primary Router (PR) process 1100 shown in FIG. 11. In addition, during a software upgrade, TCP/IP process 425 routes incoming packets with replacement code, via an ISDN networked connection to a remote file server or from a LAN connection to a workstation, to FU process 402 for writing suitable replacement code into the flash memory.

PPP daemon process 440 implements the conventional and widely known PPP protocol for a given data connection between a workstation and its remote PPP peer, e.g., a network service provider. Specifically and to the extent relevant, the PPP protocol is comprised of three major components (layers), all of which are advantageous for use in an ISDN networked connection: (a) a link control protocol (LCP) for establishing, configuring and testing an end-to-end data-link, e.g., ISDN, connection, and authentication protocols for authenticating that connection; (b) a multi-link PPP layer for utilizing both B-channels simultaneously; and (c) a network layer which consists of network control protocols (NCPs), a compression control protocol (CCP) for controlling data compression, and Bandwidth Allocation Control Protocol (BACP) for controlling addition and removal of a second multi-link channel. With this in mind, once an ISDN connection has been connected, the PPP daemon negotiates, upon user request, with a remote PPP peer as to whether multi-link PPP is to be used or not over that connection. In particular, once the LCP protocol has been successfully negotiated, daemon process 440 then monitors and authenticates, through suitable authentication protocols (e.g., password authentication protocol and challenge handshake authentication protocol—both of which are not specifically shown), the users on both sides of the connection; and monitors the IP protocols in use on both sides of the connection. After authentication, then, per user request, daemon process 440 establishes a multi-link PPP connection, if desired and supported by the PPP peer, in order to utilize both B-channels for data transport during a common ISDN call, hence creating a single virtual digital channel providing, with use of compression, as much as 256 Kbits/sec of available bandwidth; and determines whether, through the network layer protocols and specifically through appropriate negotiation of the compression control protocol (CCP), whether compression will be performed by the LAN modem. If CCP has been successfully negotiated, then Compression/decompression module 438 provides local "Stac" compression and decompression of packet data. Furthermore, multi-link PPP involves segmenting, at a transmitting DCE, a message frame into sub-frames and simultaneously sending sub-frames over both B-channels whereupon, at a PPP peer, those sub-frames are properly re-assembled and re-ordered to reconstitute the single message frame. PPP daemon process 440 performs this segmentation for outgoing packets, emanating from the LAN modem, over each B-channel and re-assembly for incoming IP packets, to the LAN modem, from each such channel.

PPP daemon process 440 also interacts with IP Address/Port Number Translation module 435 and SR process 450.

The IPAddress/Port Number Translation module provides network address translation (NAT), between private and public IP address pairs, to permit users at multiple workstations to simultaneously share a single user account at a network service provider, such as an ISP. This process ensures that IP packets, based on their transit direction through LAN modem 300, i.e., directed to workstations on the LAN or to the remote network, will contain proper IP addresses to delineate correct sources and destinations to facilitate sharing of a single network, e.g., ISP, account. In this regard, module 435 will translate the private IP source addresses of all outgoing packets from the LAN into a single public IP source address, i.e., that associated with the LAN modem itself (and either statically or dynamically assigned to the LAN modem) and substitute that address for the private IP address within each of these outgoing packets. These packets with the substituted public address are then provided by daemon process 440 to B-channel driver 442 for transport, over an appropriate B-channel(s), to the network service provider. Hence, the LAN modem will effectively multiplex all these outgoing packets onto a common network connection.

Similarly, incoming IP packets from the common network service provider, and provided via driver 442, will possess a single common public destination IP address. Module 435 will translate that single public destination IP address in each of these incoming packets into an appropriate private IP address of the corresponding workstation to which that packet should be destined. For each such incoming packet, module 435 substitutes the private IP address for the public address in that packet and then provides the resulting packet, via PPP daemon process 440, to TCP/IP process 425. Hence, the LAN modem effectively de-multiplexes all these incoming packets to separate network connections on the LAN.

This translation also encompasses suitably translating the port number field in the IP packets (specifically the source port number field, if the packet is traveling on the LAN in a direction towards the network service provider; or the destination port number field, if the packet is traveling on the LAN in a reverse direction, i.e., to a workstation). The port number field, in this instance, specifies the particular TCP or UDP application session, such as for Telnet, HTTP, FTP, or some other application, for which the packet is either destined to or from which it is emanating. This translation ensures uniqueness of a set of source/destination IP addresses, protocol ID and source/destination port numbers in packets that flow between unique client/server applications and pass through the LAN modem, and hence provides unambiguous internal packet routing in the LAN modem between all the client hosts (i.e., workstations) connected to the LAN modem and associated remote servers connected thereto via an ISDN connection(s).

The IP address translation is effectuated through our inventive two-level source-based addressing. As discussed below in conjunction with FIGS. 10, 11, 12A–12D, this addressing relies on using both destination and source IP addresses. Destination IP addresses for each host are stored within Destination-Based Routing Table (DBRT) 432; while B-channel and service provider information are stored within Source-Based Routing Table (SBRT) 446. Both of these tables are solely maintained in DRAM 372 within memory 370 (see FIG. 3). DBRT 432 is used by TCP/IP process 425, shown in FIG. 4B, to first determine whether an IP packet is destined for a particular workstation (host) on the LAN, one of the local applications executing within the LAN modem, or a remote destination, such as a remote network. Should a packet be destined or incoming from a remote network, hence requiring public-private IP address translation, IP address/port translation (NAT) module 435, in conjunction with addressing information stored with SBRT 446, provides the public-private address translation (including port number translation, if required), when necessary. NAT module 435 contains suitable public and private source and destination IP address information and source and destination port number designations for packets then to be carried over that channel. The specific algorithm which implements address translation will be discussed below in conjunction with FIGS. 10, 11 and 12A–12D.

A description of the algorithm used for Network Address Translation (NAT), in essence, is provided in K. Egevang and P. Francis in "Informational RFC (Request for Comment) 1631", *Internet Engineering Task Force (IETF)*, May 1994, which is incorporated by reference herein. An end-to-end connection between a client application running on a workstation on the LAN side and a server application on the Remote Network (on the WAN side) is identified by the following parameters: (a) source and destination IP addresses; (b) Protocol number (to identify the Transport layer protocol, on top of IP, such as, TCP or UDP); and (c) Source and destination Port numbers (to identify the applications on top of TCP or UDP).

As shown in FIG. 2C, all traffic generated towards the LAN modem from the Remote Network side will be directed to IP address 198.6.1.1. The LAN modem will have to demultiplex this traffic and deliver it to the appropriate workstation on the LAN. This will always require a translation from IP address 198.6.1.1 to 192.168.1.2–5. In the other direction, the LAN modem will have to multiplex the traffic from multiple LAN side workstations to the same WAN connection. This will always require a translation from IP addresses 192, 168.1.2–5 to 198.6.1.1.

A translation may also be required in the LAN side Port number field (Source Port number field, if the packet is going in the LAN to Remote Network direction; in Destination Port number field, if the packet is going towards a workstation on the LAN). This translation will be needed to ensure the uniqueness of the set of Source/Destination IP addresses, Protocol number and Source/Destination Port numbers, in packets flowing between unique client/server applications and passing through the LAN modem. Port number translation is effectuated by selecting an available port number from a range and searching existing entries in a NAT table to determine if this selected port number is already in use. If the number is free, that number is then used as a translated port number. Alternatively, if the selected number is in use, a next successive port number is selected, and so on, to locate a free port number for use in translation. As an example, assume that the workstations with IP addresses 192.168.1.2 and 192.168.1.4 wish to communicate with the same server application on the same workstation on the Remote Network (having an IP address IP_w1). Assume that the TCP protocol has to be used (Protocol number=6), and that the server application is Telnet (Port number=23) in both cases. If both workstations, 192.168.1.2 and 192.168.1.4, select the same port number (for example, Port number=12) on their side to identify their client applications, then this port number must be translated by the LAN modem (for one of the workstations) to be able to unambiguously route packets (since on the WAN side of the LAN modem, 192.168.1.2 and 192.168.1.4 will be translated to 198.6.1.1). Without port number translation, packets coming to the LAN modem from the WAN side, with Source IP address IP_w1, Protocol number 6, Source Port number 23, Destination IP address 198.6.1.1, and Destination Port number 12 will be unroutable (because LAN modem will not know whether to send a packet to workstation 192.168.1.2 or 192.168.1.4).

FIG. 13C depicts the structure of Destination-Based Routing Table 432. As shown, this table contains two entries: entries 1352 and 1354. These entries specify an outgoing network connection to be used, i.e., the Ethernet LAN or an ISDN connection, for a packet being routed to a given destination, other than the LAN modem itself. In that regard, TCP/IP process 425 will access this table, for each outgoing packet other than those for the LAN modem itself (such as for one of local applications 1000), using the destination IP address of that packet, to locate an entry in the table that contains that address. The entry will specify an outgoing network interface to be used in routing the packet onward. Specifically, for the example shown in the figure, for packets having a destination IP address of, e.g., 192.168.1.0 and a subnet mask of 255.255.255.0, table 432, through entry 1352, specifies that each such packet is to be routed over the LAN. Hence, those packets will be applied by TCP/IP process 425 to Ethernet driver 428 for subsequent routing over the LAN. Should the IP address of the LAN modem change from its default value, the LAN address will be changed accordingly. Alternatively, for packets that contain any other destination IP address (when the table is accessed for such packets, the address will be those other than the IP address of the LAN modem itself), then table 432, specifies through entry 1354, that such packets (with any subnet mask) will be routed over an ISDN connection. Hence, these packets will be applied by TCP/IP process 425 to PPP daemon 440 for subsequent routing over the proper B-channel to an appropriate network service provider.

FIG. 13D depicts the structure of Source-Based Routing Table 446. This table is updated by SR process 450 and stored within DRAM 372 in memory 370 shown in FIG. 3.

As shown in FIG. 13D, this table contains entries 1390, each of which specifies the status of a current ISDN connection to a workstation on the LAN. Inasmuch as the preferred embodiment of the LAN modem accommodates four workstations, then SBRT 446 need only contain eight such entries 1390 with two entries per workstation. In that regard, entries 1390₁ contains separate entries 1390₁₁ and 1390₁₂ for workstation (host) 1, entries 1390₂ contains individual entries 1390₂₁ and 1390₂₂ for host 2, and so forth for the remaining hosts (in the preferred embodiment these hosts are illustrative workstations $10_a$, $10_b$, $10_C$ and $10_d$ shown in FIG. 1). This table can be readily expanded to accommodate m different workstations through inclusion of additional entries, here being up to entries $1390_m$ shown in FIG. 13D containing entries $1390_{m1}$ and $1390_{m2}$ for host m. Each entry specifies, through separate fields, the number of the B-channel in use for that connection (channel $B_1$, $B_2$ or both), whether the PPP or multi-link PPP protocol has been successfully negotiated and is in use for that connection, and a network service provider to which the connection is then made. Furthermore, to expedite packet routing over established connections to any permitted network service provider, a network ID for each such permitted service provider for the corresponding host is cached, in separate fields as cached data 1392, within each entry in the SBRT. For each permitted network service provider, the network ID includes an IP address of that provider and subnet mask pairs therefor.

As noted above and now returning to FIG. 4B, the LAN modem also includes web server 412. This server is used to initially configure the router and thereafter to indicate network failure messages. The advantages inherent in employing an internal web server will now become clear, though we again divert somewhat from our discussion of FIG. 4B but now to broadly discuss this inventive aspect.

In particular, commercially available routers are typically configured through an external PC that is connected to the router through RS-232 serial ports on both the router and the PC. Configuring a router in this fashion not only requires a serial port on the router, and associated internal interface circuitry, but also a proprietary configuration program that must be executed on the PC in order to properly set, inter alia, network parameters in the router. Such a connection has been traditionally required for the simple reason that until such a router was configured with its proper network addresses, specifically its IP address and subnet mask, packets could simply not be routed to it over a network connection—the router generally being unreachable by any network device. Inasmuch as the serial port was used just to configure the router, and generally just to enter proper network addresses, this port was generally used rather infrequently and oftentimes only once during the service life of the router. Inclusion of such a serial port and proprietary software not only added cost to the router itself but also properly specifying the network addresses was oftentimes rather tedious and time-consuming, thereby burdening its installer and further incurring additional cost.

Advantageously, ISDN router 305 (see FIG. 3) dispenses with the need to use any serial port as well as any proprietary software in order to configure the LAN modem.

In accordance with the teachings of the present invention and returning to FIG. 4B, software architecture 400 of the LAN modem also includes web server 412, together with, as part of local TCP/IP applications 1000, HTTP process 415 and DHCP server 418. Together, these three components permit the router to configure itself, through any workstation connected to the LAN, by interacting with a standard commercially available web browser (such as Netscape Navigator available from Netscape Corporation or Internet Explorer available from Microsoft Corporation) executing on that workstation and regardless of whatever the IP address of the workstation happened to be at the time. In essence, and as described in considerable detail below in conjunction with Initial Configuration procedure 900 shown in FIGS. 9A–9C, whenever the LAN modem is taken "right out of the box", connected to a workstation, using static IP addressing, and then energized for the first time, the IP address of the LAN modem will utilize a default value that, in all likelihood, will have a subnet value that will not match that of the workstation. While such a mis-match would totally frustrate any network communication between a conventional router and a workstation connected to it over an Ethernet connection, the LAN modem surmounts this deficiency by automatically adapting its current network settings in order to establish network communications with the workstation and illustratively with a web browser executing thereat. Specifically, the LAN modem calculates, given the IP addresses of the workstation and the LAN modem, a subnet address for the LAN modem that places both the LAN modem and the workstation on the same subnet. Finally, the LAN modem stores the IP address and subnet values for the LAN modem in database 416 and automatically resets the LAN modem so that these addresses, including the subnet address, over-ride the default values. Thereafter, the workstation and the LAN modem communicate through the web browser and the hypertext transport protocol.

If the workstation is using dynamic IP addressing, then, in response to network IP packets broadcast from the workstation, specifically DHCP request packets generated by the workstation, DHCP server 418 assigns an available IP address to the workstation and then suitably notifies the workstation of this address. The DHCP server obtains the Ethernet address and name of the workstation from the DHCP Request packet.

As such, and in response to a DNS request packet from the workstation—as discussed in detail below, web server 412 will then dynamically construct a default web page through which the user can choose to configure the LAN modem. Should the user then choose to configure the LAN modem, the web server will generate a predefined sequence of graphical web pages with user entry fields through which a user at the workstation will interactively enter network parameters and other required data to properly configure the LAN modem. Once all the data has been entered, the LAN modem will have been completely configured. Later, by appropriately accessing the web server within the LAN modem and selecting an appropriate "hotlink" to a top-level configuration page, the user can then re-configure the LAN modem as desired. While the configuration is generally accomplished through a web browser executing on the workstation, other client based TCP/IP applications, such as telnet, can be used instead to configure the browser.

Rather than maintaining a file store containing a file for each separate predefined web page in its entirety, particularly those containing graphics, which are then simply accessed—as is the case with conventional web servers and is costly in terms of memory, web server 412 constructs web pages in real-time. These pages are constructed from pre-defined stored templates (illustratively, for the preferred embodiment, approximately 600 bytes long) containing hypertext markup language (HTML) code that is common to all pages. For display of any one page, web server 412 simply accesses the stored code for the template and dynamically inserts appropriate predefined code segments therein in lieu of so-called "placeholder(s)" in the template based on a specific event that invoked display of that particular page. These segments can represent dialog boxes, graphics, predefined textual messages or, generically speaking, any object, whether HTML or otherwise, that needs to be selectively presented to a user either for display and/or to solicit a response, such as an item of data or a selection among a list of predefined data values, from the user. The manner through which code for such a template and all its associated objects is generated and the specific manner through which web pages are dynamically constructed therefrom are discussed in detail below in conjunction with File Creation process 2800 shown in FIG. 28 and illustrative code shown in FIGS. 30A–30B and 31. Since few full web pages are stored, memory requirements become rather modest. Collectively, the templates and all page components are stored within database 416 in flash memory 376 (see FIG. 3) and, in the preferred embodiment of the LAN modem, consume only approximately 200 Kbytes of storage space. Once a page is constructed by web server 412 (see FIG. 4B), a file for that page is then provided by the web server to HTTP process 415 which suitably packetizes and encapsulates that file, using the hypertext transfer protocol (HTTP). The resulting file is provided by HTTP process 415 to TCP/IP process 425 for eventual routing, over the LAN, to the associated workstation. User responses, in HTTP form, from the workstation to each web page are routed by TCP/IP process 425 to HTTP process 415 for suitable interpretation, such as constructing and transmitting a next successive page to the user or storage of user-supplied configuration data. Web server 412 stores such user-supplied configuration data within database 416 for subsequent access and use. The architecture of web server 412 is discussed in considerable detail below in conjunction with FIGS. 18–21, with specific examples of dynamic web page generation being discussed below in conjunction with FIGS. 22–27.

Moreover, in the event of a network fault or other condition that affects a connection to a remote network and/or server thereon, conventional routers do not indicate the specific nature of that fault to any local client connected to the router. This, in turn, relegates the user at that client to rely on an error message, in those instances when it is provided by the network, that is often rather cryptic at best and more often simply not provided at all. In the latter situation, the user simply waits in basically total ignorance of the fault, i.e., the fault occurs but the user receives no indication of it on, e.g., his(her) browser. Not only is the user annoyed by this type of fault handling, but also the user is forced to wait, owing to a lack of information which leads to an expectation (which later proves to be unwarranted) that the fault will resolve itself, which can be rather time-consuming and frustrating.

Advantageously, the inventive LAN modem also substantially, if not totally, eliminates these particular deficiencies in the art.

Specifically should such a fault condition arise that affects a remote network connection, via the ISDN B-channel(s), then in use by a workstation on the LAN, web server 412 in the LAN modem, recognizing this condition by reading a then current value of a global variable which reflects this particular fault, constructs and downloads a predefined web page to the workstation. This page, when displayed by a browser thereat, informs the user of the specific nature of that condition such that the user can then take appropriate action, such as, e.g., establishing a remote session to the network destination at a later time or simply re-transmitting a message. This inventive aspect is discussed below in detail in conjunction with FIGS. 22–26. Alternatively, the browser can be executing on a remote host connected over the ISDN connection to the LAN modem.

As noted above, data section 410 also includes, as local TCP/IP applications, Telnet 411 and DNS server 421.

Telnet 411, which is conventional in nature, allows a remote computer, of a wide variety, to communicate, as a remote Telnet client, with the LAN modem as a Telnet server, hence bypassing web server 412. This application is primarily used for debugging the LAN modem and hence is likely to see little use in actual installations. Though, through this application, the LAN modem can be remotely configured via a networked connection, either via the LAN itself or through an ISDN networked connection, should a need arise to do so.

Furthermore, in accordance with the present inventive teachings, DNS server 421 provides local name-to-address resolution such that, for user convenience, each workstation on the LAN can be addressed in terms of its machine name rather than its IP address. Moreover and advantageously, DNS server 421, in conjunction with DHCP server 418, operates transparently of any user to acquire machine names of all the workstations connected to the LAN and then provide suitable machine name to IP address resolution, as needed, for all communication between the LAN modem and these workstations as well as between any pair of workstations themselves. These inventive aspects are discussed below in detail in conjunction with DHCP Induced IP Address Request procedure 1400 and DNS Induced IP Address Request procedure 1500 shown in FIGS. 14 and 15A–15D, respectively.

For multi-link connections, Bandwidth (BW) Manager (BM) process 453, shown in FIG 4B, monitors the number of B-channels allocated to a given ISDN connection for a data call and, if both channels have been allocated to handle a given ISDN data call, deallocates one of those channels, on request and where possible based on under-utilization of that channel, to simultaneously establish another ISDN call to a different destination. This new ISDN call can either be a data call to another remote network destination or an analog voice call to a far-end analog telephone device. This dynamic channel assignment can also automatically occur whenever, e.g., a user lifts a handset (i.e., goes "off-hook") of an analog telephone connected to the LAN modem, through either of the analog telephone device ports, during an on-going ISDN call, thereby causing a "call request" or a "call connect" message to be generated by AU process 481 and hence an appropriate message to be produced by Call Control process 461.

In particular, assume that both B-channels are allocated, as would occur through prior successful negotiation of multi-link PPP, to carry a current ISDN data call to a given network service provider. Should TCP/IP process 425 need to route a packet to, e.g., a different network service provider, an ISDN connection will first need to be established for this new provider. Hence, Call Control (CC) process 461 will send a request to SR process 450 to ascertain whether the new call can be accommodated. SR process 450 then passes a request to BM process 453. If, based on a response from the BM process, one of these channels can be de-allocated, SR process 450 will inform PPP daemon process 440 which, in turn, will issue a suitable PPP control message, specifically a Bandwidth Allocation Protocol (BAP) message, to its PPP peer to revert to use of a single B-channel for the current ISDN call. BM process 453 will deallocate the channel from the existing data call. CC process 461 will then initiate an ISDN call over the now available B-channel. Once a link is established thereover BM process 453 will update its data. Thereafter, whenever the new call is concluded, CC process 461 will suitably inform SR process 450, which will inform BM process 453 accordingly. As a result, the recently allocated B-channel is now available to be re-allocated, where possible, to a different ISDN call, should the need exist. If a multi-link PPP data connection has been successfully negotiated and is currently in progress over the other B-channel, then daemon process 440 can request use of this now available B-channel for this connection. If BM process 453 decides that a sufficient need exists to utilize the now available second B-channel for this data connection, the BM will so indicate this to SR process 450. SR process 450, in turn, will suitably inform BAP within PPP daemon process 440 to establish a connection through the second B-channel. Through negotiations with BAP in the PPP peer, if successful, BAP within SR process 450 suitably informs the SR process and Control process 461 to issue appropriate signaling messages to establish an ISDN call over the available B-channel to the destination of the current data connection.

The drivers used within data section 410 include Ethernet driver 428 and B-channel driver 442. The Ethernet driver, given network packets received from TCP/IP process 425 and destined to any of the workstations connected to the LAN, properly assembles, by encapsulating these packets as payload data within Ethernet packets, and transmits the resulting encapsulated packets, via the Ethernet hub and the Ethernet LAN, to that workstation. Driver 428 also receives encapsulated packets from the LAN and destined either for the LAN modem itself or a remote network. In this case, driver 428 extracts the IP packet from the encapsulated packet and applies the former to TCP/IP process 425 for subsequent handling. For all such encapsulated packets, driver 428 checks the Ethernet addresses of each packet for accuracy and performs a cyclic redundancy check (CRC) on the entire encapsulated packet for error detection. This driver ignores any non-IP packet that might appear on the LAN. Driver 442 accepts incoming IP packets appearing on the ISDN connection that are destined for the LAN modem and routes those packets to PPP daemon process 440 for subsequent processing. All outgoing packets provided by the PPP daemon process are applied to driver 442 which, in turn, buffers each of these packets as needed, and subsequently transmits each such packets over the appropriate B-channel onward to the remote network for transport to its eventual destination. 10

Call Control section 460 contains as its high-level software components: Call Control (CC) process 461, Q.931 process 463, Q.921 process 465 and D-channel driver 470.

Call Control process 461 manages system resources within the LAN modem both from the standpoint of locating available hardware resources and software drivers and allocating those resources and drivers accordingly to establish analog and digital calls as requested. Call Control process 461 receives outgoing call requests from either AU process 481, as discussed below, or secondary router (SR) process 450. Upon receipt of such a request from, e.g., SR process 450 (or from AU process 481), process 461 being event driven, will send a "call request" message to and invoke Q.931 process 463. Process 463, which is implemented as a finite state machine, provides appropriate ISDN Q.931 message encoding and decoding for communicating with an ISDN switch to control call setup and tear-down. This process, along with Q.921 process 465, implements, in software, well-known layers 3 and 2, respectively, of ISDN call processing. In addition, Q.931 process 463 also includes: (a) automatic switch detection functionality to automatically detect a type of ISDN switch to which the LAN modem is connected and appropriately configure the router accordingly; and also (b) an automatic SPID (service profile identifier) Wizard process to properly configure the SPIDs for each directory telephone number for the ISDN line connected to the LAN modem. Inasmuch as details of the automatic switch detection and SPID Wizard process are not necessary for a full understanding of the present invention, then, for further details on these two aspects, the reader is referred to co-pending U.S. patent applications entitled "APPARATUS FOR AN IMPROVED ISDN TERMINAL ADAPTER HAVING AUTOMATIC ISDN SWITCH DETECTION AND METHODS FOR USE THEREIN" Ser. No. 08/852,659, and "APPARATUS FOR AN IMPROVED ISDN TERMINAL ADAPTER HAVING AUTOMATIC SPID CONFIGURATION AND METHODS FOR USE THEREIN" Ser. No. 08/852,656, both of which were filed on May 7, 1997, commonly assigned to the present assignee hereof and are incorporated by reference herein.

In any event, to establish an outgoing ISDN data (or B-channel voice) connection, Call Control process 461 first assigns an available B-channel to that call. Thereafter, Q.931 process 463 issues, over the D-channel, a "call setup" message. This D-channel signaling message, as well as all other such outgoing D-channel messages generated by Q.931 process 463, is applied, in turn, to Q.921 process 465 for proper encapsulation in a Q.921 information frame and subsequent transport over the D-channel, via D-channel driver 470 and ISDN interface 310 (see FIG. 3), to the far-end. Once the ISDN connection is fully established, an ISDN "call connect" message is delivered by the local ISDN switch, over the D-channel, to the LAN modem, specifically via D-channel driver 470, shown in FIG. 4B, to Q.931 process 463 executing therein. For an incoming ISDN call, all incoming D-channel signaling messages received from the ISDN line for that call are applied through ISDN interface 310 (see FIG. 3) and D-channel driver 470 to Q.921 and Q.931 processes 465 and 463 (shown in FIG. 4B), in seriatim, for appropriate local processing and eventually to Call Control process 461 to control the progress of that call and allocate (or deallocate) appropriate resources for that call, e.g., allocate an available B-channel HDLC driver or analog line interface (for a B-channel voice call) or deallocate it if the call is terminated. D-channel driver 470, together with ISDN interface 310, collectively implements, in hardware, ISDN layer 1 functionality.

TEI Manager 475, in conjunction with Q.921 process 465, requests, during call establishment, a so-called "Terminal Endpoint Identifier" (TEI) from the ISDN switch to which the LAN modem is connected. The TEI is a unique (and conventional) identifier used by the LAN modem, and more generally any DTE connected to an ISDN switch, to uniquely identify itself to the switch. The value of this parameter is supplied by the switch to the LAN modem during initial communication between the switch and the LAN modem and is thereafter used by the LAN modem in each communication with the switch. Inasmuch as the LAN modem merely reflects the TEI value supplied to it by the switch in each communication to the switch, the actual value of the TEI, as assigned by the switch, is immaterial to the LAN modem. Should Configuration Manager 401 need to tear down and re-establish the ISDN connection to the switch, configuration manager 401 will first instruct TEI manager 475 to re-initialize the TEI to effectively inform the switch that the terminal adapter is no longer connected to it, and thereafter instruct the TEI manager to request a new TEI value from the switch for subsequent use.

For a data call, once an ISDN connection is established between the LAN modem and a network service provider, then digital packet data is routed, on a bidirectional basis through Ethernet driver 428, TCP/IP process 425, PPP daemon process 440 and B-channel driver 442 to a corresponding B-channel connected to a remote network accessed through that provider.

Voice section 480 contains analog drivers 482, specifically drivers 482$_1$ and 482$_2$, which operate analog telephone interfaces 1 and 2, respectively. Both of the drivers are themselves controlled by Analog Unit (AU) process 481. The AU process, given a request for an analog connection, either for transmitting or receiving an analog (voice) call, assigns and binds an available one of the analog drivers to the particular analog line interface through which the particular analog device is either calling or being called. AU process 481 responds to incoming dialed DTMF digits from that device as well as switch-hook status (i.e., off-hook or on-hook), both being detected by the associated analog line interface to which that device is connected via analog telephone device ports 25, and, for an incoming analog call to the device, generates, in response to a suitable D-channel control message, a suitable signal to the interface to apply a ringing signal to that device. AU process 481 effectively establishes an internal connection between a B-channel and an analog line interface, and its associated analog device port, and controls communication therebetween for the duration of the associated analog call through the LAN modem.

In particular, when a user at the LAN modem causes an analog device connected to the adapter, such as an analog telephone to go "off-hook", i.e., to initiate a call, AU process 481 sends a "call request" message to Call Control process 461, as described above, to obtain resources needed to complete an analog connection for that device. Whenever AU process 481 receives digits from an analog line interface and particularly a DTMF receiver therein, such as DTMF receiver 354 (see FIG. 3), AU process 481 issues a "send digits" message, containing those digits, to the call control process. Furthermore, whenever AU process 481, shown in FIG. 4B, receives an incoming call request from Call Control process 461, such as for a connection via an analog interface, such as interface 350$_1$, AU process 481 controls the ringer in a local analog telephone device connected to that interface.

3. Inter-process interactions

With the above overview and hardware and software descriptions in mind, FIGS. 5–8 collectively and diagrammatically depict interactions between various high-level software processes for implementing different call handling operations that are performed by the LAN modem. Each of these operations and the attendant process interaction will now be discussed in turn. To facilitate understanding during the ensuing discussions, the reader should simultaneously refer to both FIG. 4B and the specific figure for the operation then being discussed.

a. ISDN call setup due to traffic on LAN

FIG. 5 depicts predominant interactions, in terms of inter-process communications, that occur for setting up an ISDN call based on traffic on the LAN.

Let us begin by assuming that a user stationed at a workstation on the LAN has just initiated execution of his(her) web browser. As such, the browser will attempt to access its default web page. In doing so, the web browser will generate an HTTP request, in the form of an appropriate IP packet, to fetch the page. To simplify matters, it is assumed for this discussion, that the HTTP request contains the correct IP address of the desired page to be fetched; hence requiring no remote DNS translation from a uniform resource locator (URL) to that IP address.

The workstation will place this IP packet, as symbolized by line 505, onto the LAN from where it will be received by the LAN modem. At this point, the packet needs to be routed to a default gateway established for that user. However, no ISDN connection yet exists between the LAN modem and an appropriate network service provider, e.g., ISP, to handle that packet.

Within the LAN modem, the incoming IP packet will be sent, as symbolized by line 510, via Ethernet driver 428 to TCP/IP process 425. Process 425 will access Destination-Based Routing Table (DBRT) 432 to determine whether, from the destination IP address of the packet, that packet is destined for any one of local applications 1000 on the LAN modem itself or a remote destination. Inasmuch as this packet is not destined for either any of local applications 1000 executing on the LAN modem, TCP/IP process 425 sends, as symbolized by line 515, the packet to PPP daemon process 440 to properly handle the packet. Daemon process 440 checks the profile for the workstation, stored within database 416, to determine the proper peer destination, e.g., an ISP or a remote network, for that packet. Illustratively, four network service provider profiles can be stored within database 416. Specifically, process 440, based on the source and destination IP addresses of the packet, will determine which particular network service provider should carry that packet. In addition, the PPP daemon process through SR process 450, wherein the latter interrogates Source-Based Routing Table (SBRT) 446, also determines whether an ISDN call is currently established to that particular service provider. At this point, it will be assumed that such a call is not established. In this case, the packet is placed into a waiting queue pending the establishment of an ISDN connection. PPP daemon process 440 then issues a Call Setup Request message, as symbolized by line 520, to SR process 450 to establish an ISDN call to the particular service provider that is to carry the now queued packet.

Secondary Router (SR) process 450, in response to the Call Setup Request message, accesses database 416, specifically Network Service Provider list 1350 (see FIG. 13B), to obtain the ISDN directory number of the desired network service provider to handle this packet. The Call Setup Request message, along with the directory ISDN telephone number is then passed, as symbolized by line 525 as shown in FIG. 5, to Call Control process 461. Call Control process 461, interacting with Q.931 and Q.921 processes 463 and 465, respectively, will establish an ISDN call over an available B-channel to this network service provider.

Once an ISDN call has been properly established to the desired network service provider, Call Control process 461, in response to appropriate call completion messages sent to it by Q.931 process 463, will issue, as symbolized by line 530, a Connect Acknowledgement (ACK) Indication message to the secondary router process. The secondary router process, in turn, will issue a Link Establishment Request message containing the user account and password for the network service provider (to establish a session with that provider), as symbolized by line 535, to instruct the PPP daemon process to establish a network link and negotiate compression (or not) and multi-link PPP (or not) as specified in configuration data stored in database 416. As such, PPP daemon process 440 will undertake to negotiate, across the ISDN connection to its peer, all PPP protocols (including network control protocols such as CCP, and multi-link PPP as specified in the database). In addition, the two PPP peers will also negotiate whether an IP address of the router will be dynamically assigned by the network service provider, through a DHCP server thereat, or not (i.e., use of a static public address). Once all the PPP negotiations are successfully concluded, PPP daemon process 440 will suitably update an entry in SBRT 446 to indicate the B-channel(s) in use for this call and the options being used therefor (e.g., multi-link PPP). In addition, PPP daemon process 440 will suitably inform the secondary router, by issuance of a Link Establishment Indication message and as symbolized by line 540, of the successful PPP negotiation. The secondary router, in turn, will inform Bandwidth Manager process 453 accordingly as to the bandwidth of the connection then established and the B-channel(s) therefor.

Now with the data connection having been completely and properly established to the desired network service provider, the secondary router will issue a Call Connect Indication message, as symbolized by line 545, back to PPP daemon process 440. In response, the PPP daemon process will again check SBRT 446 to verify the B-channel(s) in use for this call. Once verified, the PPP daemon will remove the packet waiting for transfer from the waiting queue and will send that packet to B-channel driver 442 for transport to the network service provider over the B-channel(s) now established for the call. Secondary router 450 will also issue, as symbolized by line 550, a Call Connect Indication packet to DNS server 421 which instructs the DNS server to save the remote destination ID, including, e.g., IP address of the network service provider and subnet mask pairs, and B-channel(s) number for this workstation.

Any subsequent packets to be carried during this session between this network service provider and this workstation will simply be routed to the provider via the LAN, Ethernet driver 428, TCP/IP process 425, PPP daemon process 440, B-channel driver 442, and the appropriate B-channel(s), as specified by the SBRT 446, connected to this provider.

b. ISDN call setup due to DNS request

FIG. 6 depicts interactions, in terms of predominant inter-process communications, that occur within the LAN modem for setting up an ISDN call based on a DNS (domain name system) request. This interaction is somewhat similar to that shown in FIG. 5; however, here a workstation on the LAN is requesting translation of a URL into a corresponding IP address rather than supplying the correct IP address. Here, the assumption is made that an ISDN call has not been established to a network service provider when the workstation issues its DNS request.

Let us begin by assuming that a user stationed at a workstation on the LAN has just initiated execution of his(her) web browser. As such, the browser will attempt to access its default web page. In doing so, the web browser will generate an HTTP request, in the form of an appropriate IP packet, to fetch the page. Here, however, the browser only has a URL for this page and not its IP address; hence, requiring DNS translation of that URL into a corresponding IP address. Assume that the DNS server residing in the LAN modem is already configured to be the DNS server for the workstation, hence a DNS query will be sent to the DNS server of the LAN modem by the workstation.

The workstation will place this IP packet, as symbolized by line 605, onto the LAN from where it will be received by the LAN modem. At this point, the packet needs to be routed to a DNS server for that user. However, no ISDN connection yet exists between the LAN modem and an appropriate network service provider, e.g., ISP, to handle that packet.

Within the LAN modem, the incoming IP packet will be sent, as symbolized by line 610, via Ethernet driver 428 to TCP/IP process 425. Process 425 will access Destination-Based Routing Table (DBRT) 432 to determine whether, from the destination IP address of the packet, that packet is destined for any local application on the LAN modem itself or a remote destination. Inasmuch as this packet is destined for DNS server 421, TCP/IP process 425 sends, as symbolized by line 615, the packet to DNS server 421. This DNS server will check the stored profiles for the network service provider, given the source IP address of this packet, whether it can perform the URL translation itself or whether that packet needs to be diverted given its source and destination addresses, to a particular network service provider. Assuming DNS server 421 can not translate the URL, then the packet will need to be routed, over an ISDN connection to that network service provider, to a remote DNS server for translation. Consequently, DNS server 421 interacts, through the secondary router, with SBRT 446, to determine whether an ISDN connection currently exists to that provider. If no such connection is currently established, the packet is placed in the waiting queue pending the establishment of an ISDN connection. A timer is also started to ensure that a response can be sent to the workstation if the ISDN connection fails to be established to the chosen network service provider within a predefined period of time, such as 30 seconds. DNS server 421 then issues a Call Setup Request message, as symbolized by line 620, to SR process 450 to establish an ISDN call to the particular service provider that is to carry the now queued packet.

Secondary Router (SR) process 450, in response to the Call Setup request message, accesses database 416, specifically Network Service Provider list 1350 (see FIG. 13B), to obtain the ISDN directory number of the desired network service provider to handle this packet. The Call Setup Request message, along with the directory ISDN telephone number, is then passed, as symbolized by line 625 shown in FIG. 6, to Call Control process 461. Call Control process 461, interacting with Q.931 and Q.921 processes 463 and 465, respectively, will establish an ISDN call over an available B-channel to this network service provider.

Once an ISDN call has been properly established to the desired network service provider, Call Control process 461, in response to appropriate call completion messages sent to it by Q.931 process 463, will issue, as symbolized by line 630, a Connect Acknowledgement (ACK) Indication message to the secondary router process. The secondary router process, in turn, will issue a Link Establishment Request message containing the user account and password for the network service provider (to establish a session with that provider), as symbolized by line 635, to instruct the PPP daemon process to establish a network link and negotiate compression (or not) and multi-link PPP (or not) as specified in configuration data stored in database 416. As such, PPP daemon 440 will undertake to negotiate, across the ISDN connection to its peer, all PPP protocols (including network control protocols such as CCP, and multi-link PPP as specified in the database). In addition, the two PPP peers will also negotiate whether an IP address of the router will be dynamically assigned by the network service provider, through a DHCP server thereat, or not (i.e., use of a static public address). Once all the PPP negotiations are successfully concluded, PPP daemon process 440 will suitably update an entry in SBRT 446 to indicate the B-channel(s) in use for this call and the options being used therefor (e.g., multi-link PPP). In addition, PPP daemon process 440 will suitably inform the secondary router, by issuance of a Link Establishment Indication message and as symbolized by line 640, of the successful PPP negotiation. The secondary router, in turn, will inform Bandwidth Manager process 453 accordingly as to the bandwidth of the connection then established and the B-channel(s) therefor.

Now with the data connection having been completely and properly established to the desired network service provider, the secondary router will issue a Call Connect Indication message, as symbolized by line 645, back to PPP daemon process 440. Secondary router 450 will also issue, as symbolized by line 650, a Call Connect Indication message to DNS server 421. This message instructs the DNS server to save the remote destination ID, including, e.g., IP address and subnet mask pairs of the network service provider, and B-channel(s) number for this workstation, and to remove the packet from the waiting queue and send that packet back to the TCP/IP process 425. The destination IP address of the packet will be changed to the IP address of the DNS server for the remote network service provider. Once this packet is sent, as symbolized by line 655, to TCP/IP process 425, the TCP/IP process will route, as symbolized by line 660, that packet to PPP Daemon process 440. In response, the PPP daemon process will again check SBRT 446 to verify the B-channel(s) in use for this call. Once verified, the PPP daemon process will send the packet, via B-channel driver 442 and over the B-channel(s) now established for the call, to the particular network service provider for DNS translation.

Any subsequent packets to be carried during this session between this network service provider and this workstation will simply be routed to the provider via the LAN, Ethernet driver 428, TCP/IP process 425, PPP daemon process 440, B-channel driver 442, and the appropriate B-channel(s), as specified by the SBRT 446, connected to this provider.

c. Incoming ISDN call

FIG. 7 depicts interactions, in terms of predominant inter-process communications, that occur in the LAN modem to process an incoming ISDN call from a remote site. This operation would generally occur only in those situations where the LAN modem is to be configured from a remote site.

An incoming ISDN call will be signified by a Call Setup packet being received, as symbolized by line 705, via D-channel driver 470, from the PSTN. In response to this packet, Call Control process 461 will issue, as symbolized by line 710, a Call Indication message to Secondary Router 450 to establish a connection over the B-channel specified in the Call Setup packet. In response, the Secondary Router will issue, as symbolized by line 715, a Connect Request Message to complete an ISDN connection over that B-channel through the LAN modem for the incoming call.

In response to the Connect Request message, Call Control process 461, interacting with Q.931 and Q.921 processes 463 and 465, respectively, will complete an ISDN connection through the LAN modem over this B-channel, via the PSTN, to a present caller. Once the ISDN connection has been completed, Call Control process 461, in response to appropriate completion messages sent to it by Q.931 process 463, will issue, as symbolized by line 720, a Connect Acknowledgement (ACK) Indication message to the secondary router. The secondary router, in turn, will issue a Link Establishment Request message, as symbolized by line 725, to instruct the PPP daemon process to establish a network link and negotiate compression (or not) and multi-link PPP (or not) with its far-end PPP peer. As such, PPP daemon 440 will undertake to negotiate, across the ISDN connection to its peer, all PPP protocols (including network control protocols such as CCP. Once all the PPP negotiations are successfully concluded, PPP daemon process 440 will suitably update an entry in SBRT 446 to indicate the B-channel(s) in use for this call and the options being used therefor (e.g., multi-link PPP). In addition, PPP daemon process 440 will suitably inform the secondary router, by issuance of a Link Establishment Indication message and as symbolized by line 730, of the successful PPP negotiation. The secondary router, in turn, will inform Bandwidth Manager process 453 accordingly as to the bandwidth of the connection then established and the B-channel(s) therefor.

Now with the data connection having been completely and properly established to the caller, the secondary router will issue a Call Connect Indication message, as symbolized by line 735, back to PPP daemon process 440. Secondary router 450 will also issue, as symbolized by line 740, a Call Connect Indication message to DNS server 421 which instructs the DNS server to save the remote destination ID and B-channel(s) number in use for this call.

Any subsequent packets to be carried between the LAN modem and the caller will be routed through B-channel driver 442 (and the B-channel(s) for this call), PPP daemon process 440 and TCP/IP process 425 (and any local applications 1000 accessible therethrough).

d. ISDN call disconnect due to idle timeout

FIG. 8 depicts interactions, in terms of predominant inter-process communications, that occur within the LAN modem for disconnecting an existing ISDN call as a result of an idle timeout condition. This operation arises where an excessive period of inactivity occurs on an existing ISDN connection. To determine an appropriate level of ISDN call inactivity, two time periods are predefined in software: a minimum call duration of 2 minutes and an idle time interval of 30 seconds. These timers are implemented within Bandwidth Manager process 453. The LAN modem will maintain an ISDN call active for an illustrative minimum interval of two minutes; however, after this period expires, the call will be released and the connection torn-down for any period of inactivity, here referred to as "idle time", that exceeds illustratively 30 seconds. These time intervals, which are stored within database 416, are not critical and can be appropriately varied during configuration of the LAN modem.

Should an excessive period of inactivity occur, then an idle timeout timer, implemented within the Bandwidth Manager process, will reach the end of its timing interval and produce an appropriate indication, such as, e.g., a timer interrupt. In response to the expiration of this timing interval, an Idle Timeout message, symbolized by line 805, will be generated by the Bandwidth Manager process and supplied to Secondary Router process 450. This message will also contain the B-channel(s) that is affected and should be taken down. With the channel(s) identified and as symbolized by line 810, the secondary router will generate a Link Termination Request message to PPP daemon process 440 to terminate the ISDN connection on the affected B-channel(s). The PPP daemon process will then send appropriate network control packets to terminate the connection on the affected B-channel(s). PPP daemon process 440 will also inform its far-end peer that the link is being taken down. Once these packets have been sent, PPP daemon process 440 will update (specifically "cleanup") SBRT 446 to reflect that the now current availability of the affected B-channel(s). Once the SBRT has been appropriately updated, PPP daemon process 440 will issue, as symbolized by line 815, a Link Termination Indication message to Secondary Router 450 signifying that the ISDN data connection, from the standpoint of the PPP protocols, has, in fact, been terminated. The secondary router, in turn and as symbolized by line 820, will issue a Disconnect Request message, to Call Control process 461. This process, in conjunction with Q.931 and Q.921 processes 463 and 465, respectively, will issue appropriate ISDN signaling messages to the PSTN to disconnect, i.e., physically terminate, whatever ISDN connection may exist on the affected B-channel(s). Once this occurs, Call Control 461 issues, as symbolized by line 825, a Release Indication message to Secondary Router 450. The secondary router, in turn, issues, as symbolized by lines 830 and 835, Call Disconnect Indication messages to PPP daemon process 440 and BM process 453 and DNS server 421, respectively. In response to these disconnect messages, these processes remove any entries previously associated with the now terminated ISDN data connection.

4. Flowchart depictions

Having now described the inter-process interactions for various operations performed by the LAN modem, we will now turn to describing, through the use of flowcharts, the processing, undertaken by CPU 330 (see FIG. 3) within ISDN router 305 in the LAN modem, that specifically implements various inventive aspects of the LAN modem. As will become readily apparent from the following discussion and the accompanying flowcharts, for several of these aspects, the processing utilizes and extends across several of the software processes contained within software 400 (shown in FIG. 4B). To facilitate understanding, the reader should simultaneously refer to FIG. 4B throughout the following description.

a. Initial Configuration procedure

Figure 9B:
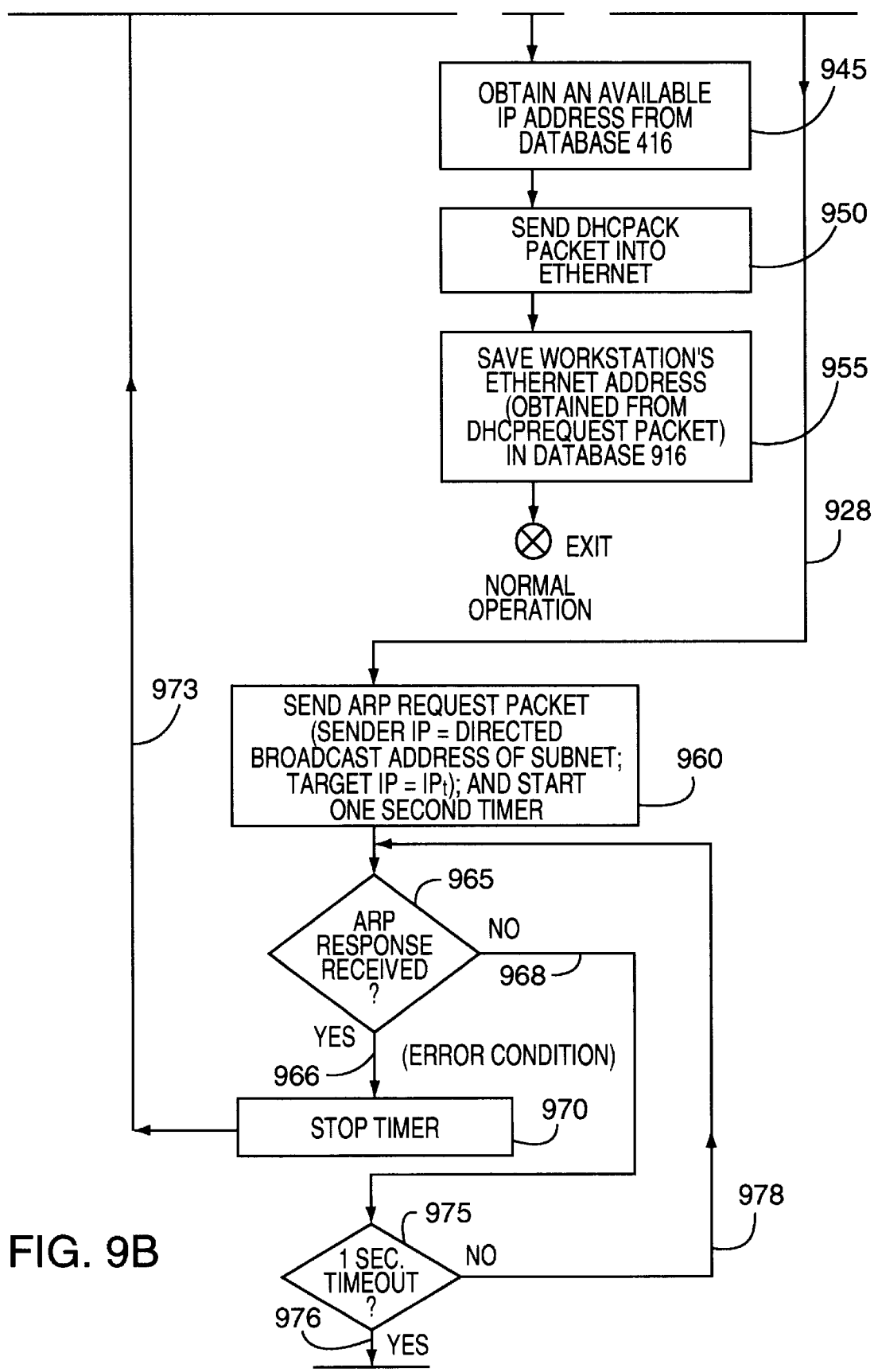

FIGS. 9A–9C collectively depict a flowchart of Initial Configuration procedure 900 performed by CPU 330; the correct alignment of the drawing sheets for these figures is shown in FIG. 9. As noted above, process 900 automatically adapts the current network settings of the LAN modem in order to establish network communications with the workstation, such as through illustratively a web browser executing thereat. Through this communication, a user stationed at the workstation can easily configure the LAN modem through the browser. This inventive aspect advantageously eliminates any need for a serial connection between the workstation and the LAN modem for purposes of configuring the latter. This procedure primarily utilizes processes 412, 415, 418, 425 and 428, and database 416, all shown in FIG. 4B.

In particular, upon entry into procedure 900 shown in FIGS. 9A–9C, execution proceeds to block 905. This block, when executed, determines whether the LAN modem is in a factory default state, i.e., whether the LAN modem has changed its IP address from a factory default setting through, e.g., an immediately prior execution of procedure 900. If the LAN modem is not in its factory default state, then execution exits from procedure 900 via NO path 909 emanating from decision block 905. Alternatively, if the LAN modem is in its factory default state, then decision block 905 routes execution, via YES path 907, to decision block 910.

Decision block 910, when executed, determines if a packet has been received over the LAN. This packet, if it exists, should originate from, illustratively the web browser executing on the single workstation which is then connected to the LAN. If no such packet has yet been received, execution loops back to the beginning of this block, via NO path 912 and path 973, to await receipt of this packet. Alternatively, if a packet has indeed been received over the LAN, decision block 910 routes execution, via YES path 914, to decision block 915. This latter block tests whether the packet is a unicast or broadcast type packet. If the packet is from a web browser executing in a workstation using dynamic addressing, as intended, then at this point in its initial handling of the TCP/IP protocol, the workstation is expected to broadcast a packet onto the LAN to provoke a response, from some other entity then connected to the network, that identifies a DHCP server. If the packet is a unicast packet, then the packet is simply ignored as being irrelevant to the configuration process. In this case, execution loops back from decision block 915, via paths 916 and 973, to block 910 pending receipt of the next packet on the LAN. Alternatively, if the received packet is a broadcast packet, as expected, then decision block 915 routes execution, via path 918, to decision block 920. This latter decision block routes execution, via one of three paths, depending upon a specific type of this broadcast packet. In particular, if the broadcast packet is other than a DHCP packet or an ARP (address resolution protocol) Request packet, then decision block 920 routes execution, via paths 922 and 924, to block 930 to discard this broadcast packet. Once this packet has been so discarded, then execution loops back, via paths 932 and 973, to decision block 910 to await receipt of the next packet.

Alternatively, if the broadcast packet is a DHCP packet, then decision block 920 routes execution, via paths 922 and 926, to decision block 935. At this point, the workstation is either inquiring with its peer, in this case DHCP server 418 in the LAN modem, as to the address of DHCP server or is requesting a DHCP address for itself from a DHCP server. Decision block 935 determines a type of the DHCP packet broadcast by the workstation. If the workstation has broadcast a DHCP Discover packet, i.e., inquiring as to the identity of a DHCP server, then decision block 935 routes execution, via path 936, to block 940. This block, when executed, obtains an IP address from database 416 for DHCP server 418. Block 940 then sends this address to the workstation via a DHCP Offer packet. Once this packet is sent, execution loops back, via paths 942 and 973, to decision block 910 pending receipt of the next packet. Now, if the type of the broadcast DHCP packet is a DHCP Request packet, specifying that the workstation has obtained an IP address of a DHCP server (in this case server 418) and is now requesting a dynamic IP address for itself, decision block 935 routes execution, via path 938, to block 945. At this point, the LAN modem obtains and assigns a dynamic IP address to the workstation. In particular, block 945 queries database 416, specifically Host list 1300 (see FIG. 13A) for an available entry. When such an entry is found, the corresponding IP address stored therein is read. Once this address has been obtained, block 950 executes to send this IP address to the workstation via a DHCP ACK (acknowledge) packet. After this packet is sent, execution proceeds to block 955 which saves the name and Ethernet address of the workstation, obtained from the DHCP Request packet, in database 416 and specifically within this entry is Host list 1300. As a result, this dynamic IP address is assigned to this particular workstation. Thereafter, execution exits from routine 900 such that the LAN modem can return to normal operation.

If, however, the type of packet that has been broadcast by the workstation is an ARP (address resolution protocol) Request packet, then the workstation already has an IP address for itself, though it does not know the Ethernet address of its peer on the LAN, i.e., the LAN modem. It is immaterial to the LAN modem how or where that IP address originated. As will be seen, the LAN modem will utilize that IP address. In particular, an ARP Request packet can occur as a result of the browser requesting communication with a DNS server for eventual URL to IP address translation, or with a default gateway should the browser have the IP address for that URL, or with another local workstation for other communication. In any case, the purpose of the ARP Request packet is for the workstation to obtain the physical Ethernet address of its peer, here the LAN modem, on the LAN—the workstation also has no knowledge as to the IP address of the LAN Modem. The ARP Request packet will respectively contain, as sending and destination IP addresses, the IP addresses of the sending workstation and of its target, i.e., its LAN peer or whatever the workstation believes that peer to be at the time, from which the workstation expects a response. Through use of the ARP protocol, only the target, recognizing its address as the destination, will respond to the ARP packet. For simplification, assume that the IP address of the sending workstation is denoted as $IP_s$, while that of its target, i.e., here the LAN Modem, is designated as $IP_t$.

At this point, the destination IP address in the ARP Request packet will not, in all likelihood, match the factory default IP address of the LAN modem. As the reader will now appreciate, to initiate communication between the LAN modem and the workstation, the LAN modem will change its IP address to match that of the IP peer with which the workstation is attempting to communicate. In particular, if the browser is attempting to access a default web page and has broadcast an ARP Request packet, containing a destination IP address of a gateway to which it assumes it is then physically connected, in order to obtain a physical network address of that gateway, the LAN modem will change its own IP address to match that of the gateway, as well as its subnet mask in order to place both the LAN modem and the workstation on the same subnet. Doing so will permit network communication to then occur between the LAN modem and the workstation. Subsequently, though not part of Initial Configuration process 900, once network communication has been established between the LAN modem and the workstation, then in response to a subsequent request issued by the browser for a default web page, the LAN modem will download a file, constructed by web server 412, that contains a default home page of the LAN modem through which the user at the workstation can then initiate configuration of the LAN modem.

Specifically, in response to the received ARP Request packet, decision block 920 routes execution, via paths 922 and 928, to block 960. This latter block sets the target IP address to IPt, and the source IP address to the directed broadcast IP address of the subnet and broadcasts an ARP Request packet back onto the LAN. The purpose of doing so is to elicit a response from any other network entity on the LAN having the same IP address as that sought by the workstation, such as another workstation—which represents an error condition. If such a network entity exists, it will respond to the ARP Request and supply its own Ethernet address. In addition, block 960 initiates a one-second timer. Execution then proceeds to decision block 965 to determine whether a packet has been received in response to the just broadcast ARP Request packet. If a response to this just broadcast ARP Request packet is received within the one-second timing interval, then an error condition has occurred. In this case, decision block 965 routes execution, via YES path 966, to block 970. This latter block stops the timer. Thereafter, execution loops back, via path 973, to decision block 910 to await receipt of the next incoming packet on the LAN. If, however, no such response packet is received, then decision block 965 routes execution, via NO path 968, to decision block 975. This latter block determines whether the one-second timing interval has elapsed. If this interval has not elapsed, then decision block 975 routes execution, via NO path 978, back to decision block 965 to continue testing for an occurrence of such a response during the remainder of this interval. Alternatively, if this interval elapses, then decision block 975 routes execution, via YES path 976, to block 980. Block 980, when executed, sets the IP address of the LAN modem to the target IP address in the ARP Request packet broadcast by the workstation; hence setting the IP address of the LAN modem to the IP address of a network peer from which the browser in the workstation expects a response. Thereafter, block 980 stores the IP address of the workstation, i.e., $IP_s$, and its associated Ethernet address within database 416. Once this occurs, block 980, given these IP addresses of the LAN modem and the workstation, calculates an appropriate value of a subnet mask that places both the workstation and the LAN modem on the same subnet and which can accommodate a least number of, but no less than three, additional hosts. Block 980 then saves the calculated subnet mask in database 416 as the subnet mask of the LAN modem. Once this occurs, block 980 determines and saves at least three more IP addresses in the same subnet within database 416 to accommodate up to three additional workstations that can be connected to the LAN modem. The IP address assigned to the workstation and the three additional addresses will each be stored as an IP address within a different host entry in Host list 1300. Thereafter, execution proceeds to block 985 which initiates a reset of the LAN Modem using its newly set IP address and subnet parameters just stored within database 416. Once the reset occurs, the LAN modem will no longer reside in its factory default state and will be able to communicate, over the LAN, with the workstation through the browser then executing therein.

b. Source-based IP routing

As discussed above, another inventive aspect of the LAN modem is its use of source-based routing. By routing packets based not only on the destination IP address of each packet but also and in accordance with our inventive teachings on its source IP address, the LAN modem can simultaneously accommodate multiple data connections to different ISPs—which is a result not possible with conventional routers. Consequently, through our inventive router, each of two users can advantageously be connected at the same time, through his(her) own workstation and the LAN modem, to his(her) own preferred ISP.

The inventive source-based routing utilizes, as shown in FIG. 10, within ISDN router 305, two separate routing engines in succession, specifically primary router (PR) procedure 1100 and secondary router (SR) procedure 1200—both of which are implemented in software. Primary router procedure 1100 is implemented within TCP/IP process 425 shown in FIG. 4B; secondary router procedure 1200 is implemented within secondary router process 450.

Primary router procedure 1100, shown in FIG. 10, provides conventional IP packet routing based on the destination of each IP packet applied to it. Incoming packets are first applied, on a packet-by-packet basis, to primary router 1100 which first routes each such packet, through Destination-Based Routing Table 432 (not specifically shown in this figure; see FIG. 4B), based on its destination IP address. Packets arrive at the primary router from three sources: from the LAN, from the local applications or from the secondary router procedure. For each such packet, the primary router has three basic routing choices: (a) to the LAN, e.g., to a workstation thereon; (b) based on a protocol field in the packet, to one of local applications 1000, including Telnet 411, HTTP 415, DHCP server 418 or DNS server 421 (all of which have been discussed above); or (c) lastly, for all other packet destinations, to the secondary router.

As for the secondary router procedure, incoming packets arrive at it either from the remote network accessible through ISDN line 40 or from the primary router. The secondary router procedure routes all packets incoming from the remote network to the primary router. Alternatively and essentially, each incoming packet arriving from the primary router is routed by the secondary router, as discussed in detail below in conjunction with Secondary Router Procedure 1200 shown in FIGS. 12A–12D, based on its source IP address and specification of permissible network service providers, to one of those providers. If a B-channel ISDN data connection is not then established to that provider, secondary router process 450 (see FIG. 4B) will instruct other processes, such as Call Control process 461, in the manner discussed above, to establish the connection over an available B-channel and, once the connection is so established, route the packet accordingly.

As discussed above, to accomplish source-based routing, secondary router 450 maintains and uses entries in database 416; specifically, Host list 1300 and Network Service Provider list 1350, both stored therein (see FIGS. 13A and 13B). The manner through which these lists are used for source-based IP routing will be discussed in detail below in conjunction with Secondary Router procedure 1200 shown in FIGS. 12A–12D.

FIG. 11 depicts a flowchart of Primary Router procedure 1100. As shown, upon entry into procedure 1100, execution first proceeds to block 1110. This block, when executed, receives an incoming packet from the LAN, one of local applications 1000 (see FIG. 4B) or from the secondary router procedure 1200. Once the packet is received, block 1120, shown in FIG. 11, executes to determine the destination IP address of that packet. Thereafter, based on the destination IP address, decision block 1130, next executed, routes execution to one of three paths depending on this address. If the IP address specifies a workstation (host) on the LAN, then decision block 1130 routes execution, via path 1135, to block 1140. This latter block, through accessing entry 1352 in Destination-Based Routing Table 432 (see FIG. 13C), sends the received packet out to the LAN to the appropriate host thereon among workstations 10 (see FIG. 3). Alternatively, if the destination IP address matches that of the LAN modem and a protocol field specifies one of local applications 1000, then, as shown in FIG. 11, decision block 1130 routes execution, via path 1135, to block 1150. This latter block routes the received packet to the appropriate local application. Lastly, if the destination IP address of the received packet specifies anything other than a host on the LAN or the LAN modem itself, then decision block 1130 routes execution, via path 1135, to block 1160. This latter block, through accessing entry 1354 in Destination-Based Routing Table 432 (see FIG. 13C), routes the received packet to secondary router procedure 1200 for eventual carriage, as specified in this entry over an ISDN connection to a remote network. Once block 1140, 1150 or 1160 has fully executed to appropriately route the received packet based on its destination IP address, execution loops back, via path 1165, to await the next incoming packet.

Figure 12A:
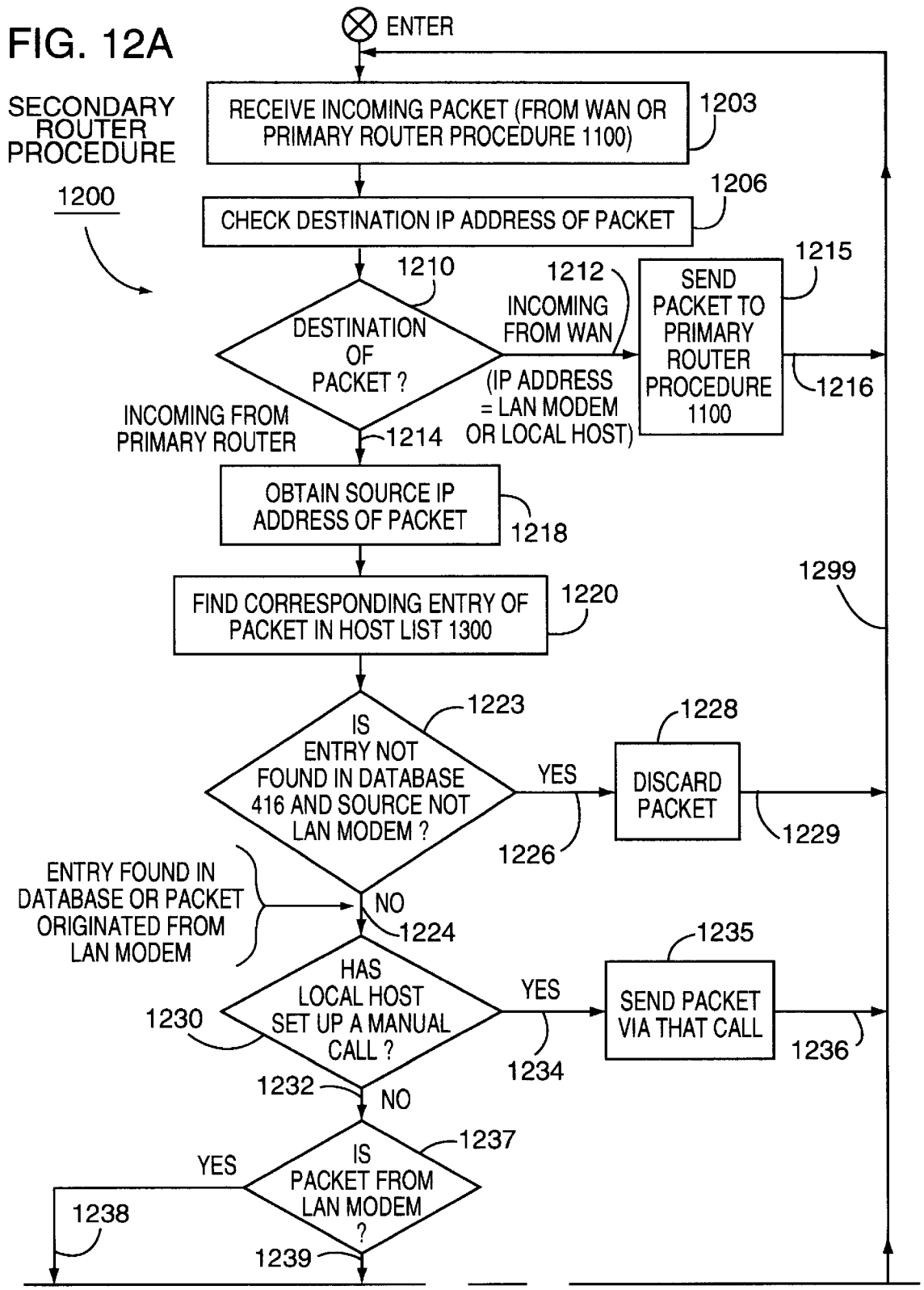
Figure 12B:
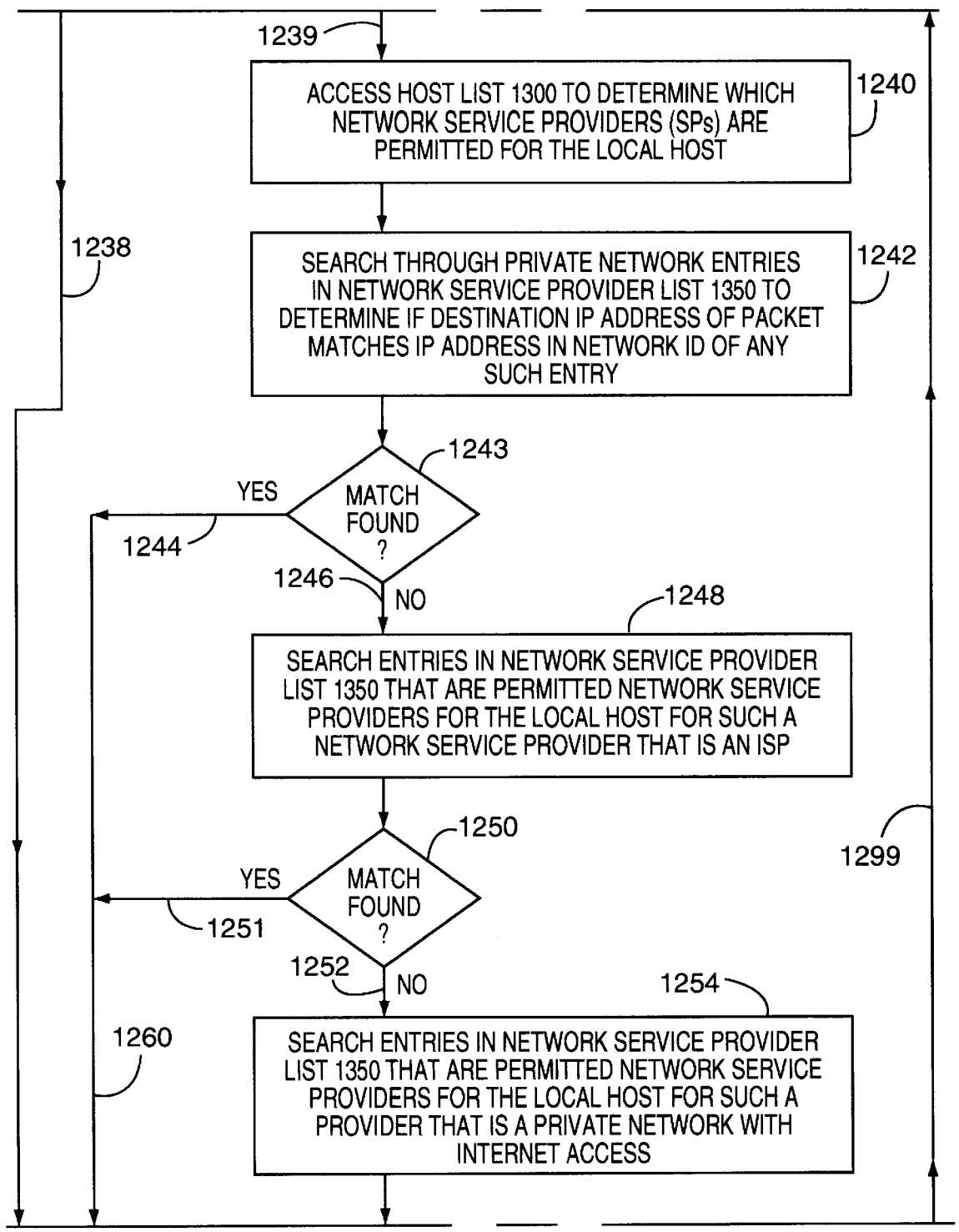
Figure 12D:
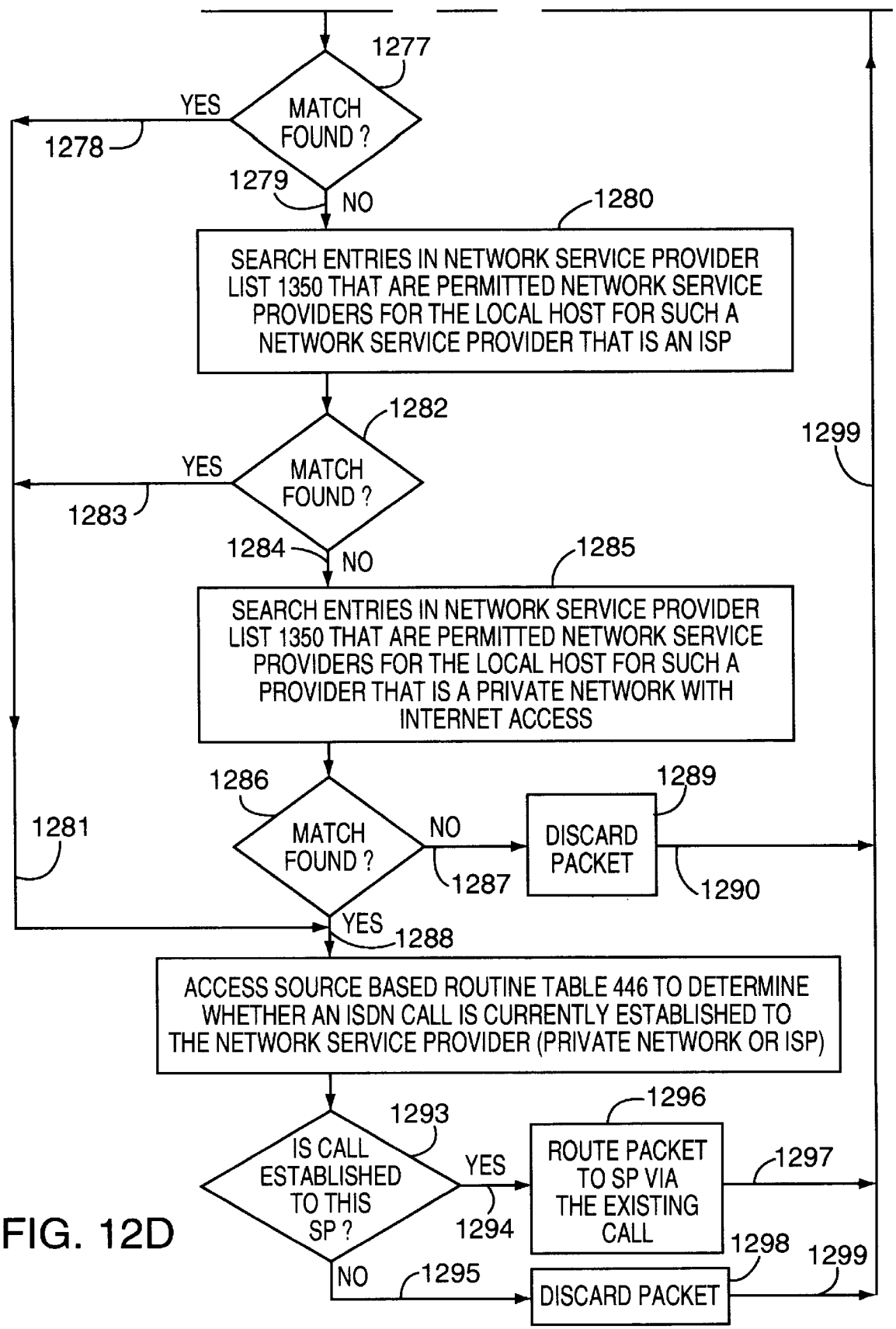

FIGS. 12A–12D collectively depict a flowchart of Secondary Router procedure 1200; the correct alignment of these figures being shown in FIG. 12.

As shown, upon entry into procedure 1200, execution first proceeds to block 1203 which, when executed, receives an incoming packet. As discussed above, the incoming packet can arise from either the WAN, connected to the LAN modem through an ISDN connection, or locally, via Primary Router procedure 1100. Thereafter, block 1206 is executed to check the destination IP address of that packet. Decision block 1210 then directs the packet accordingly based on its destination IP address. In particular, if the packet is incoming from the WAN, i.e., the destination IP of the packet is either for the LAN modem itself or a local host on the LAN, then decision block 1210 routes execution, via path 1212, to block 1215. This latter block, when executed, sends the incoming packet onward to Primary Router procedure 1100 for routing to the appropriate destination. Thereafter, execution loops back, via paths 1216 and 1299, to block 1203 to await the next incoming packet. Depending upon the configuration of the LAN modem, packets may have to flow through IP/Port Number Translation (NAT) module 435 for IP address/port number translations; for simplification, process 435 has been omitted from the present discussion.

Alternatively, if the packet is incoming from Primary Router procedure 1100, i.e., the packet is destined for the WAN, then decision block 1210 routes execution, via path 1214, to block 1218. This latter block obtains, from the packet itself, an IP address of the source of the packet. Execution then proceeds to block 1220, which searches through host list 1300 in database 416 (see FIG. 13A), to locate an entry therein that has an IP address that matches the source IP address of the incoming packet. Once this operation completes, execution proceeds to decision block 1223. Based on the results of the search, this decision block determines whether the packet has arrived from a valid source, i.e., whether the source IP address of the packet matches either an IP address contained within the Host list 1300 or the IP address of the LAN modem itself. If no such match is found, then the packet, for some reason, appears to originate from an invalid source and hence is erroneous. In that case, decision block 1223 routes execution, via YES path 1226, to block 1228. This latter block, when executed, merely discards the incoming packet. Thereafter, execution loops back, via paths 1229 and 1299, to block 1203 to await the next incoming packet.

If, however, the incoming packet originates from a valid source, such as a host on the LAN or the LAN modem itself, then decision block 1223 routes execution, via NO path 1224, to decision block 1230. This latter decision block determines, whether that host has manually established an existing ISDN connection. If this is the case, then the packet is simply routed over that connection to a remote network. Specifically, decision block 1230 routes execution, via YES path 1234, to block 1235 which, when executed, routes the packet over this particular ISDN connection then in use. Thereafter, execution loops back, via paths 1236 and 1299, to block 1203 to await the next incoming packet.

Alternatively, if a local host has not manually established an ISDN connection, then decision block 1230 routes execution, via NO path 1232, to block 1237. Decision block 1237 determines, from the source IP address in that packet and previously obtained through execution of block 1218, whether the incoming packet originates with the LAN modem itself; if not, then the packet originated with a host on the LAN. The LAN modem does not initiate a connection to a remote network. For any packet the LAN modem generates itself, the LAN modem merely sends that packet to an appropriate network service provider over an existing connection. However, for a packet originating with a host, the LAN modem selects an appropriate network service provider, and if a connection is not then established thereto, establishes such a network connection.

If the incoming packet does not emanate from the LAN modem itself, then execution proceeds, via NO path 1239, emanating from decision block 1237, to block 1240.

Through execution of blocks 1240–1256, the network service provider that is to carry the incoming packet, originating with a host on the LAN, will be selected. The order through which a network service provider will be selected for receiving the incoming packet is first to a network service provider that has a matching IP address to the destination address in the incoming packet; then, if no such network service provider then exists, to a network service provider that is an Internet service provider; and finally, if neither of the preceding network service providers exists, to a network service provider for a private network that provides Internet access. If an ISDN connection is not then established to the selected provider, such a connection will then be established. Thereafter, the incoming packet will be routed to the selected network service provider either over that newly established connection or a previously established and existing connection thereto.

In particular, block 1240, when executed, accesses Host list 1300 to determine, given the source IP address of the packet, which network service providers can be used by the corresponding host, i.e., which SPs are permitted to provide network access to that host. Once these providers have been determined, block 1242 executes. This block searches through the entries for these permitted network service providers in Network Service Provider list 1350 to determine if a Destination IP address in the incoming packet matches any network IP address (stored within the network ID information in each entry in this list) for these providers. If such a match is found, decision block 1243 routes execution, via YES path 1244 and path 1260, to block 1257. Alternatively, if such a match does not exist, then decision block 1243 routes execution, via NO path 1246, to block 1248. This latter block, searches through Network Service Provider list 1350 to determine, for those network service providers permitted to render network access to the host that issued the packet, whether such a network service provider is an ISP. If such a match is found, decision block 1250 routes execution, via YES path 1251 and path 1260, to block 1264. Alternatively, if such a match does not exist, then decision block 1250 routes execution, via NO path 1252, to block 1254. This latter block, searches through Network Service Provider list 1350 to determine, for those network service providers permitted to render network access to the host that issued the packet, whether such a network service provider provides access to a private network that affords Internet access. If, at this point, such a match is not found, decision block 1256 routes execution, via NO path 1258, to block 1261. Block 1261, when executed, merely discards the incoming packet. Thereafter, execution loops back, via paths 1262 and 1299, to block 1203 to await the next incoming packet. However, if a match is found through execution of decision block 1256, this block then routes execution, via YES path 1257, to block 1264.

Blocks 1264–1274 collectively determine whether an ISDN connection is established for the network service provider, selected through execution of blocks 1240–1256, and if not, to establish such a connection, and finally to route the incoming packet, that originated with a host on the LAN, to the selected network service provider over this connection.

In particular, block 1264, by querying Source-Based Routing Table 446 (see FIG. 4B) accesses an appropriate entry for the host that originated the incoming packet to determine whether an ISDN call is currently established to the selected network service provider. If an ISDN call is established to this provider, then decision block 1266, shown in FIGS. 12A–12D, routes execution, via YES path 1268, to block 1270. This latter block, when executed, routes the incoming packet over this established connection to the selected network service provider. Thereafter, execution loops back, via paths 1272 and 1299, to block 1203 to await the next incoming packet. Alternatively, if an ISDN connection is not established between the LAN modem and the selected network service provider, then decision block 1266 routes execution, via NO path 1267, to block 1273. This latter block, when executed, queues the incoming packet in a waiting queue until such time as an ISDN connection can be established to the selected network service provider. Once the packet is queued, then block 1274 executes to begin establishing, through Call Control process 461 (see FIG. 4B; with the inter-process communication for establishing such a connection being shown in FIG. 5) an ISDN connection to this network service provider. Once this connection has been fully established, including after all the PPP protocols have been negotiated, then the incoming packet is removed from the waiting queue and routed over the connection to the selected network service provider. Thereafter, execution loops back, via paths 1275 and 1299, to block 1203 to await the next incoming packet.

Now, if the incoming packet originated with the LAN modem, rather than a host on the LAN, then decision block 1237 directs execution via YES path 1238, to block 1276. Blocks 1276–1293 select an appropriate network service provider, with which the LAN modem has established a current ISDN connection, to which that packet is then routed. Blocks 1276–1293 are essentially the same as blocks 1240–1256.

In any event and in particular, block 1276, when executed, searches through the entries for all network service providers in Network Service Provider list 1350 to determine if a Destination IP address in the incoming packet matches any network IP address (stored within the network ID information in each entry in this list) for these providers. If such a match is found, decision block 1277 routes execution, via YES path 1278 and paths 1281 and 1288, to block 1292. Alternatively, if such a match does not exist, then decision block 1277 routes execution, via NO path 1279, to block 1280. This latter block, searches through Network Service Provider list 1350 to determine, for those network service providers permitted to render network access to the host that issued the packet, whether such a network service provider is an ISP. If such a match is found, decision block 1282 routes execution, via YES path 1283 and path 1281, to block 1292. Alternatively, if such a match does not exist, then decision block 1282 routes execution, via NO path 1284, to block 1285. This latter block, searches through Network Service Provider list 1350 to determine, for those network service providers permitted to render network access to the host that issued the packet, whether such a network service provider provides access to a private network that affords Internet access. If, at this point, such a match is not found, decision block 1286 routes execution, via NO path 1287, to block 1289. Block 1289, when executed, merely discards the incoming packet. Thereafter, execution loops back, via paths 1290 and 1299, to block 1203 to await the next incoming packet. However, if a match is found through execution of decision block 1286, then this block routes execution, via YES path 1288, to block 1292.

Thereafter, execution proceeds to blocks 1292–1296 to route the incoming packet, originating from the LAN modem, to the selected network service provider.

In particular, block 1292, by querying Source-Based Routing Table 446 (see FIG. 4B), determines whether an ISDN call is currently established to the selected network service provider. If an ISDN call is established to this provider, then decision block 1293 routes execution, via YES path 1294, to block 1296. This latter block, when executed, routes the incoming packet over this established connection to the selected network service provider. Thereafter, execution loops back, via paths 1297 and 1299, to block 1203 to await the next incoming packet. Alternatively, if an ISDN connection is not established between the LAN modem and the selected network service provider, then decision block 1293 routes execution, via NO path 1295, to block 1298. This latter block, when executed, merely discards the packet; inasmuch as the LAN modem does not initiate an ISDN call to a remote network service provider for any packet that originated with the LAN modem. Thereafter, execution loops back, via paths 1299, to block 1203 to await the next incoming packet.

c. Internal DNS and DHCP servers and Interception of Remote DNS Request for Error Handling As discussed above, the LAN modem contains internal co-operating DHCP and DNS servers that are integrated with routing and call management processes, all utilizing a shared database, i.e., database 416 (see FIG. 4B).

Use of the internal DNS server provides local name-to-address resolution such that, for user convenience and simplicity, each workstation on the LAN can be addressed in terms of its machine name rather than its IP address. Furthermore, the DNS server, by using a shared database with the DHCP server, operates transparently of any user to acquire machine names of all the workstations connected to the LAN and then provide suitable machine name to IP address resolution, as needed, for all communication between the LAN modem and these workstations as well as between any pair of workstations themselves. In addition, the DNS server given a DNS query, will determine, based on the source of the query, i.e., which specific workstation generated it, and the destination to which the query is directed (e.g., another host on the LAN as identified by the machine name of the host, the LAN modem itself or a remote network), the DNS server to which the query is to be routed and will then route the query accordingly to that server. As such, the LAN modem hides from a host the selection of the DNS server that is utilized in conjunction with a remote network accessible through a given network service provider and which will be used in a given instance. Doing so significantly simplifies the use of the DNS in each workstation connected to the LAN modem, and further facilitates use of either static or dynamic IP addressing for each workstation. In addition, the DHCP server provides the IP address, subnet mask, gateway and DNS server addresses to the local workstations, thereby eliminating any need to manually configure and administer these items at each workstation. Furthermore, any workstation is always assigned the same IP address from the DHCP server, rather than having its IP address change from session to session, as would normally occur with dynamic IP addressing. Consequently, the user profile associated with each workstation can be easily maintained and identified using its host IP address, and the number of workstations, that are simultaneously allowed to use the LAN modem, can be very easily controlled.

FIG. 14 depicts a flowchart of DHCP Induced IP Address Request procedure 1400. Procedure 1400 provides a host IP address in response to a DHCP Request packet in order to effectuate machine name to IP address resolution for an additional workstation (host) that has been connected to the LAN.

Specifically, upon entry into procedure 1400, execution first proceeds to decision block 1410. This block, when executed, determines whether the Ethernet address of the additional host equals that of one of the hosts in Host list 1300 (see FIG. 13A). If this address matches the Ethernet address in the host list, i.e., indicative of this host already being connected to the LAN and having an IP address allocated to it in the Host list, then, as shown in FIG. 14, decision block 1410 routes execution, via YES path 1413, to block 1420. This latter block, when executed, tests whether the machine name is specified in the DHCP Request packet and whether that machine name is not the same as that in the host entry in the Host list. In that regard, if a host is not configured to have a machine name, then the DHCP Request packet will not contain a machine name field. Moreover, the machine name in the host entry is only changed if the machine name in the DHCP Request packet differs from that in the entry. If such a different machine name is specified in the DHCP Request packet, then decision block 1420 routes execution, via YES path 1422, to block 1425; otherwise, execution is routed, via NO path 1424 to block 1430. Block 1425, when executed, replaces the machine name in the Host list for this particular host, at this point typically being a default value of "UnknownPC_x" (where x is a numeral between, illustratively, 1–4 for the preferred embodiment; see FIG. 13A), with the host name, i.e., machine name, provided in the DHCP Request packet. Execution then proceeds to block 1430, shown in FIG. 14, which assigns a Host IP address to this particular host from the IP address stored in the entry for this host in Host list 1300 and provides that IP address back to this host, via a DHCP ACK (acknowledge) packet. Once this occurs, execution then exits from procedure 1400.

Alternatively, if no entry in the Host list contains the Ethernet address of the additional host, then decision block 1410 routes execution, via NO path 1417, to decision block 1440. This latter decision block determines from the number of entries in Host list 1300 whether the host list can accommodate another entry, i.e., whether less than four workstations (or other network devices) for the preferred embodiment have been connected to the LAN and configured for network access through the LAN modem. If no free host entry exists within the host list, then execution merely exits, via NO path 1442, from procedure 1400. This additional workstation simply can not be accommodated and represents an error condition, in that now more than a maximum number of workstations (and network devices) (the maximum being four such devices in the preferred embodiment) are connected to the LAN through, for example, a hub that is connected to one port of the LAN. However, if a free entry then exists in the host list, then decision block 1440 directs execution, via YES path 1444, to decision block 1445. This latter block determines whether the DHCP Request packet specifies a machine name. Only if such a name is specified will an entry in the Host list be updated to reflect that name. If the DHCP Request packet specifies a machine name, then decision block 1440 routes execution, via YES path 1446, to block 1450; otherwise, execution is routed, via NO path 1448, to block 1460. Block 1450 stores information regarding this additional host into the host list, in order to accommodate this additional host. In particular, block 1450, when executed, replaces the machine name in the Host list for the additional host, at this point typically being a default value of "UnknownPC_x", with the host name, i.e., machine name, provided in the DHCP Request packet. Execution then proceeds to block 1460 which replaces the Ethernet address (at this point typically being a default address of zero, as shown in FIG. 13A) in the entry in the Host list with the actual Ethernet address of this additional host as supplied in the DHCP Request packet. Thereafter, block 1470, shown in FIG. 14, executes to assign the IP address of the free host entry to the requesting host by providing that IP address to the host, via a DHCP ACK (acknowledge) packet. Once this occurs, execution then exits from procedure 1400.

Figure 15B:
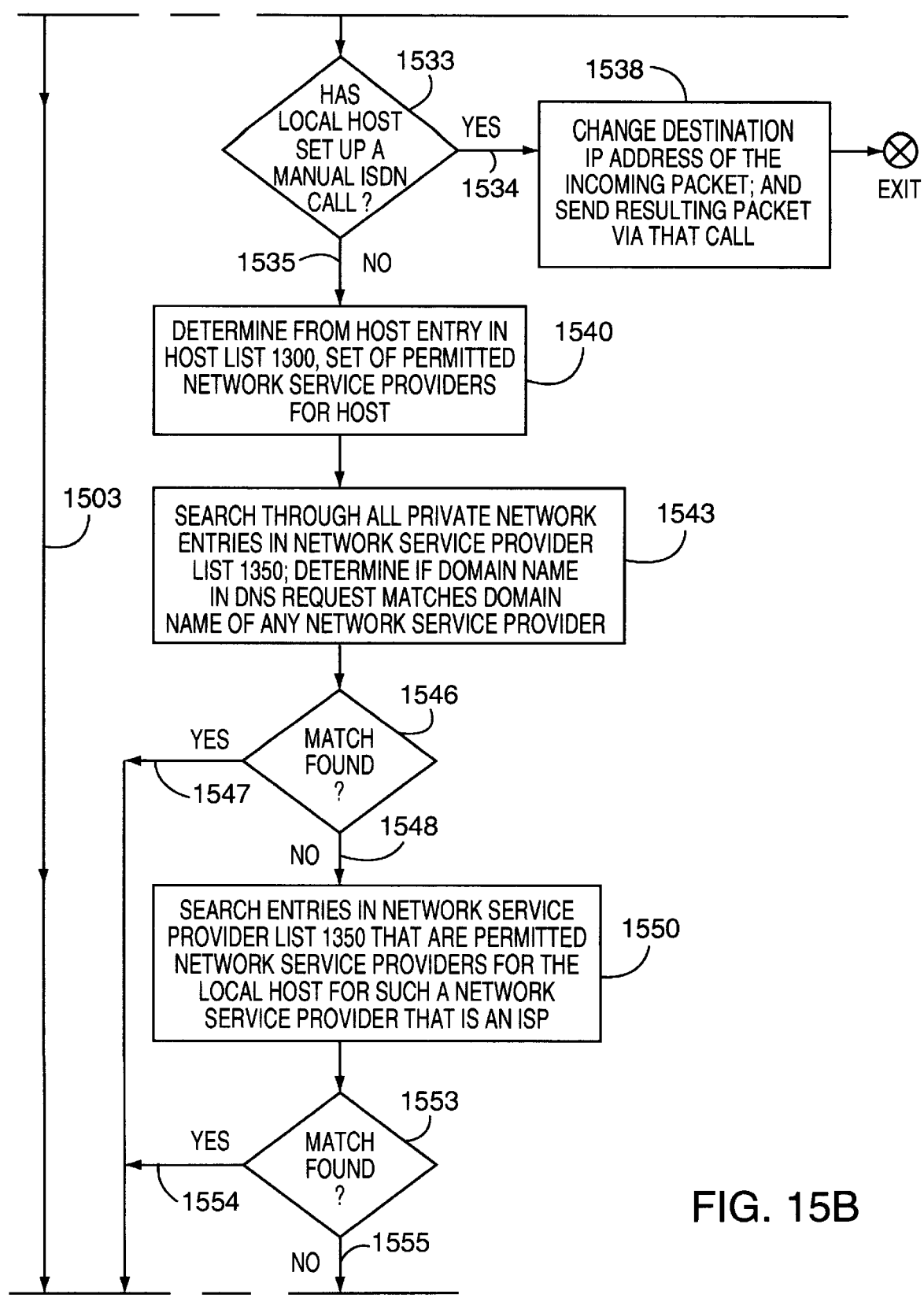
Figures 15, 15D:
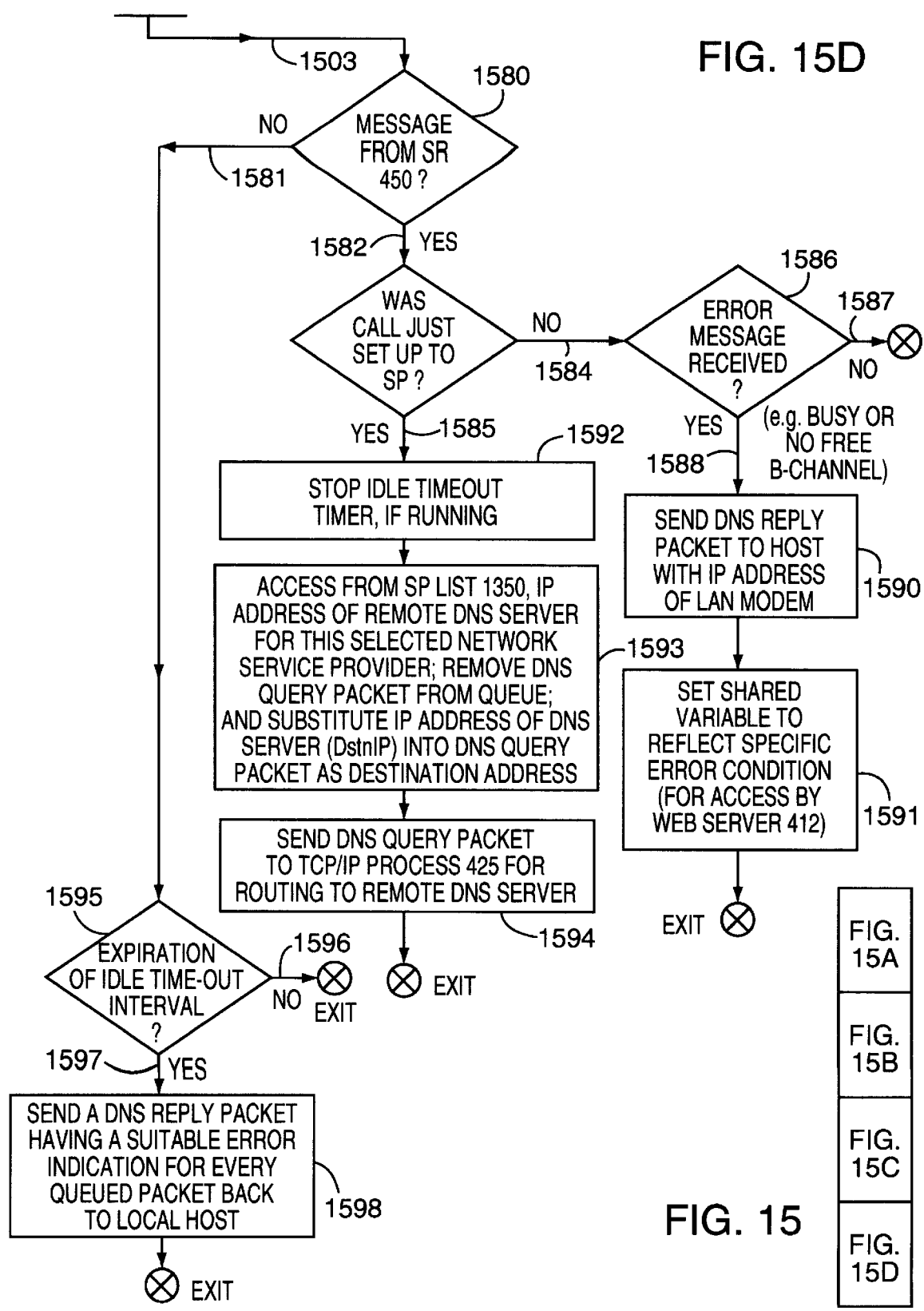

FIGS. 15A–15D collectively depict a flowchart of DNS Induced IP Address Request procedure 1500; the correct alignment of the drawing sheets for these figures is shown in FIG. 15. Procedure 1500 implements two basic functions; namely, providing an IP address of a proper DNS server in response to either a DNS Query packet from any host connected to the LAN, and properly handling expiration of the idle timeout interval.

Specifically, upon entry into procedure 1500 execution first proceeds to decision block 1502 to test an incoming packet. If this packet is a DNS query packet, then decision block 1502 routes execution, via YES path 1504, to decision block 1506. This latter decision block determines whether the host name in the DNS query packet matches that of the LAN modem, i.e., a workstation is querying the LAN modem to specify the address for its internal DNS server. If the names match, then execution proceeds, via YES path 1508, to block 1510. This latter block, when executed, forms a DNS Reply packet containing the IP address of the LAN modem itself, and then sends that packet to TCP/IP process 425 for eventual routing, via the LAN, to the requesting local host (workstation). Execution then exits from procedure 1500. Alternatively, if the host name in the DNS query packet does not match that of the LAN modem, then decision block 1506 routes execution, via NO path 1507, to decision block 1512. This latter decision block determines, through accessing the host list (see FIG. 13A) whether the host name in the DNS query packet matches the host name of any of the workstations on the LAN. If such a match is found, then execution proceeds, via YES path 1513 shown in FIG. 15A, to block 1516. This latter block, when executed, forms a DNS Reply packet containing the IP address of that particular host on the LAN, and then sends that packet to TCP/IP process 425 for eventual routing, via the LAN, to the requesting local host (workstation). Execution then exits from procedure 1500.

Alternatively, if the host name in the DNS query packet does not match that of any host on the LAN, then decision block 1512 routes execution, via NO path 1514, to block 1520. This latter block, when executed, extracts the source IP address from the DNS query packet, i.e., the IP address of the particular host on the LAN that originated this packet. Thereafter, block 1523, given this source IP address, accesses Host list 1300 for an entry for this particular host. Once this access completes, execution proceeds to decision block 1526. This decision block determines whether a known host exists, i.e., whether a host entry was retrieved from host list 1300 in response to the source IP address. If no such host exists with this source IP address, then an unauthorized host on the LAN has been detected. Accordingly, decision block 1526 routes execution, via NO path 1527, to block 1530 which, in turn, discards the DNS query packet. Execution then exits from procedure 1500. However, if a host entry was found, i.e., the host on the LAN which generated the DNS query packet is valid, then decision block 1526 routes execution, via YES path 1528, to decision block 1533. This latter decision block determines whether that particular host has manually established an existing ISDN connection. If this is the case, then the packet is simply routed over that connection to a remote network. Specifically, decision block 1533 routes execution, via YES path 1534, to block 1538 which, when executed, changes the IP address of the packet by substituting the IP address of a remote DNS server associated with that network into the packet as its destination IP address. Thereafter, block 1538 routes the resulting packet over this particular ISDN connection then in use. Execution then exits from procedure 1500.

Alternatively, if a local host has not manually established an ISDN connection, then decision block 1533 routes execution, via NO path 1535, to block 1540. Through execution of blocks 1540–1560 (similar to execution of blocks 1240–1256 in procedure 1200 shown in FIGS. 12A–12D), the network service provider that is to carry the DNS query packet will be selected. The order through which a network service provider will be selected for receiving this packet is first to a network service provider that has a matching domain name to that in the incoming packet; then, if no such network service provider then exists, to a network service provider that is an Internet service provider; and finally, if neither of the preceding network service providers exists, to a network service provider for a private network that provides Internet access. If an ISDN connection is not then established to the selected provider, such a connection will then be established. Thereafter, the DNS query packet will be routed, with a changed destination IP address, to the selected network service provider, either over that newly established connection or a previously established and existing connection thereto.

In particular, block 1540, when executed, accesses Host list 1300 to determine, given the host entry, which network service providers can be used by the corresponding host, i.e., which (SPs) are permitted to provide network access to that host. Once these providers have been determined, block 1543 executes. This block searches through the entries for these permitted network service providers in Network Service Provider list 1350 to determine if a domain name in the DNS query packet matches the domain name (stored within the network ID information in the each entry in this list) in the entries for any of these providers which are private networks. If such a match is found, decision block 1546 routes execution, via YES path 1547 and path 1565, to block 1566. Alternatively, if such a match does not exist, then decision block 1546 routes execution, via NO path 1548, to block 1550. This latter block, searches through Network Service Provider list 1350 to determine, for those network service providers permitted to render network access to the host that issued the packet, such a provider that is an ISP. If such a match is found, decision block 1553 routes execution, via YES path 1554 and path 1565, to block 1566. Alternatively, if such a match does not exist, then decision block 1553 routes execution, via NO path 1555, to block 1558. This latter block, searches through Network Service Provider list 1350 to determine, for those network service providers permitted to render network access to the host that issued the DNS query packet, whether such a network service provider provides access to a private network that affords Internet access. If a match is found, block 1560 routes execution, via YES path 1562 and 1565 to block 1566. If, at this point, such a match is not found, decision block 1560 routes execution, via NO path 1561, to block 1564. Block 1564, when executed, sends a DNS reply packet, to the local host, containing an error indication specifying that a DNS server can not be found. Thereafter, execution exits from procedure 1500.

Blocks 1566–1578 collectively determine whether an ISDN connection is established for the network service provider, selected through execution of blocks 1540–1560, and if not, to establish such a connection, and finally to route the DNS query packet to the DNS server at the selected network service provider over this connection.

In particular, block 1566 by querying Source-Based Routing Table 446 (see FIG. 4B) accesses an appropriate entry therein for the host that originated the DNS query to determine whether an ISDN call is currently established to the selected network service provider. If an ISDN call is established to this provider, then decision block 1570, shown in FIGS. 15A–15D, routes execution, via YES path 1571, to block 1574. This latter block, when executed, accesses from Network Service Provider (SP) List 1350 the IP address of the remote DNS server for this particular network service provider. Once this address (denoted "DstnIP") is accessed, this block then substitutes this address as the destination IP address, in lieu of the address of the LAN modem, into the DNS query packet. Thereafter, block 1576 executes to send the resulting DNS query packet, now containing the IP address of the remote DNS server, to TCP/IP process 425 for routing to the selected network service provider and specifically the remote DNS server associated therewith. Execution then exits from procedure 1500.

Alternatively, if an ISDN connection is not established between the LAN modem and the selected network service provider, then decision block 1570 routes execution, via NO path 1572, to block 1577. This latter block, when executed, queues the DNS query packet in a waiting queue until such time when an ISDN connection can be established to the selected network service provider. Once the packet is queued, then block 1578 executes to begin establishing, through Call Control process 461 (see FIG. 4B; with the inter-process communication for establishing such a connection being shown in FIG. 6) an ISDN connection to this network service provider. Execution then exits from procedure 1500.

Now, if the incoming packet is not a DNS query packet, then decision block 1502 routes execution, via NO path 1503, to decision block 1580. This latter decision block tests whether the packet contains a message from secondary router 450, i.e., indicative of whether a requested ISDN call to the selected network service provider was successfully established by the LAN modem or not. If the packet contains such a message, then decision block 1580 routes execution, via YES path 1582, to decision block 1583.

If the call was attempted but for whatever reason, could not be established to the selected network service provider, then decision block 1583 routes execution, via NO path 1584, to decision block 1586. This latter decision block determines whether the secondary router provided an error message regarding this attempted call. If no such error message was received, then execution exits from routine 1500, via NO path 1587 emanating from decision block 1586. If, however, secondary router 450 provided an error message, such as an indication of a busy connection or that a B-channel was not then available and hence the call could not be placed, execution proceeds, via YES path 1588, to block 1590. Block 1590 sends a DNS reply packet back to the requesting host but with the IP address of the LAN modem itself as the IP address of the remote DNS server. Thereafter, block 1591 executes to set a shared (global) variable maintained within database 416 to signify the particular failure, such as, e.g., a busy connection, that then prevented the call from being established. Execution then exits from procedure 1500.

Once the browser in the host, that issued the DNS query packet, receives this DNS reply packet, that browser will then issue a request to what it believes to be the remote DNS server to translate the domain name of a desired web server (typically that which stores a default web page defined in the browser) and then fetch a particular web page (e.g., the default page) therefrom. Though the browser will naturally assume that the IP address it received in the reply packet is that of a remote DNS server, in actuality it is that of the LAN modem itself—in effect the LAN modem has intercepted the DNS request from the host, i.e., a remote DNS server. TCP/IP process 425 (see FIG. 4B) within the LAN modem, in receiving this domain name translation request, will route this request to DNS server 421 which will return the IP address of the LAN modem itself. Once this occurs and the host issues a request to fetch the default page, web server 416, in response to receiving this request as routed to it by TCP/IP process 425, will test the shared (global) variable and determine, by the value of this variable, that an error condition has just occurred, and specifically the reason why an ISDN connection could not be completed then. Consequently, the web server, rather than returning a requested default page to the browser, will dynamically construct, through insertion of error-specific code segment (s) into a predefined page template, a web page that specifies an error condition has occurred, i.e., that an ISDN connection could not be established, and the specific reason why, e.g., the destination was busy or no B-channel was then available to accommodate the connection and then download this page, via TCP/IP process 425, to the host. The inventive manner through which this page is dynamically constructed to depict an error condition is discussed in detail below in conjunction with FIGS. 22–26.

Alternatively, if the call was successfully established, including negotiation of all PPP protocols as appropriate, then decision block 1583, shown in FIGS. 15A–15D, routes execution, via YES path 1585, to block 1592. This latter block, when executed, stops the idle timeout timer, if it is then running. As noted above, an error condition arises if an ISDN connection can not be established within the idle timeout period. Once the timer is stopped, then block 1593 is executed. Block 1593 accesses, from Network Service Provider (SP) list 1350, the IP address (denoted "DstnIP") of the remote DNS server for this particular network service provider. Thereafter, this block removes the DNS query packet from the waiting queue. Once this occurs, block 1593 substitutes the IP address ("DstnIP") of the remote DNS server as the destination IP address, in lieu of the address of the LAN modem, into the DNS query packet. Thereafter, block 1594 sends the resulting DNS query packet, now containing the IP address of the remote DNS server, to TCP/IP process 425 for routing to the selected network service provider and specifically the remote DNS server associated therewith. Execution then exits from procedure 1500.

If, alternatively, the incoming packet is neither a DNS query packet nor contains a message from secondary router 450, then decision block 1580 routes execution, via NO path 1581, to decision block 1595. This latter decision block determines whether the packet indicates that the idle timeout interval has just elapsed, indicative that an ISDN call could not be completed during an allotted idle time interval (typically 30 seconds, though subject to change by a user at a host during configuration of the LAN modem). If the incoming packet does not indicate such a timeout condition, then execution simply exits from procedure 1500, via NO path 1596 emanating from decision block 1595. Alternatively, if such a timeout condition occurred, then decision block 1595 routes execution, via YES path 1597, to block 1598. For every queued DNS query packet from the local host, block 1598 sends a DNS reply packet containing a suitable error message back to that host. Once the reply packet(s) has been so sent, execution exits from procedure 1500.

As noted above, any host (workstation) on the LAN is always assigned the same IP address from the DHCP server within the LAN modem, rather than having the IP address possibly change from session to session, as would normally occur with dynamic IP addressing. This is accomplished, within DHCP server 418 (see FIG. 4B) located within the LAN Modem, by simply ignoring a request from the host, i.e., through an IP Address Release message issued by the DHCP protocol in the host, to release any IP address previously assigned to that host. Hence, once an association is established within the host list between a host and a given Ethernet address, that host as it re-establishes a network connection to the LAN modem is always assigned the same dynamic IP address—absent any intervening loss of power to the LAN modem which, upon a subsequent power-on reset, re-initializes the LAN modem and sets entries in the host list back to their default values shown in FIG. 13A. By maintaining the same IP address assignments for the individual workstations as, over the course of time, new host sessions and network connections are established therefor over the LAN, the user profile associated with each workstation, as well as the host list itself, will be subject to far fewer updates than if these addresses were to regularly change and this information constantly modified to track these changes, and is thus easier to access and administer. This, in turn, advantageously simplifies the underlying administrative code and saves processing time. Moreover, the number of workstations that is simultaneously allowed to use the LAN modem at any one time can be very easily controlled by merely counting the number of entries then in use in the host list.

d. Program storage and firmware integrity

Flash memory provides non-volatile data storage, though its access speed is relatively slow compared to DRAM 372. Consequently, all the program code and data values for the LAN modem, as discussed above, are stored in flash memory 376 shown in FIG. 3. During a power-on boot phase, the boot program executes to copy the executable program code from the flash memory into the DRAM, from which this code is then read and executed.

Conventionally speaking, information stored within volatile memory, such as DRAM, is subject to being corrupted from transient phenomena, such as power surges and the like. In that regard, if the contents of a location in DRAM 372 that stores part of a program then being executed, were to become corrupted, errant program execution may result to the ultimate detriment of any then on-going network communication between a host and a remote network. To prevent such errant operation, the LAN modem strictly controls write access to the flash memory through use of a key-based software implemented lock. In addition, the LAN modem continually checks, on a location-by-location basis, the executable code stored within DRAM against the same executable code stored in the flash memory for any discrepancies therebetween and, should any such discrepancy be found, corrects, by over-writing, the contents of the location in the DRAM with the contents of the corresponding program location in the flash memory. Through these two processes, the integrity of the contents of the flash is assured by substantially reducing any likelihood that the mode of the flash memory can be erroneously changed from read-only to read/write. The integrity of the executable code (firmware) in the DRAM is maintained by continually and repeatedly comparing and correcting it to identically reflect that stored within the flash memory. This process of continual comparison and correction continually executes as a fully preemptable background process during those intervals that would otherwise constitute idle processing time for CPU 330 (see FIG. 3).

Figure 16:
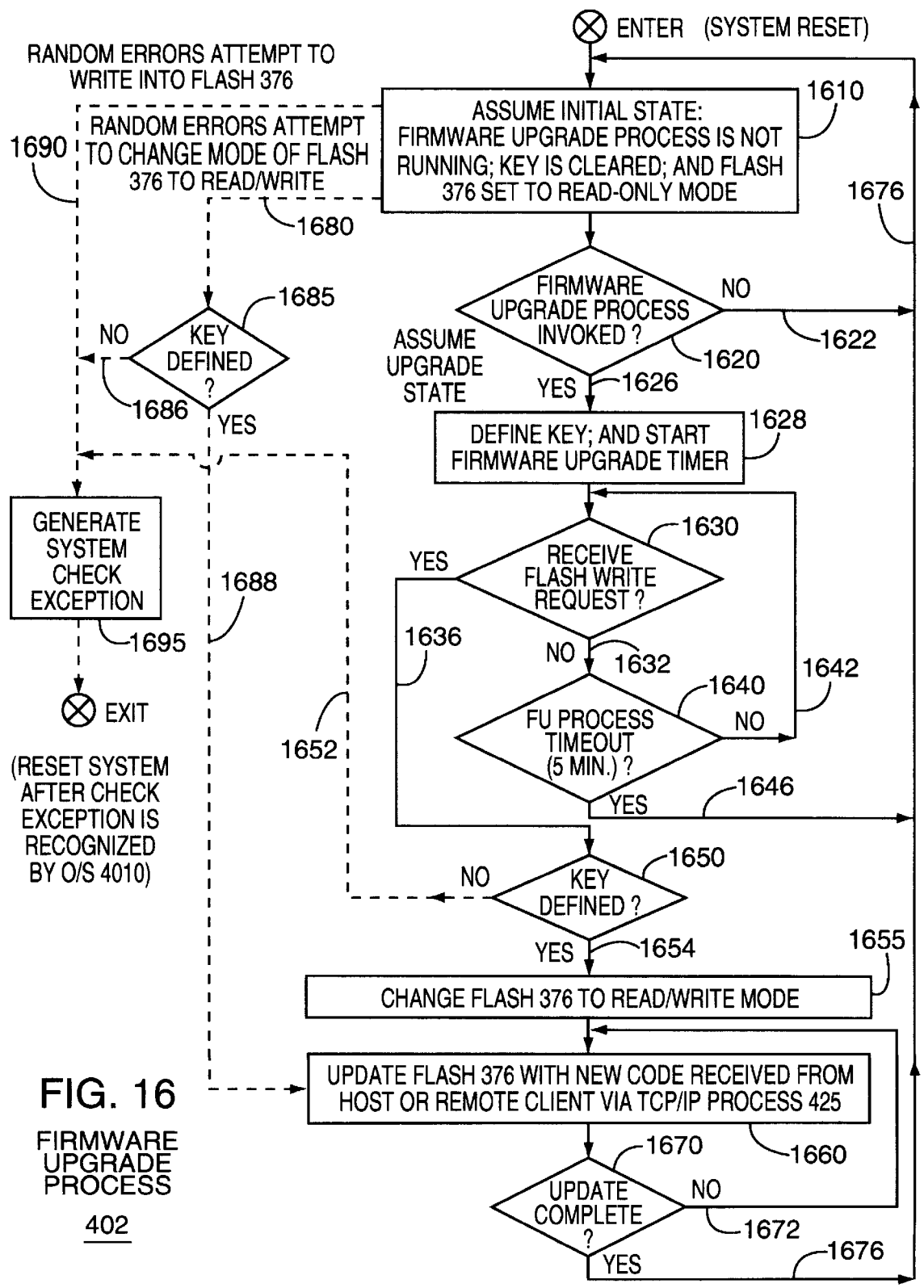
FIG. 16 depicts a flowchart of Firmware Upgrade (FU) process 402 shown in FIG. 4B that is also performed by CPU 330.

FIG. 16 depicts a flowchart of Firmware Upgrade (FU) process 402. This particular process, which forms part of software 400 shown in FIG. 4B all of which executes in foreground, limits write access to the flash memory on a key-controlled basis.

Specifically, process 402 is spawned by Configuration Manager 401 upon system reset, typically in response to a power-on reset. Upon entry into this process, execution proceeds to block 1610, shown in FIG. 16, which places this process in an initial state. During normal operation of the LAN modem, process 1610 will remain in this state at all times with exception of rather brief intervals, no longer than illustratively five minutes, during which the flash memory is set to a write mode to permit an actual upgrade of the firmware stored therein to be initiated from a remote file server. In this initial state, the firmware upgrade process is not running, contents of a write access key register are cleared to zero, and flash memory 376 is set to a read-only mode. The write access key itself is stored within the flash memory as a predefined unique 32-bit (four-byte) value. Its particular value, assigned during manufacture, is not critical, though preferably it should be a random or pseudo-random number to ensure its uniqueness, i.e., a value that has an extremely high probability of not naturally occurring or arising from an errant phenomena. As will be discussed below, in order to change the mode of the flash memory from read-only to read/write, the value of this key must be copied from its original location in flash memory into a write access key register in DRAM. Then, if and only if the value of the key as stored in this register matches the key in its original location in flash memory, the mode of the flash memory will be changed from read-only to read/write. If a proper value for the key is selected during manufacture, then the likelihood that an errant process will set, i.e., corrupt, the contents of the 32-bit key register in such a manner that the contents of this register will exactly match the key stored in flash memory is less than 1 in a billion, thus assuring that the integrity of the code stored in the flash memory is maintained to a very substantial degree, typically to an error level of less than one part in a billion.

After block 1610 has been executed, decision block 1620 periodically determines whether a firmware upgrade process has been invoked. If this process has not been invoked, then decision block 1620 loops back execution, via NO path 1622 and path 1676, back to block 1610, such that process 1600 remains in its initial state until such time as a user has invoked a firmware upgrade process.

Alternatively, if the user has just invoked a firmware upgrade, then decision block 1620 routes execution, via YES path 1626, to start the firmware upgrade process. As such, process 402 enters an upgrade state. Execution proceeds to block 1628 which first reads the 32-bit value of the key stored in its original location in flash memory and writes that value into the write access key register. Thereafter, block 1628 resets and starts a software-implemented timer, i.e., a firmware upgrade timer illustratively five minutes in duration. Once a firmware upgrade process has been invoked, the upgrade, if it is to occur, must start within this interval. If a flash write request does not arise within this interval, then the firmware upgrade process is terminated with process 402 returning to its initial state; thereby requiring the user to re-invoke the upgrade process should (s)he desire to proceed with an upgrade.

Decision blocks 1630 and 1640 determine whether a flash write request occurs within this timing interval. In particular, decision block 1630 tests whether a flash write request was received from a host on the LAN or a remote client. This request results from a process executing at the file server that, with an exception of responding to a request from the Configuration Manager to initiate the upgrade process, is otherwise totally independent from firmware upgrade process 402. Hence, for a mode change to occur, two independent events must coincide: a firmware upgrade must be initiated by the Configuration Manager, thereby changing the state of process 402 and, in response to a request from the Configuration Manager, the remote file server must generate a flash write request. The necessary coincidence of these two, otherwise independent events, further decreases the likelihood, quite substantially, that the mode of the flash memory might change to read/write as a result of an errant program execution in DRAM 372 (see FIG. 3). In any event, if such a flash write request was not received, then decision bock 1630, shown in FIG. 16, routes execution, via NO path 1632, to decision block 1640. This latter block tests whether the firmware upgrade interval has expired. If the interval has not yet elapsed, then decision block 1640 feeds execution back, via NO path 1642, to decision block 1630 to again test for a flash write request, and so forth. Alternatively, if this timing interval has elapsed, then decision block 1640 routes execution, via YES path 1646 and path 1676, back to block 1610 to reset process 402 to its initial state.

However, when a flash write request is received during the timing interval, decision block 1630 then routes execution, via YES path 1636, to decision block 1650. Thus latter decision block determines whether the key has been defined, i.e., whether the value of the key stored in the write access key register exactly matches the value of the key as currently stored in its original location in flash memory. If the key is not defined, then decision block 1650 routes execution, via NO path 1652 to trap this error condition and generate a system check exception. Alternatively, if the key is defined, i.e., the value in the write access key register identically matches the value of the 32-bit key in its original location in the flash memory, then execution proceeds, via YES path 1654, to block 1655. Block 1655, when executed, changes the mode of the flash memory from read-only to read/write. Thereafter, execution proceeds to block 1660 which updates the contents of flash memory 376 with replacement program code received, via TCP/IP process 425, from a host or remote client. Decision block 1670 tests whether the firmware upgrade is complete. If the upgrade has not completed, decision block 1670 routes execution, via NO path 1672, back to block 1660 to continue the upgrade. Alternatively, if the upgrade has been completed, then decision block 1670 routes execution, via YES path 1676, back to block 1610 which, in turn, sets process 402 back to its initial state, which includes changing the mode of the flash memory back to read-only.

Possible errant operations are shown as dashed lines in FIG. 16. Given the very short time, associated with an upgrade interval, generally a few minutes, if not less, then if an errant operation were to occur, in all likelihood, it would occur while process 402 was in its initial state. As noted above, in this state the contents of the write access key register are cleared, i.e., zero, meaning that the key stored therein is not defined at this time. Hence, a random attempt that might arise to simply write data into flash memory 376, while process 402 is in its initial state, is symbolized by dashed line 1690. Inasmuch as the flash memory is then set to its read-only state, any errant attempt to write into it would generate, as symbolized by block 1695, a system check exception after which execution would effectively exit from process 402. The occurrence of such an exception would simply cause operating system 4010 (see FIG. 4A) to initiate a complete reset of the LAN modem.

A different errant attempt, as symbolized by dashed line 1680, might occur to change the mode of the flash memory from read-only to read/write. Inasmuch as the mode of the flash memory will be read-only, immediately before the time this attempt occurred, then the contents of the write access key register will then be zero, meaning that the key stored therein is not yet then defined. Hence, this errant operation would need to change the contents of the write access key register to identically match the 32-bit key as stored in its original location in the flash memory before the mode of the flash memory could change to read/write. Consequently, since, in all practical likelihood, the zero contents of the write access key register do not match the actual key in its original location in the flash memory, any change in the mode of the flash memory will be blocked, as symbolized by dashed line NO path 1686 emanating from decision block 1685, resulting, should a write operation then errantly occur, in a system check exception. The mode of the flash memory would only change if the key were to become defined, i.e., if and only if the value then stored in the write access key register were to identically match the key stored in its original location in the flash memory. Hence, if such an errant write request were to occur, then this attempt would need to set, in some fashion, the contents of the write access key register to exactly match that of the actual 32-bit key stored in its original location in the flash memory. While such an occurrence, strictly speaking, is not impossible, the likelihood that an errant condition would occur that sets the contents of a particular 32-bit register to match a predefined random or pseudo-random 32-bit value, this result being symbolized by dashed line YES path 1688 emanating from decision block 1685, is extremely unlikely, in the range of less than one in a billion.

Figure 17:
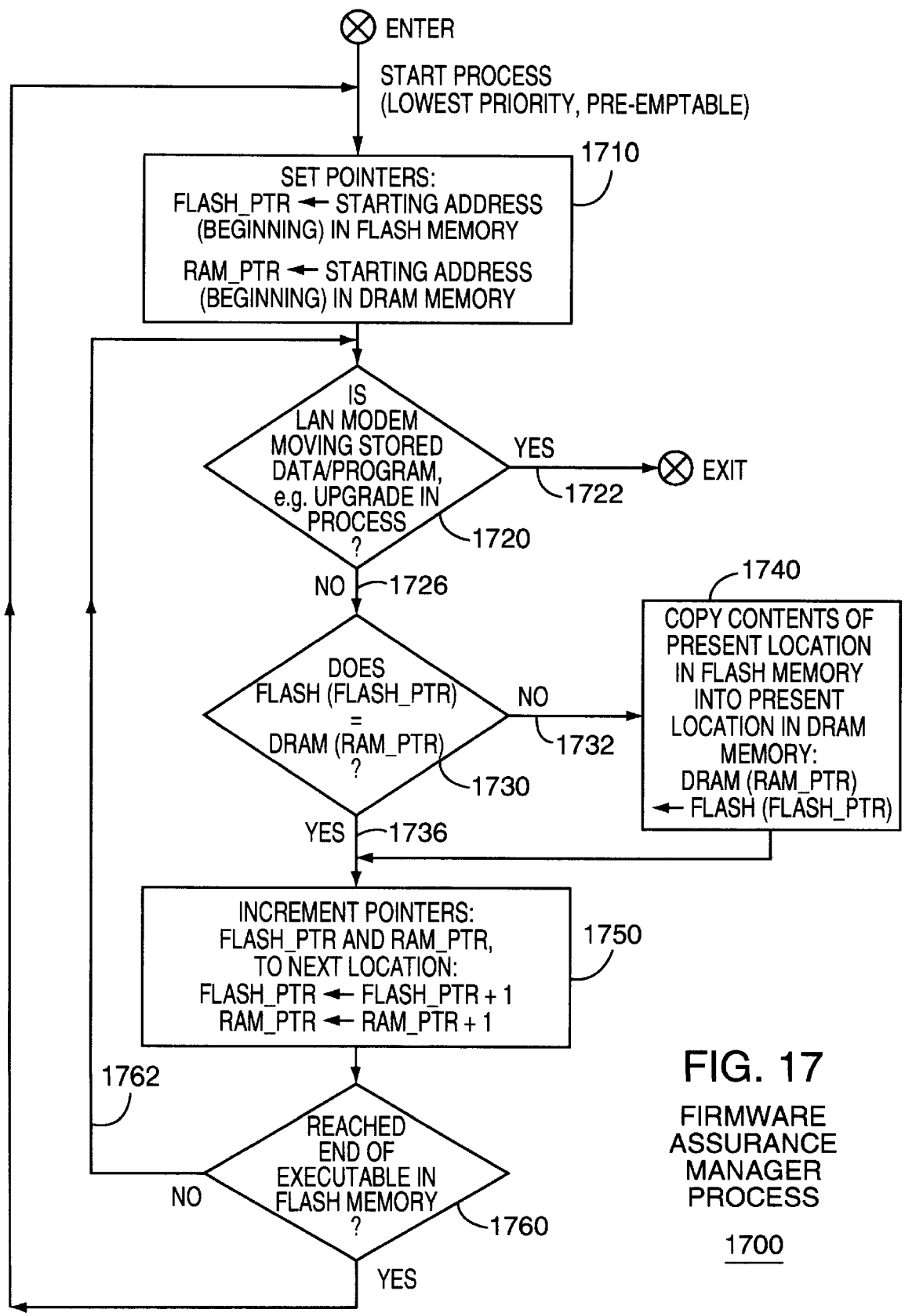
FIG. 17 depicts a flowchart of Firmware Assurance Manager process 1700 that is contained within application programs 4020 shown in FIG. 4A and is executed therein as background (lowest priority) application 4030.

FIG. 17 depicts a flowchart of Firmware Assurance Manager process 1700. As discussed above, this process is a preemptable background process, executing with, e.g., a lowest execution priority, that continually compares the entire executable program code stored in DRAM, on a location-by-location basis, with that stored in the flash memory to assure integrity of the former. In the event a discrepancy is detected, process 1700 copies the contents of as many locations in the flash memory to corresponding locations in the DRAM that are necessary to eliminate the discrepancy.

Specifically, upon entry into this process, execution first proceeds to block 1710. This block, when executed, initializes a flash pointer (FLASH_PTR) and a DRAM pointer (RAM_PTR) to point to starting addresses of the executable program code in both the flash memory and the DRAM, respectively. Thereafter, execution proceeds to decision block 1720 which tests whether Firmware Upgrade process 1600 (see FIG. 16) is in its upgrade state, i.e., whether an upgrade is expected to occur within illustratively five minutes or is then occurring. Inasmuch as upgraded code is written directly into flash memory, discrepancies will certainly arise between the upgraded program code then stored in flash and a prior version then stored in DRAM; hence, all error checking undertaken by process 1700 is suspended with execution simply exiting at this point from this process. Once the upgrade is complete, the Configuration Manager will reset the LAN modem to transfer the upgraded code from the flash memory into the DRAM, and will then restart Firmware Assurance Manager process 1700.

Alternatively, if a firmware upgrade is not then occurring or expected to occur within its five minute window, i.e., process 1600 is in its initial state, then, as shown in FIG. 17, execution proceeds, via NO path 1726 emanating from decision block 1720, to decision block 1730. This latter decision block determines whether the contents of the flash memory at an address specified by the current value of the flash pointer are identical to the contents of the DRAM at an address specified by the current value of the DRAM pointer. If no such discrepancy exists, then decision block 1730 routes execution, via YES path 1736, to block 1750. Alternatively, if a discrepancy between the contents of these two locations then exists, decision block 1730 routes execution, via NO path 1732, to block 1740. This latter block, when executed, copies the contents of the flash memory at an address given by the current value of pointer FLASH_PTR into the location in DRAM at an address given by the value of pointer RAM_PTR. Thereafter, execution proceeds to block 1750. Block 1750, when executed, increments the values of each of the flash and DRAM pointers by one to point to the next location in both the flash memory and the DRAM, respectively. Once this occurs, execution proceeds to decision block 1760 which tests whether an end of the executable program code stored in the flash memory has been reached. If the end has not been reached, decision block 1760 routes execution, via NO path 1762, back to block 1720 to test whether a firmware upgrade is now occurring or about to occur, and so on. Alternatively, if the end of the executable code in flash memory has been reached, then decision block 1760 routes execution, via YES path 1766, back to block 1710 to reset the flash and DRAM pointers to point to the starting address of the executable program code flash and DRAM, respectively, and so forth.

e. Internal web server and dynamic web page construction using web page templates As discussed above, the inventive LAN modem utilizes an internal web server 412 (see FIG. 4B) that, in addition to storing full web pages, constructs web pages in real-time from a predefined stored web page templates by selectively inserting, e.g., event-specific code segments therein. Illustratively, this insertion is accomplished by substituting such a segment(s) for a corresponding so-called "placeholder(s)" situated in the template. These segments can each represent an HTML form component or form, an HTML directive, e.g., <META HTTP.EQUIV="Refresh" CONTENT=5>, a dialog box, a graphic, a predefined textual message or, generically speaking, any object (or its file name), including, e.g., an applet (such as a JAVA or JAVA-SCRIPT applet—"JAVA" and "JAVASCRIPT" being trademarks of Sun Microsystems Inc. and Netscape Communications Corporation, respectively, both of Mountain View, California), an audio or a video object, whether implemented through HTML or otherwise, that is to be it;: selectively: (a) presented, through direct insertion of object code into the document, to a user; (b) accessed to yield a file containing an object which is subsequently assembled into the document by the browser for display to the user; or (c) executed at that workstation to, e.g., generate a particular display, invoke a particular procedure thereat, and/or to solicit a response, such as an item of data or a selection among a list of predefined data values, from the user. Since relatively few, if any, full web pages are stored, memory requirements become rather modest. Such web pages are used for querying a user stationed at a workstation to enter information needed to configure the LAN modem, as well as for displaying the specific nature and cause, if known, of a detected fault condition so that the user situated at a host can take appropriate action. As any one skilled in the art can readily appreciate, the inventive concept of dynamic web page creation using selective insertion of web page component(s) into a predefined page template has extremely wide applicability, clearly well beyond that of use with just a LAN modem, that encompasses nearly any environment that utilizes web pages. Such an environment can certainly include client-server usage over the Internet and/or an intra-net, or other networked environment.

Figure 18:
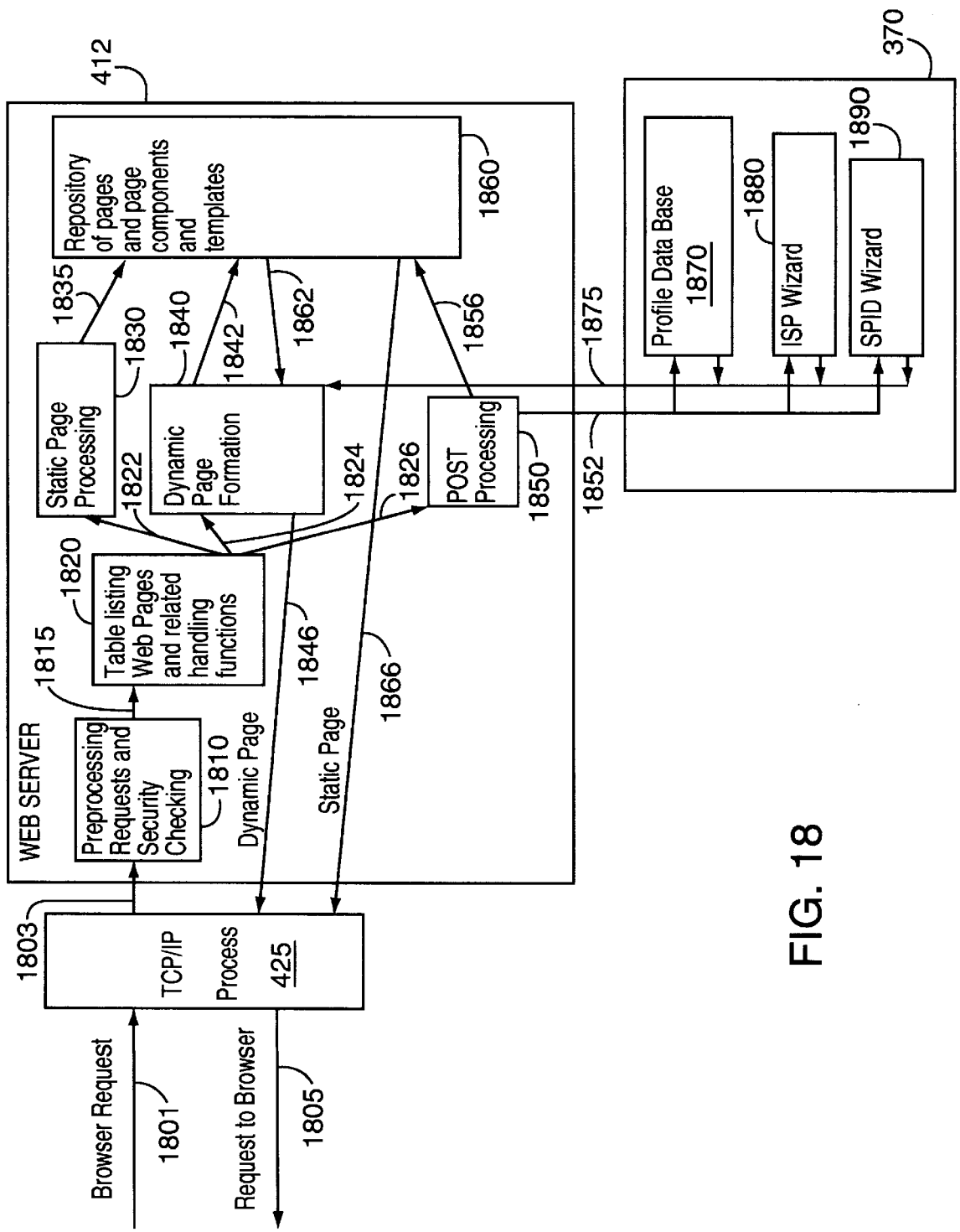
FIG. 18 depicts a high-level block diagram of web server 412, shown in FIG. 4B, and certain of its associated processes.
Figure 26:
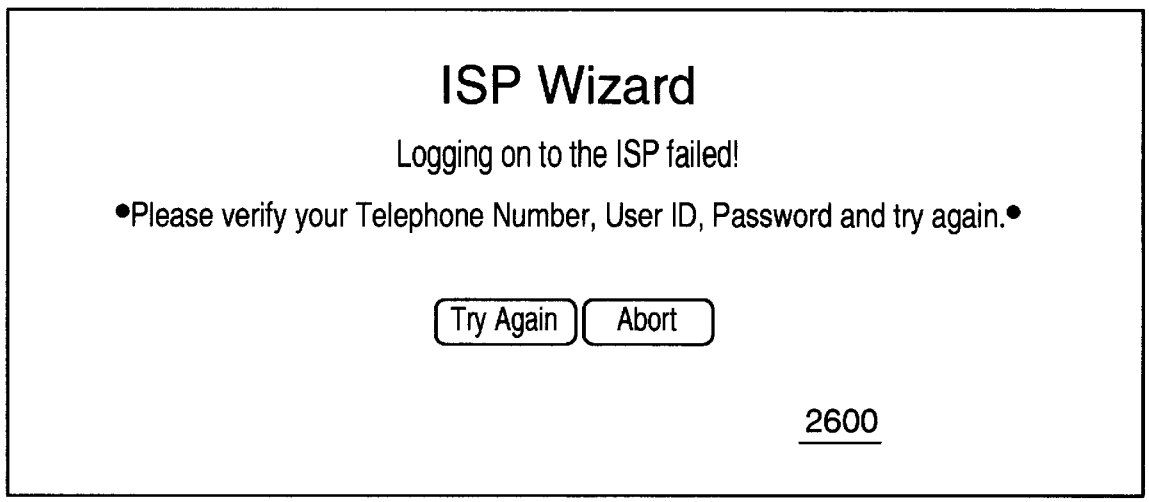
FIG. 26 depicts a page, as would be rendered on a workstation display, in response to HTML code 2500 shown in FIG. 25.

FIG. 18 depicts a high-level block diagram of web server 412 and certain of its associated processes. As shown, the web server contains Preprocessing operation 1810, Table 1820, Static Page Processing operation 1830, Dynamic Page Formation operation 1840, Post Processing operation 1850 and Repository 1860. Repository 1860 can store both static pages, i.e. complete web pages, and templates and predefined web page components. To save storage space, the repository, as specifically used in the LAN modem, stores templates and page components, rather than only full web pages.

In particular, an incoming HTTP request, typically in the form of a GET command, from a browser at a host on the LAN, as symbolized by line 1801, is routed through TCP/IP process 425 (and then through HTTP process 425 to web server 412. Though commands and files transiting between TCP/IP process 425 and web server 412 flow through HTTP server 415 (see FIG. 4B) for suitable encapsulation into and extraction from IP packets, for the purposes of simplification, the operations involving server 415 (as well as the server itself) have all been purposely omitted from FIG. 18 and the following discussion. In response to this request, Preprocessing operation 1810, shown in FIG. 18, checks the request for proper security clearance and, if the user has proper privileges to access the page he(she) desires, then accesses table 1820 to ascertain the related handling functions, either POST or SEND, for that page. If no entry for that page exists, then the page is a static page, i.e. having no changing components and hence the page itself requires no processing other than to access it from the repository. The SEND function specifies that the server will access a desired page, including dynamically constructing the page as needed, and send that page back to the requesting host. The POST function, in contrast, accepts data as entered from the user, in response to, e.g., a currently displayed web page, and requests that the web server process the data as appropriate. Should the desired page be a static page, then, as symbolized by line 1822, Static Page Processing operation 1830, which is discussed in detail below in conjunction with FIG. 19, then accesses, as symbolized by line 1835, that page in its entirety from repository 1860. In response, repository 1860 supplies a file containing the HTML contents for that page. This file is then applied, as symbolized by line 1866, to TCP/IP process 425 for routing to the requesting workstation for display. The page content in the file, in turn, will specify a name of each additional file that represents an object that forms part of the displayed page. The browser, executing at the requesting workstation, then issues a GET command for each additional file specified in the page; then, as the files are received, properly assembles the page, including its objects; and finally displays the complete page to the user.

If, however, table 1820 has handling function entries, SEND and/or POST, for the requested page, then the requested page needs to be dynamically constructed. In this case, the requested page must be constructed from a stored template; hence necessitating additional page processing. Specifically, if the handling function specified in table 1820 is a SEND function, then dynamic Page Formation operation 1840 first accesses the page template and specific data regarding the status and state of the LAN modem. This data is used, by Dynamic Page Formation operation 1840, to specify the page components that will be dynamically inserted into the template. In general, this data collectively includes the value of various shared (global) variables as well as appropriate entries from Host list 1300 and Network Service Provider list 1350 (both of which are collectively shown as Profiles Data Base 1870). The specific items of data that are requested in any one instance are defined by then executing procedure for which web pages are being displayed by the LAN modem, such as, e.g., ISP Wizard 1880 (which simplifies set-up of network parameters for an Internet service provider, including user account and password, and displays appropriate network error messages associated therewith) or SPID Wizard 1890 (which, as discussed above, simplifies ISDN configuration of the LAN modem by automatically setting the SPIDs in the LAN modem to those associated with the ISDN lines then connected to the LAN modem); the underlying executable code for both of these procedures is stored within memory 370. Once the data pertinent to the requested page is obtained, as symbolized by line 1875, operation 1840 accesses the corresponding web page component(s), as specified by the value of each data item, and inserts that component into the appropriate location within the code for the template by substituting the code for that segment for a corresponding "placeholder" in the template, as will be discussed in detail below in conjunction with FIGS. 22–26. Thereafter, dynamic page formation operation 1840, shown in FIG. 18, supplies, as symbolized by line 1846, a file containing the dynamically constructed page, i.e. the template with substituted components therein, to TCP/IP process 425 for routing to the requesting workstation on the LAN. As with a static page, the dynamic page will likely contain file names containing code associated with one or more of its components which the browser, in turn, will request, in seriatim, from web server 412, through issuance of an appropriate GET commands. In response, Dynamic Page Formation operation 1840 accesses and then downloads each component from repository 1860 and supplies that component, in a separate file, to TCP/IP process 425 for eventual routing to the workstation on the LAN.

If, alternatively, the handling function is a POST function, then, as symbolized by line 1826, Post Processing operation 1850, obtains the data, supplied by the user at a workstation on the LAN and in response to a currently displayed page associated with, e.g. ISP Wizard 1880 or SPID Wizard 1890, and attempts, as symbolized by line 1852, to update associated configuration data stored in memory 370, such as in Profiles Data Base 1870. Based on the validity of the data received from the user and the success or failure of the update, Post Processing operation 1850 accesses an associated template stored in repository 1860 and inserts appropriate page components based on and to indicate the success or failure of the update. The resulting dynamically created page is then sent, as a file, to TCP/IP process 425 for routing to the appropriate workstation on the LAN.

FIG. 19 depicts a flowchart of Static Page Processing operation 1830. As noted above, this operation accesses and downloads a static web page from repository 1860.

In particular, upon entry into operation 1830, execution first proceeds to step 1910. This step, when performed, obtains an incoming GET command from a browser executing on a workstation situated on the LAN. To simplify the discussion, assume that a browser requests a web page containing a document named "Manual.HTM". Once this GET command is received, then step 1920 accesses, as symbolized by line 1922, table 1820 to determine whether the requested document is one requiring further processing prior to its transmission to the requesting workstation. If the document requires such processing, an entry will exist in Table 1820, containing illustrative entries 1925, for that document and associated handling functions that, when called, implement the necessary processing. Inasmuch as document "Manual.HTM" is static, i.e. it is stored in its entirety in the repository, no such entry exists for it in the table. As such, once an access operation is performed into Table 1820 with the results returned, then, as symbolized by line 1926, step 1930 is performed to access, as symbolized by line 1932, that document within repository 1860. Inasmuch as the repository contains an entry for this document, i.e. MANUAL__HTM, stored HTML code for the corresponding document is then accessed from the repository, as symbolized by line 1936, and sent, as a complete file, through step 1940, via TCP/IP process 425 (see FIG. 18), to the browser which requested that document. Thereafter, execution exits from procedure 1830. Inasmuch as the statically constructed document likely contains names for other page components, the browser will request each one of these corresponding components, in seriatim, from server 412 for page assembly and eventual display.

FIG. 20 depicts a flowchart of Dynamic Page Formation operation 1840. As noted above, this operation dynamically constructs a web page given a template and associated page components accessed from repository 1860, and then downloads the resulting page to a requesting browser.

In particular, upon entry into operation 1840, execution first proceeds to step 2010. This step, when performed, obtains an incoming GET command from a browser executing on a workstation situated on the LAN. To simplify the discussion, assume that a browser requests a web page containing a document named "lan.HTM". Once this GET command is received, then step 2020 accesses, as symbolized by line 2022, table 1820 to determine whether the requested document is one that requires further processing prior to its transmission to the requesting workstation. If the document requires such processing, an entry will exist in Table 1820 for that document and associated handling functions that, when called, implement the necessary processing. Since the document will be dynamically constructed, additional processing will be required, i.e. to construct the document. Hence, an entry will exist for this document within table 1820. In this case, access into the table, as symbolized by line 2026, results, through step 2030, in an entry, for this document, illustratively containing a specific SEND function call. As such, once the access completes and the SEND handling function is found for this document, as symbolized by step 2030, step 2040 is performed. Step 2040, when performed, invokes the specific SEND function call, specified in the entry, to properly process the code for the document in order to dynamically create the desired web page. In particular, step 2040 accesses the template web page from repository 1860, here under the entry "LAN_HTM". Step 2040 also accesses relevant data stored in Profile Data Base 1870 (containing, as noted above, Host list 1300, as a LAN Profile, and Network Service Provider list 1350, as a WAN Profile). In addition, step 2040 also reads appropriate shared (global) variables, as well as system state and status information. As discussed, the specific items of data retrieved by step 2040 is specified by the state of the particular procedure then being executed, e.g. ISP Wizard 1880 or SPID Wizard 1890 (see FIG. 18). Once the necessary template and data have all be accessed, step 2040, shown in FIG. 20, utilizes the data to select the appropriate web page components from repository 1860 that are to be substituted into the template in place of corresponding placeholders. Once the substitutions are completed thereby yielding a dynamically constructed page, a file containing the resulting page is sent, by step 2050, to the requesting browser, via TCP/IP process 425 (see FIG. 18). Thereafter, as shown in FIG. 20, execution exits from operation 1840. Inasmuch as the dynamically constructed document likely contains names for other page components, the browser will request each one of these corresponding components, in seriatim, from server 412 for page assembly and eventual display.

FIG. 21 depicts a flowchart of Post Processing operation 1850 that is also performed by web server 412. As noted above, Post Processing operation 1850 obtains data, supplied by the user at a workstation on the LAN and in response to a currently displayed page associated with, e.g. ISP Wizard 1880 or SPID Wizard 1890, and attempts to update associated configuration data stored in memory 370, such as in Profiles Data Base 1870. Based on the validity of the data received from the user and the success or failure of the update, operation 1850 will access an associated static page stored in the repository or create one dynamically to indicate the success or failure of the update, and then send that page to the appropriate workstation, on the LAN, for local display thereat.

Specifically, upon entry into operation 1850, execution first proceeds to step 2110. This step, when performed, obtains a POST command from a browser executing on a workstation situated on the LAN. To simplify the discussion, assume that a browser generates this command to provide specific user-supplied data requested by document "wan.htm". The POST command will contain the document name, here "wan.htm", and appropriate identifier(s) each with an item of user-supplied data. Once this POST command is received, then step 2120 accesses, as symbolized by line 2122, table 1820 to determine whether the document named in the POST command, and to which the workstation is responding, is one that requires further processing. If the document requires such processing, an entry will exist in Table 1820 for this document and associated handling functions that, when called, provide the necessary processing. Since processing is required, here in the form of updating profile information stored at the LAN modem, Table 1820 will contain the specific POST function call needed to implement the processing associated with this document. In this case, access into the table, as symbolized by line 2126, results, through step 2130, in an entry, for this document, illustratively containing a specific POST function. As such, once the access completes and the POST handling function is found for this document, as symbolized by step 2130, step 2140 is performed. Step 2140, when performed, calls the specific POST function, specified in the entry, to properly process the response which the user has provided for this document. In particular, step 2140, checks the validity of the user-supplied data, and if valid, updates, as symbolized by line 2146, the corresponding profile, e.g. an entry in either Host list 1300 or Network Service Provider list 1350, with the data provided by the user and contained in the POST command. Thereafter, step 2140, based on the validity of the data received from the user and the success or failure of the update, accesses, as symbolized by line 2142, an associated template along with appropriate page components from repository 1860. Step 2140 then substitutes the page components into the template to create a dynamic page that is based on and indicates the success or failure of the update. Step 2150 then sends the resulting dynamically created page, as a single file, to TCP/IP process 425 (see FIG. 18) for routing to the appropriate workstation on the LAN. Thereafter, as shown in FIG. 21, execution exits from operation 1850.

To further illustrate the inventive dynamic web page construction, two examples, one being creation of a specific error message and the other being creation of a dynamically changing progress bar display object will now be discussed.

First, consider FIG. 22 which depicts code 2200 for an illustrative inventive web page template. This template forms a basis of several web pages that are used in conjunction with ISP Wizard 1880 (see FIG. 18) for use in configuring LAN network parameters for the LAN modem. This code contains conventional HTML code, and placeholders 2210, 2215, 2220, 2225, 2230$_1$ and 2230$_2$, and 2235 containing code terms _REFRESH_, _TITLE_, _PICTURE1_, _TEXT1_, _PICTURE2_, _TEXT2_, _PICTURE2_ and _BUTTON_. Based on the state and status of the system, and/or values of shared (global) variable(s) at the time a dynamic page is created from this template, specific page components, such as particular refresh time commands, text and pictures will be selectively substituted for the corresponding placeholder(s) to create a dynamic web page. The template, as rendered by a web browser on a display screen, would appear as shown in FIG. 23. Each of the placeholders merely appears as a textual object set off by underscores in a predefined location, as specified by HTML coding within code 2200 shown in FIG. 22.

Given web page template 2200, FIG. 24 depicts, in high-level block diagram form, inventive process 2400 for dynamically forming a web page, such as for the ISP Wizard, using this template and predefined web page components.

In particular, first as shown in block 2410, ISP Wizard 1880 (see FIG. 18) is initiated. During the course of executing this wizard, the status of the configuration process, particularly responses from the ISP or network, are used to set global variables to indicate success or a specific failure condition. During the course of executing this Wizard, a series of web pages are dynamically constructed and displayed to the user, with the particular pages varying based on the then current state of the Wizard. For example, assume that a user entered an incorrect telephone number into the Wizard causing a logon placed through the LAN modem to that ISP to fail; hence representing a specific error condition. This error condition, reflected in values of various global variables, results in the selection, as defined in the program code for the ISP Wizard, of particular page objects, as delineated in block 2420, for each of the placeholders in template 2200. Template 2200 is accessed, as symbolized by block 2430 and applied along with the specific page components for the placeholders, as defined by block 2420, to block 2440. Block 2440 substitutes each of the specific objects defined in block 2420 for the corresponding placeholder in template 2200. For example, the two placeholders, 2230, and 2230$_2$, (see FIGS. 22 and 23) which represent a common picture but in two separate locations, are each replaced by HTML code for a graphic of a flashing red ball. An unused placeholder, i.e. __REFRESH__, is removed inasmuch as the resulting web page does not generate an update request to the server but it is displayed constantly while awaiting a response from the user. The resulting HTML code for the dynamic web page is shown as code 2500 in FIG. 25. Comparing this code with template code 2200 shown in FIG. 22 reveals that appropriate HTML code has been substituted for each of the corresponding placeholders. For example, the placeholders __TITLE__ and __TEXT1__ have been replaced by "ISP Wizard" and "Logging on the ISP Failed!", respectively. The resulting dynamic web page as rendered on a display screen by a browser, in response to code 2500, would appear as page display 2600 shown in FIG. 26. For a different error condition or a successful logon attempt, the values of the global variables would change accordingly from those associated with the selected page components shown in block 2420 in FIG. 24. Hence, different predefined page components would be dynamically substituted into template 2200 to produce a web page that, when rendered on the display screen at the workstation, would indicate the particular result which then occurred, i.e. this different error condition or a successful logon.

Figure 27:
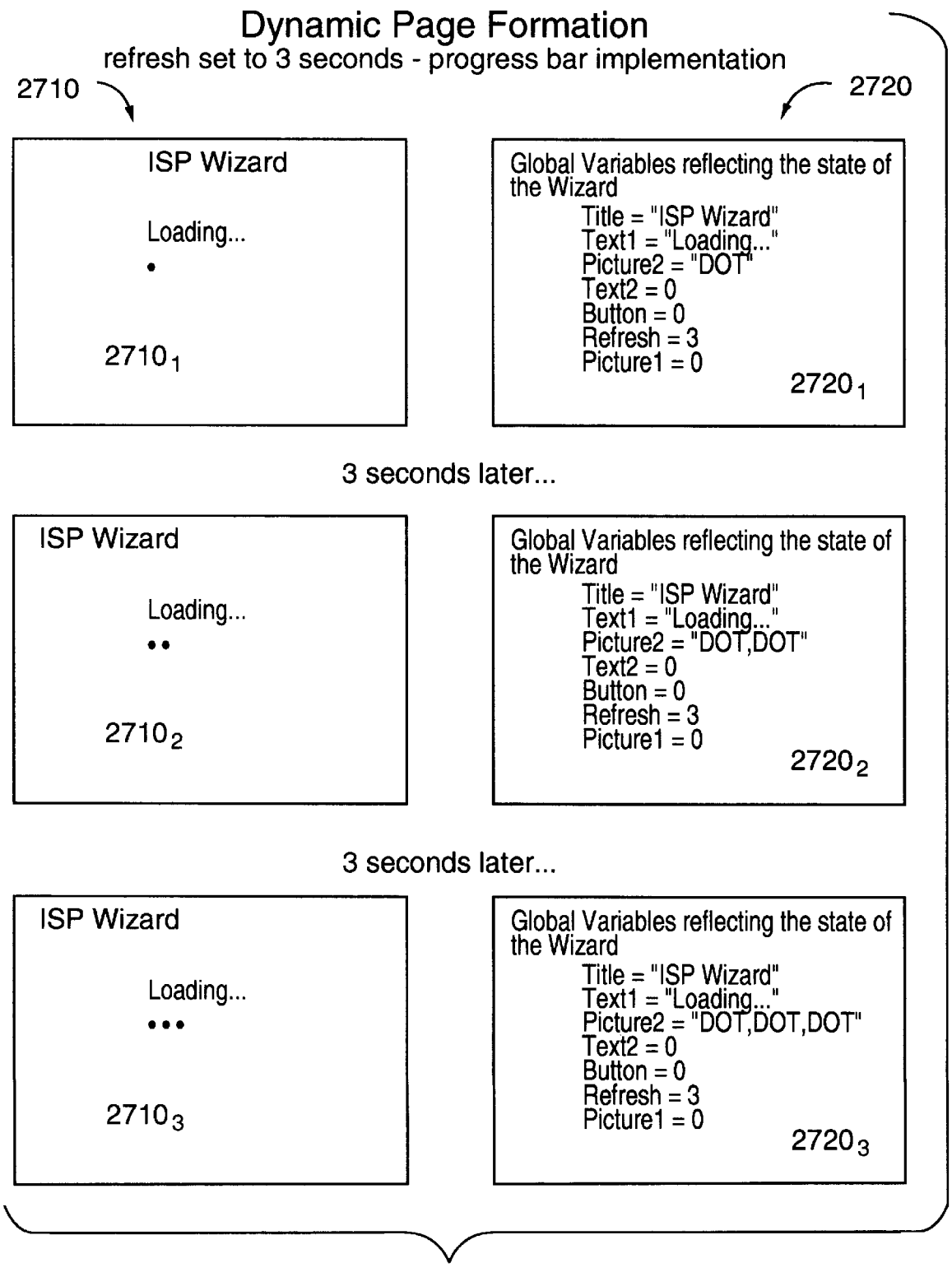
FIG. 27 depicts a sequence of three pages 2710, as would be rendered on a workstation display, to portray a progress bar and which result from three corresponding HTML code segments 2720, all of which are dynamically constructed in accordance with the present invention.

Consider, as a second example and as illustrated in FIG. 27, the dynamic construction of successive web pages that collectively implement a dynamically changing progress bar object. Here, the progress bar consists of a sequence of dots that grows by one dot every three seconds to chart progress of a given item. Illustratively, the item being charted is progress of loading the code for the ISP Wizard, for subsequent execution. This code includes a single web page file (including a page template and all associated predefined page components) and executable code, and is loaded both in object code, from flash memory 376 into DRAM 372 (see FIG. 3) once a user has manually initiated this Wizard during configuration. The progress bar is rendered by a dynamically changing HTML document (web page) that changes at set three-second intervals. This page is generated by substituting, with each new request generated by the browser at three-second intervals, page components 2720$_1$, 2720$_2$ and 2720$_3$ (see FIG. 27), into page template 2200 to yield correspondingly rendered web pages 2710 containing web pages 2710$_1$, 2710$_2$ and 2710$_3$, respectively.

Here, appropriate global variables are set to reflect a current status of the Wizard, which through a software timer, changes every three seconds during a loading process. This status change results in the textual component for placeholder __Text2__ being dynamically changed by replacing it with different HTML commands, i.e. here having an additional HTML "DOT" instruction (which, when rendered by a browser, results in display of another successive circular dot).

The discussion will now address the manner through which a web page template, associated web page components, and appropriate executable code is collectively stored as a single module within memory 370 of the LAN modem for use by web server 412 (see FIGS. 3 and 4B). Since this module is initially stored in flash memory 376 and subsequently copied, with the same data structure, into DRAM 372 for subsequent execution, the discussion will merely refer to this module as being stored within memory 370.

Figure 28:
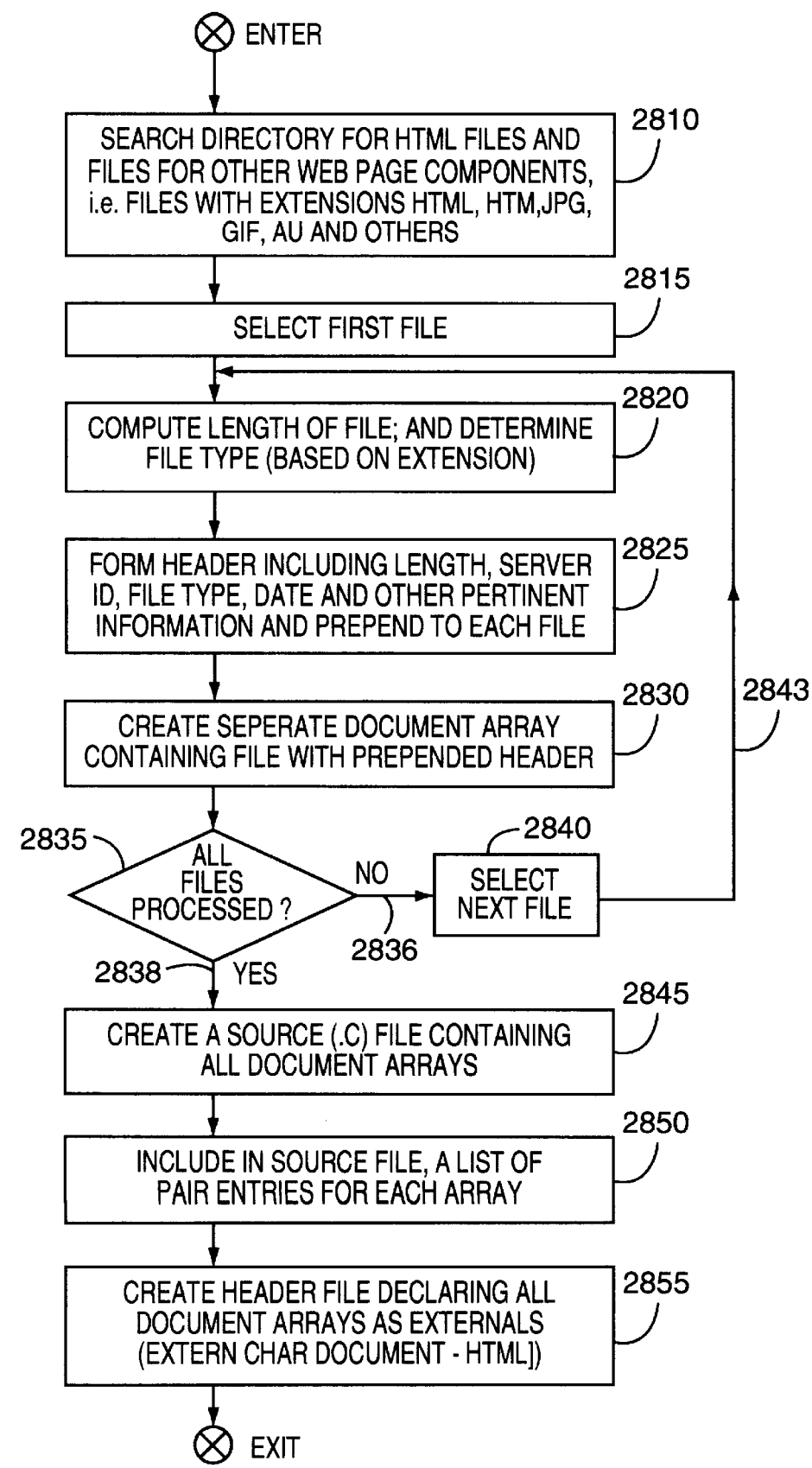
FIG. 28 depicts a flowchart of File Creation process 2800 that creates a common file of a web page template and associated web page components in accordance with the present invention.

FIG. 28 depicts a flowchart of File Creation process 2800 that creates a common file of a web page template(s) and associated web page components. This process is executed off-line in a computer to generate a file that is then integrated and linked to the executable code for, e.g., the ISP Wizard, and then appropriately compiled to form a module which, in turn, is subsequently loaded during, e.g., manufacture (or during an upgrade operation) into memory 370 and specifically to form repository 1860 (see FIG. 18). Prior to executing this process, a separate source file for each web page template and other source files, each containing a web page component associated with that particular template, is stored into a common directory on that computer.

Upon entry into process 2800, block 2810 is first executed. This block searches a common directory, that contains all the web page component and template files, for all those files that contain web page components. These files are typically identified by their extension; namely, .HTM or .HTML for HTML files, .JPG or .GIF for image files, AU for audio files and so forth for all other suitable file types. Once these files are found and suitably catalogued into a set, block 2815 executes to select, as a current file to process, a first file in the set. Thereafter, a loop is entered consisting of blocks 2820–2840 to integrate each file in the set into a resulting common module. In particular, within this loop, block 2820 is first executed to compute a length of the current file and, from its extension, a corresponding file type. Thereafter, block 2825 executes to form a header for the current file, which includes the length of this file, an identification of a server on which the file is stored, a date and version number of this file and other pertinent information. Once formed, the header is then prepended to the current file. Execution then proceeds to block 2830 which creates a separate document array and copies the contents of the current file, including its prepended header, into that array. Each such document array only stores one web page component and its prepended header. Once block 2830 completes its execution, decision block 2835 determines whether all the files in the set have been processed. If another file remains to be processed, then decision block 2835 routes execution, via NO path 2836, to block 2840 to select a next successive file remaining to be processed in the set. Thereafter, execution loops back, via path 2843, to block 2820 to process that next file, and so forth.

If, however, all the files in the set have been processed, then decision block 2835 routes execution, via YES path 2838, to block 2845. This latter block, when executed, creates a source file, illustratively named "bsource.c", and stores all the document arrays into that file. A definition of the resulting data structure that is to store pointers to the page template(s) and associated web page component is generated and stored in this source file. Thereafter, execution proceeds to block 2850 which includes in this source file, a list of pair entries, specifically data structure 3000 (to be discussed below in conjunction with FIGS. 29–31) which contains a pair entry for each document array. Each such pair consists of a name of the array and a pointer to its starting location in the memory; the actual values of the pointers will be set once the module is appropriately linked. Through this list, each array component in the repository can be readily located by its name. Once this list is fabricated, block 2855 executes to create a header file that declares all document arrays as externals for use during subsequent compilation. At this point, one source file, i.e. bsource.c, containing a list of all the document arrays for both the web page templates and web page components, and those arrays themselves has been created. Execution then exits from process 2800. Thereafter, this single file is then compiled along with the executable source code. The resulting code is then linked together, through a conventional linker, to form the single module. This module is then subsequently stored within memory 370.

Figure 29:
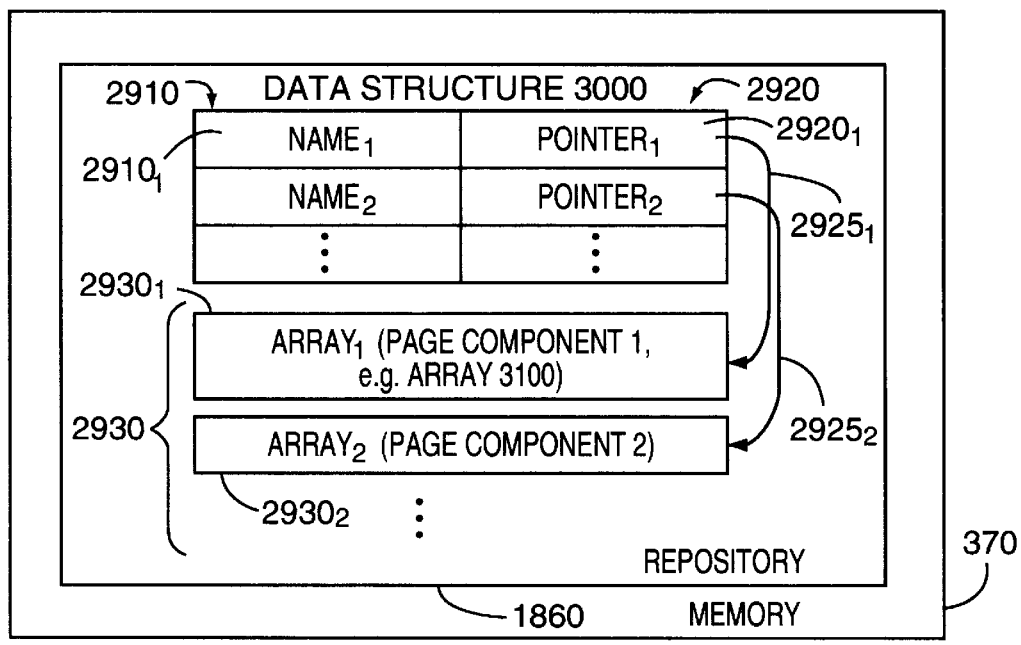
FIG. 29 depicts data structure 3000, stored within repository 1860, containing templates and web page components as produced through execution of File Creation process 2800 shown in FIG. 28.

FIG. 29 depicts data structure 3000 that houses the list of paired entries and document arrays 2930 for the web page templates and associated web page components, and which is stored within the repository in memory 370. As shown, data structure 3000 contains a list of paired entries, i.e. effectively forming two columns 2910 and 2920, with each such pair containing, in separate fields, of which $2910_1$ and $2920_1$ are illustrative, a name, e.g. $NAME_1$, $NAME_2$, . . . , of a document array and a pointer, e.g. $POINTER_1$, $POINTER_2$, . . . , which specifies a starting location, as symbolized by lines $2925_1$, $2925_2$, . . . , within memory 370 at which that particular array, e.g. $2930_1$, $2930_2$, . . . , is stored. An illustrative actual source listing of data structure 3000 as used by web server 412 in the LAN modem is depicted in FIGS. 30A and 30B; for which the correct alignment of the drawing sheets for these two figures is shown in FIG. 30. Each paired entry in data structure identifies an array containing either a template or a web page component, with the paired entry containing a pointer followed by a file name. FIG. 31 depicts actual object code of an illustrative web page component, i.e. FRMAIN_HTM[], as it would be stored within the repository.

Though the inventive dynamic web page creation process has been described, in conjunction with the preferred embodiment of the LAN modem, as selecting particular web page components for insertion into a template web page based on particular error conditions, and/or system state or status information, those skilled in the art will clearly realize that, generally speaking, any input criteria can be used instead, as determined by the needs of a particular application for which dynamic page creation is to be used, to select which particular page components to use in any given instance and insert into an associated page template, from amongst all those then stored.

Furthermore, even though the inventive apparatus has been specifically described in the context of providing a 4-port Ethernet hub and associated network functionality, e.g., domain name resolution and DHCP handling, for accommodating four separate local hosts, the apparatus can be easily expanded, in a manner readily apparent to anyone skilled in the art, to accommodate any number of hosts by, e.g., suitably enlarging both the hub and various routing tables and lists, some of those modifications having been discussed above, as well as storing additional configuration information, such as user profiles, as needed.

Moreover, though configuration of the LAN modem has been described above in terms of communicating with an executing web browser in a workstation connected to the LAN modem, other appropriate TCP applications executing at the workstation and capable of conducting interactive communication with a server in the LAN modem and a user at the workstation, such as Telnet can be employed instead. Similarly, such applications can also be used in conjunction with interception of DNS Request (or other appropriate) messages to, e.g., a remote server, that would occur during TCP applications other than web browsing, to display appropriate fault messages.

Although a single, though rather detailed, embodiment which incorporates the teachings of the present invention has been shown and described in detail herein, those skilled in the art can readily devise many other embodiments that still utilize these teachings.

We claim:

1. Apparatus for a network communication device which is connectable to both a public switched telephone network (PSTN) and a local area network (LAN) for simultaneously providing separate first and second communication channels over a common communication path between the PSTN to the device such that each of first and second host devices connected to the LAN can simultaneously communicate, through the communication device over the common communication path and via the first and second channels, with a different corresponding network service provider accessible through the PSTN, the apparatus comprising:

a processor;

a memory, connected to the processor, for storing executable instructions therein;

communication circuitry, connected to and controlled by the processor, for establishing, over the common communication path, coincident first and second network connections between the communication device and the PSTN, and, via the LAN, the first and second host devices, respectively, wherein each of the connections is established over a different corresponding one of the first and second channels; and a source-based routing table (SBRT), stored within the memory, which specifies, for each of the first and second host devices, a different corresponding network service provider, which is then being accessed by said each host device, and which specific one of the first and second channels is to be used to carry packets, via the communication device and the PSTN, between said different corresponding network service provider and said each host device;

wherein, in response to the executable instructions, the processor routes each one of a plurality of packets appearing on the LAN and originating from either the first or second host device via the specific one of the first and second channels as specified in the SBRT, given the source of said each packet, to the corresponding first or second network service provider that is to receive said each packet such that the communication device can simultaneously provide two separate packet connections, over the common communication path and via the PSTN, between the first and second host devices and corresponding different ones of the first and second network service providers.

2. The apparatus in claim 1 wherein the processor, through execution of the instructions:

in response to an outgoing packet generated by either one of the first and second host devices and destined to a corresponding different one of the network service providers, determines whether a corresponding one of the network connections has been established between the communication device, through the PSTN, to the corresponding one of the network service providers; and if an entry in the SBRT indicates that the corresponding one network connection has not yet been established:
establishes the corresponding one network connection to the PSTN over an available one of the channels;
updates the entry in the SBRT to reflect the one channel then being used for the corresponding one network connection between said one of the first and second host devices and the corresponding one of the network service providers; and
routes the outgoing packet, via the one channel, over the corresponding one network connection to the corresponding one of the network service providers; or if the entry in the SBRT indicates that the corresponding one network connection is already established, routes the outgoing packet over the channel specified in the entry via said corresponding one network connection to the corresponding one network service provider.

3. The apparatus in claim 2 wherein the first and second network service providers each provides access to either a private network or public network, wherein the public network is an Internet.

4. The apparatus in claim 3 wherein the SBRT comprises a separate entry for each of the first and second host devices that specifies, for said each host device, the permitted network service providers, and, for each such permitted network service provider, a corresponding ISDN directory numbers and network parameters.

5. The apparatus in claim 4 wherein the network parameters comprise a domain name, subnet mask, user account and password.

6. The apparatus in claim 4 wherein the private network provides access to the Internet.

7. The apparatus in claim 3 wherein each of the first and second communication channels is a separate ISDN B-channel.

8. The apparatus in claim 3 wherein the processor, in response to the stored instructions and an incoming packet appearing on the LAN and originating with either the first or second host device:
translates private source address information contained in the incoming packet into public source address information for use by the network communication device, wherein the private source address information, for the incoming packet, specifies a private source address of a corresponding one of the first and second host devices and an identifier of an associated application session executing at the corresponding one host device which generated the incoming packet;
substitutes the public source address information into the incoming packet for the private source address information contained therein so as to form an outbound packet, wherein the public source address information contains a predefined public address, associated with the network communication device, as a source address; and
transmits the outbound packet, via the communication circuitry and the corresponding first or second communication channel, to the corresponding first or second network service provider.

9. The apparatus in claim 8 wherein the public and private source addresses of the first and second host devices and the public address of the network communication device each comprise a corresponding Internet protocol (IP) address.

10. The apparatus in claim 9 wherein the public and private source address informations each comprise an associated IP address, an associated protocol number and an associated port number.

11. The apparatus in claim 10 wherein the SBRT comprises a separate entry for each of the first and second host devices that specifies, for said each host device, the permitted network service providers, and, for each such permitted network service provider, a corresponding ISDN directory numbers and network parameters.

12. The apparatus in claim 11 wherein the network parameters comprise a domain name, subnet mask, user account and password.

13. The apparatus in claim 10 wherein each of the first and second communication channels is a separate ISDN B-channel.

14. The apparatus in claim 3 wherein the processor, in response to the stored instructions and an incoming packet from the network service provider and appearing on either the first or second communication channels:
translates public destination address information contained in the incoming packet into private destination address information associated with a corresponding one of the first and second host devices, wherein the public destination address information contains a public address associated with the network communication device as a destination address;
substitutes the private destination address information into the incoming packet for the public destination address information contained therein so as to form an inbound packet, wherein the private destination address information for the packet specifies a private destination address of the corresponding one host device and an identifier of an associated application session executing thereat which is to receive the incoming packet; and
transmits the inbound packet over the LAN to the corresponding one host device.

15. The apparatus in claim 14 wherein the public and private destination addresses of the first and second host devices and the public address of the network communication device each comprise a corresponding Internet protocol (IP) address.

16. The apparatus in claim 15 wherein the public and private destination address informations each comprise an associated IP address, an associated protocol number and an associated port number.

17. The apparatus in claim 16 wherein the SBRT comprises a separate entry for each of the first and second host devices that specifies, for said each host device, the permitted network service providers, and, for each such permitted network service provider, a corresponding ISDN directory numbers and network parameters.

18. The apparatus in claim 17 wherein the network parameters comprise a domain name, subnet mask, user account and password.

19. The apparatus in claim 16 wherein each of the first and second communication channels is a separate ISDN B-channel.

20. The apparatus in claim 3 wherein the processor, in response to the stored instructions and a packet appearing on the LAN and emanating from either the first or second host device:
selects, in response to an identification, contained in the packet, of one of either the first or second host device as a source of the packet and a predefined hierarchically related routing criteria, associated with the one host device, from a pre-defined plurality of network service providers through which the one host device is permitted to access, the first or second network service provider, respectively, as the particular one network service provider for the corresponding one host device to which the packet is to be routed, the plurality of network service providers specifying the first and second network service providers; and routes the packet, via the first or second communication channel as specified in the SBRT, to the particular one network service provider.

21. The apparatus in claim 20 wherein the processor, in response to the executable instructions, determines, from a source address contained in the packet, at least one of the plurality of network service providers through which the one host device is permitted to access so as to define a set of permitted network service providers.

22. The apparatus in claim 21 wherein the hierarchically related routing criteria specifies a hierarchy of different types of network service providers through which the one host device can attempt to establish network access.

23. The apparatus in claim 22 wherein the hierarchically related routing criteria selects the particular one network service provider as: (a) first, any one of the set of permitted network service providers then having a domain name that matches a domain name contained in the packet, (b) second, if no such domain name match is found, any one of the set of permitted network service providers that is an Internet service provider (ISP), and (c) third, if none of the network service providers is an Internet service provider, then any one of the set of permitted network service providers that is a network service provider for a private network (PN) that provides Internet access.

24. The apparatus, in claim 23 further comprising a list, stored in the memory, of different network service providers, wherein the network service provider list contains a separate entry for each different network service provider to which the one host device is permitted to access.

25. The apparatus, in claim 24 wherein the processor, in response to the executable instructions:

determines, through accessing an entry in the SBRT, whether a connection then exists to the particular one network service provider; and if the connection does not then exist and prior to routing the packet to the particular one network service provider, establishes the connection, based on predefined network parameters specified in the network provider list, to the particular one network service provider.

26. The apparatus in claim 25 wherein the network parameters further comprise:

an indication as to whether the particular one network service provider is an ISP or a PN; and if the particular one network service provider is a PN;
an indication as to whether the Internet is accessible through the PN; and predefined network identification for the PN.

27. The apparatus in claim 20 wherein the SBRT comprises a separate entry for each of the first and second host devices that specifies, for said each host device, the permitted network service providers, and, for each such permitted network service provider, a corresponding ISDN directory numbers and network parameters.

28. The apparatus in claim 27 wherein the network parameters comprise a domain name, subnet mask, user account and password.

29. The apparatus in claim 20 wherein each of the first and second communication channels is a separate ISDN B-channel.

30. A method, for use in a network communication device which is connectable to both a public switched telephone network (PSTN) and a local area network (LAN), for simultaneously providing separate first and second communication channels over a common communication path between the PSTN to the device such that each of first and second host devices connected to the LAN can simultaneously communicate, through the communication device over the common communication path and via the first and second channels, with a different corresponding network service provider accessible through the PSTN, wherein the communication device comprises:

a processor;

a memory, connected to the processor, for storing executable instructions therein;

communication circuitry, connected to and controlled by the processor, for establishing, over the common communication path, coincident first and second network connections between the communication device and the PSTN, and, via the LAN, the first and second host devices, respectively, wherein each of the connections is established over a different corresponding one of the first and second channels; and a source-based routing table (SBRT), stored within the memory, which specifies, for each of the first and second host devices, a different corresponding network service provider, which is then being accessed by said each host device, and which specific one of the first and second channels is to be used to carry packets, via the communication device and the PSTN, between said different corresponding network service provider and said each host device;

wherein the method comprises the step, implemented through the executable instructions, of:

routing each one of a plurality of packets appearing on the LAN and originating from either the first or second host device via the specific one of the first and second channels as specified in the SBRT, given the source of said each packet, to the corresponding first or second network service provider that is to receive said each packet such that the communication device can simultaneously provide two separate packet connections, over the common communication path and via the PSTN, between the first and second host devices and corresponding different ones of the first and second network service providers.

31. The method in claim 30 further comprising the steps of:

in response to an outgoing packet generated by either one of the first and second host devices and destined to a corresponding different one of the network service providers, determining whether a corresponding one of the network connections has been established between the communication device, through the PSTN, to the corresponding one of the network service providers; and if an entry in the SBRT indicates that the corresponding one network connection has not yet been established:

establishing the corresponding one network connection to the PSTN over an available one of the channels;

updating the entry in the SBRT to reflect the one channel then being used for the corresponding one network connection between said one of the first and second host devices and the corresponding one of the network service providers; and routing the outgoing packet, via the one channel, over the corresponding one network connection to the corresponding one of the network service providers; or if the entry in the SBRT indicates that the corresponding one network connection is already established, routing the outgoing packet over the channel specified in the entry via said corresponding one network connection to the corresponding one network service provider.

32. The method in claim 31 wherein the first and second network service providers each provides access to either a private network or public network, wherein the public network is an Internet.

33. The method in claim 32 wherein the SBRT comprises a separate entry for each of the first and second host devices that specifies, for said each host device, the permitted network service providers, and, for each such permitted network service provider, a corresponding ISDN directory numbers and network parameters.

34. The method in claim 32 further comprising the steps of, in response to an incoming packet appearing on the LAN and originating with either the first or second host device:

translating private source address information contained in the incoming packet into public source address information for use by the network communication device, wherein the private source address information, for the incoming packet, specifies a private source address of a corresponding one of the first and second host devices and an identifier of an associated application session executing at the corresponding one host device which generated the incoming packet;

substituting the public source address information into the incoming packet for the private source address information contained therein so as to form an outbound packet, wherein the public source address information contains a predefined public address, associated with the network communication device, as a source address; and transmitting the outbound packet, via the communication circuitry and the corresponding first or second communication channel, to the corresponding first or second network service provider.

35. The method in claim 34 wherein the public and private source addresses of the first and second host devices and the public address of the network communication device each comprise a corresponding Internet protocol (IP) address.

36. The method in claim 35 wherein the public and private source address informations each comprise an associated IP address, an associated protocol number and an associated port number.

37. The method in claim 32 further comprising the steps of, in response to an incoming packet from the network service provider and appearing on either the first or second communication channels:

translating public destination address information contained in the incoming packet into private destination address information associated with a corresponding one of the first and second host devices, wherein the public destination address information contains a public address associated with the network communication device as a destination address;

substituting the private destination address information into the incoming packet for the public destination address information contained therein so as to form an inbound packet, wherein the private destination address information for the packet specifies a private destination address of the corresponding one host device and an identifier of an associated application session executing thereat which is to receive the incoming packet; and transmitting the inbound packet over the LAN to the corresponding one host device.

38. The method in claim 37 wherein the public and private destination addresses of the first and second host devices and the public address of the network communication device each comprise a corresponding Internet protocol (IP) address.

39. The method in claim 38 wherein the public and private destination address informations each comprise an associated IP address, an associated protocol number and an associated port number.

40. The method in claim 32 further comprising the steps of, in response to a packet appearing on the LAN and emanating from either the first or second host device:

selecting, in response to an identification, contained in the packet, of one of either the first or second host device as a source of the packet and a predefined hierarchically related routing criteria, associated with the one host device, from a pre-defined plurality of network service providers through which the one host device is permitted to access, the first or second network service provider, respectively, as the particular one network service provider for the corresponding one host device to which the packet is to be routed, the plurality of network service providers specifying the first and second network service providers; and routing the packet, via the first or second communication channel as specified in the SBRT, to the particular one network service provider.

41. The method in claim 40 further comprising the step of determining, from a source address contained in the packet, at least one of the plurality of network service providers through which the one host device is permitted to access so as to define a set of permitted network service providers.

42. The method in claim 41 wherein the hierarchically related routing criteria specifies a hierarchy of different types of network service providers through which the one host device can attempt to establish network access.

43. The method in claim 42 wherein the hierarchically related routing criteria selects the particular one network service provider as: (a) first, any one of the set of permitted network service providers then having a domain name that matches a domain name contained in the packet, (b) second, if no such domain name match is found, any one of the set of permitted network service providers that is an Internet service provider (ISP), and (c) third, if none of the network service providers is an Internet service provider, then any one of the set of permitted network service providers that is a network service provider for a private network (PN) that provides Internet access.

44. The method, in claim 43 further comprising the steps of:

determining, through accessing an entry in the SBRT, whether a connection then exists to the particular one network service provider; and if the connection does not then exist and prior to routing the packet to the particular one network service provider, establishing the connection to the particular one network service provider.

\* \* \* \* \*